United States Patent [19]
Luck

[11] Patent Number: 5,661,349
[45] Date of Patent: Aug. 26, 1997

[54] GRACEFUL ENERGIZATION AND DEGRADATION OF AN ELECTRONIC DEVICE MICROPOWERED BY A SOURCE OF ENERGY IN ITS ENVIRONMENT, PARTICULARLY AN IRRIGATION CONTROLLER POWERED BY LIGHT ENERGY

[76] Inventor: Jonathan M. Luck, 8740 Villa La Jolla Dr. #21, La Jolla, Calif. 92037

[21] Appl. No.: 94,687

[22] Filed: Jul. 19, 1993

Related U.S. Application Data

[63] Continuation-in-part of Ser. No. 253,858, Oct. 4, 1988, Pat. No. 5,229,649, and Ser. No. 880,062, May 7, 1992, abandoned, which is a continuation-in-part of Ser. No. 687,762, Apr. 18, 1991, Pat. No. 5,251,153, and Ser. No. 250,841, Sep. 28, 1988, abandoned, said Ser. No. 253,858, is a continuation-in-part of Ser. No. 250,841.

[51] Int. Cl.$^6$ ............................................. H01H 47/32
[52] U.S. Cl. .................. 307/151; 307/66; 307/130; 361/187
[58] Field of Search ................................ 361/151, 153, 361/155, 156, 160, 166, 167, 168.1, 169.1, 172, 205, 154, 187; 307/75, 38–42, 110, 64, 151, 66, 130, 116, 125

[56] References Cited

U.S. PATENT DOCUMENTS

| | | | |
|---|---|---|---|
| 4,573,115 | 2/1986 | Halgrimson | 364/138 |
| 4,980,574 | 12/1990 | Cirrito | 307/21 |
| 5,402,303 | 3/1995 | Luck et al. | 361/172 |

Primary Examiner—Fritz Fleming
Attorney, Agent, or Firm—William C. Fuess

[57] ABSTRACT

An electronic device, for example an irrigation controller, accumulates energy from a source of energy, for example from incident light, in order to progress, over time, from an inoperative un-powered to an operative powered condition in a positively controlled, graceful and orderly manner. The device so progresses to operability regardless that it should, from time to time and at times, be totally devoid of energy, and regardless that it may accrue energy only but exceedingly slowly over periods of days, weeks and longer. A power monitor circuit of the device is made from an electrical circuit technology that is reliably operative at a relatively low voltage level, typically from BICMOS technology, whereas other device electrical circuits are operative only at a relatively higher voltage level, and are typically made from CMOS technology. When power is marginal the low-operational-voltage energy monitoring circuit reliably produces one or more status signals well before the other, higher-operational-voltage, circuits even commence to operate. Conversely to its graceful energization, the electronic device degrades and de-energizes gracefully and progressively, in stages. In particular, a microprocessor-based irrigation controller closes all controlled irrigation valves before, in the face of declining energy, reverting first to housekeeping at minimal energy consumption, and then, with further diminishing power, to dormancy. The controller will re-assume full operability should energy balances ever again so permit.

10 Claims, 25 Drawing Sheets

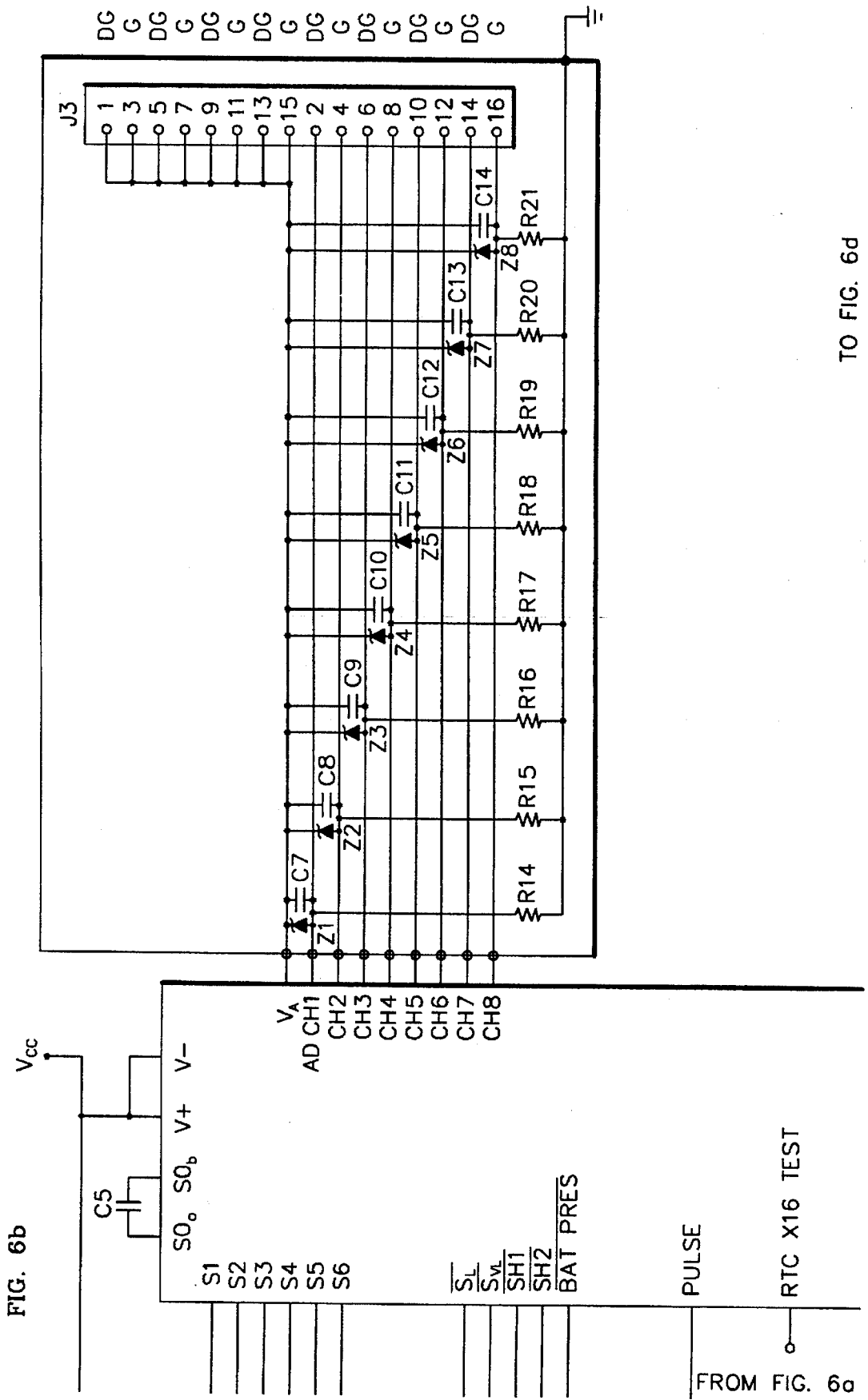

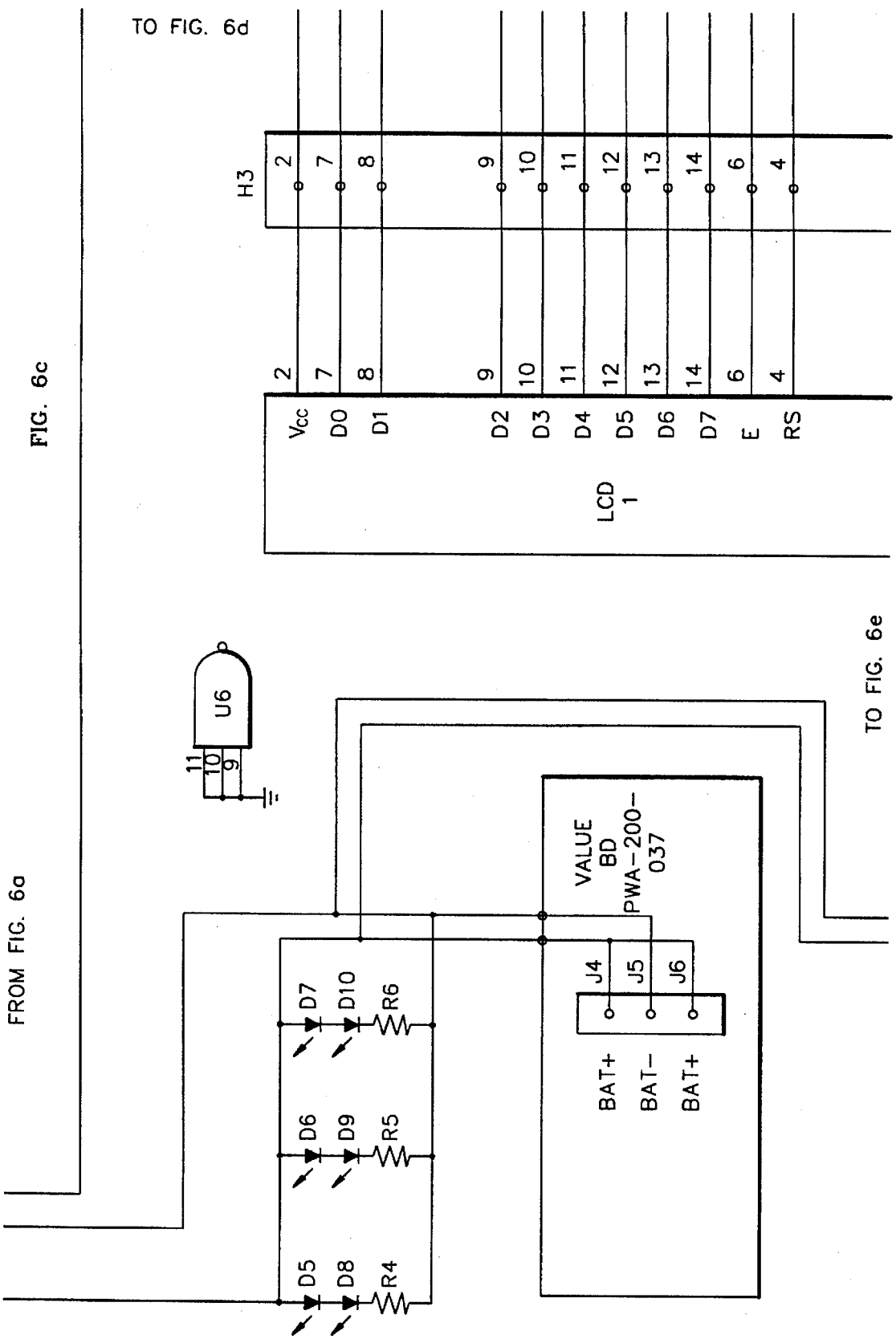

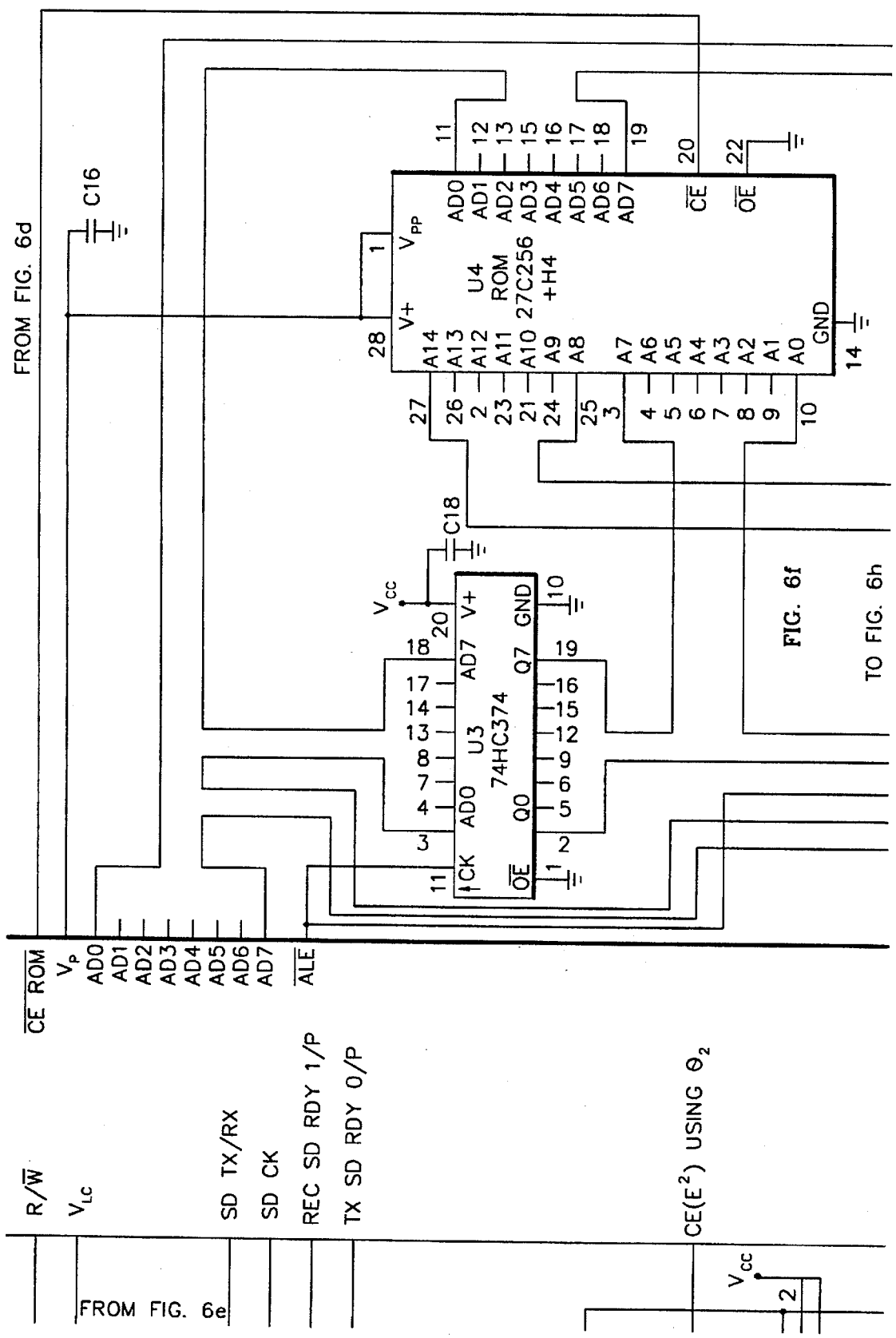

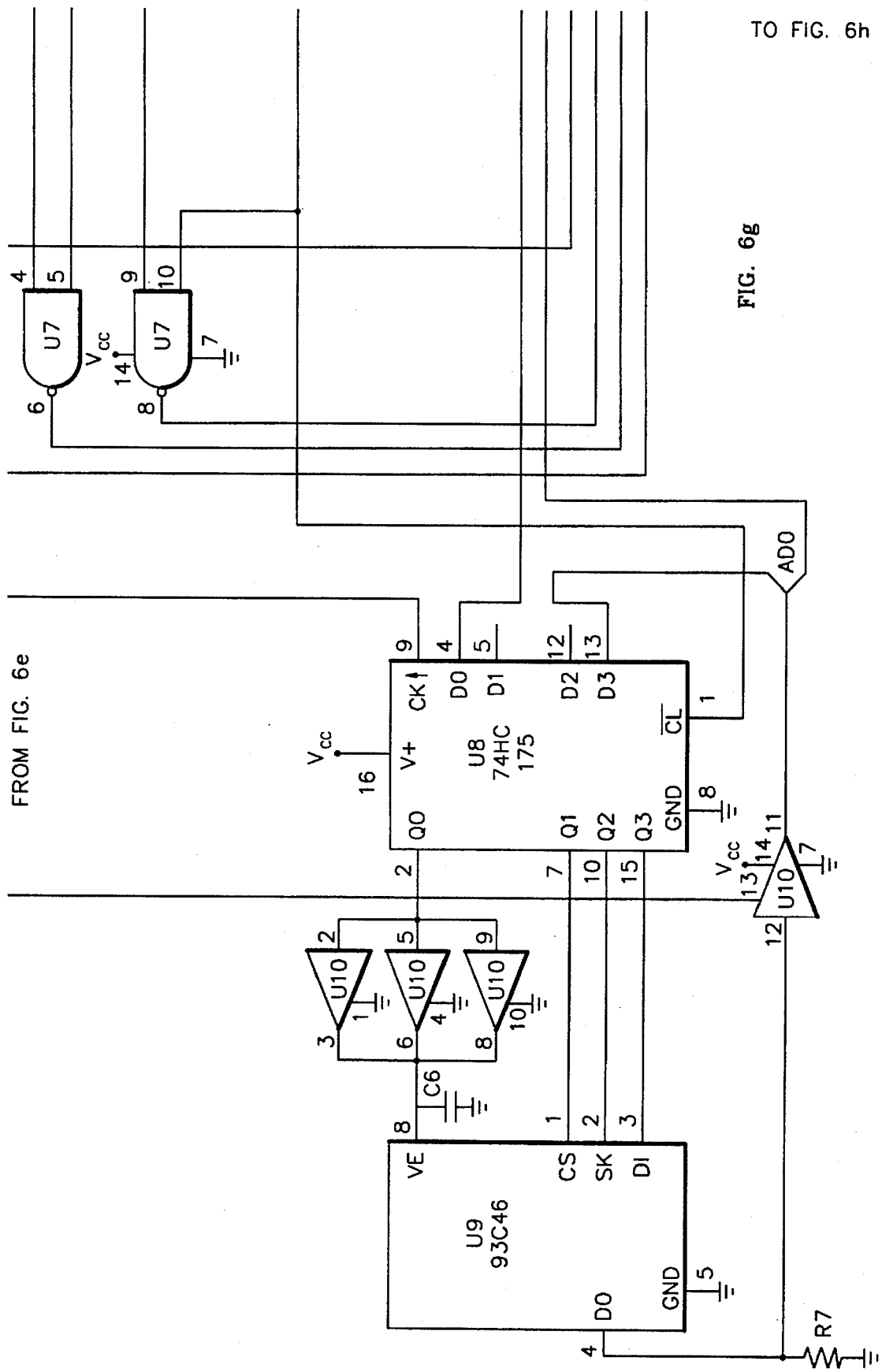

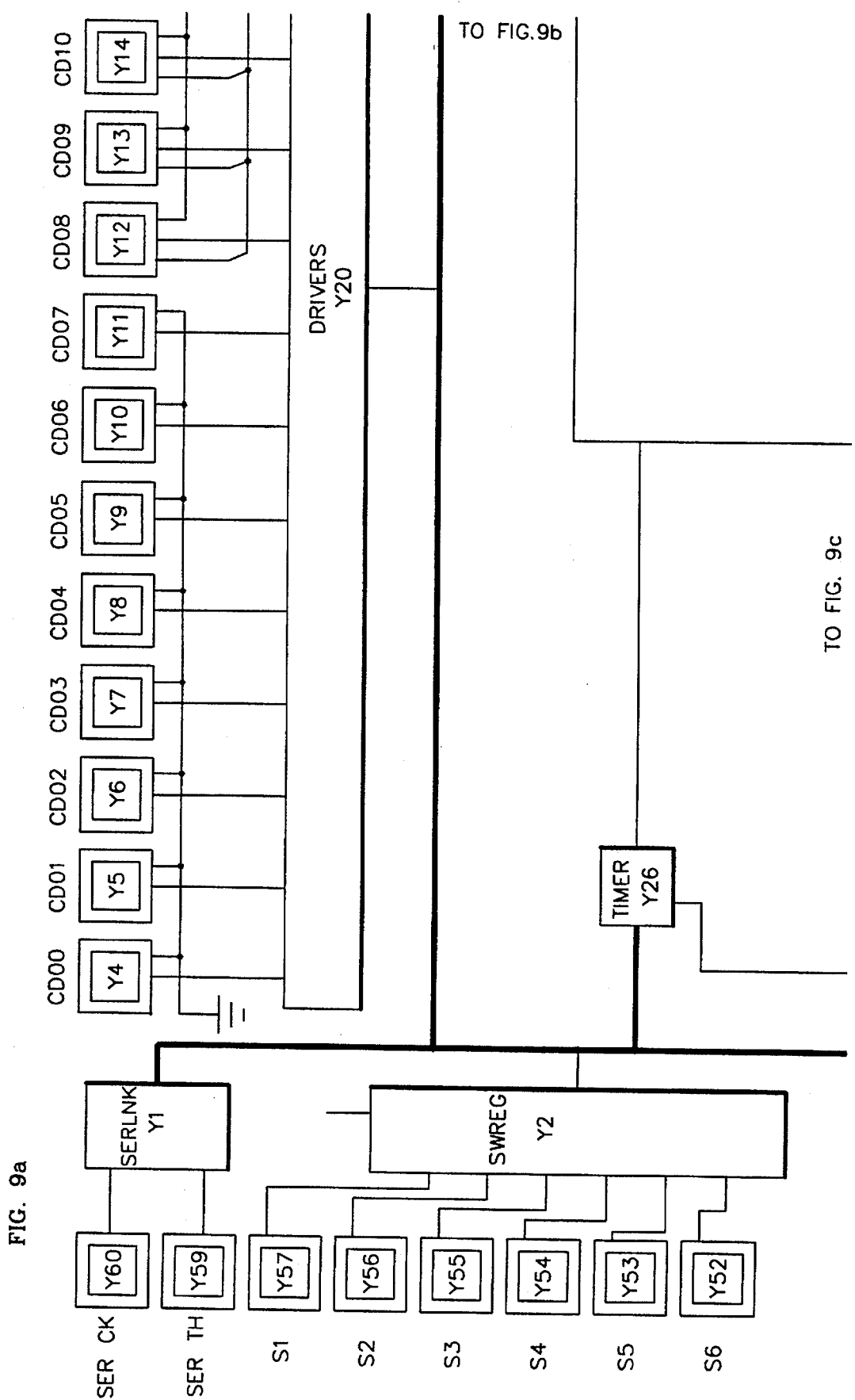

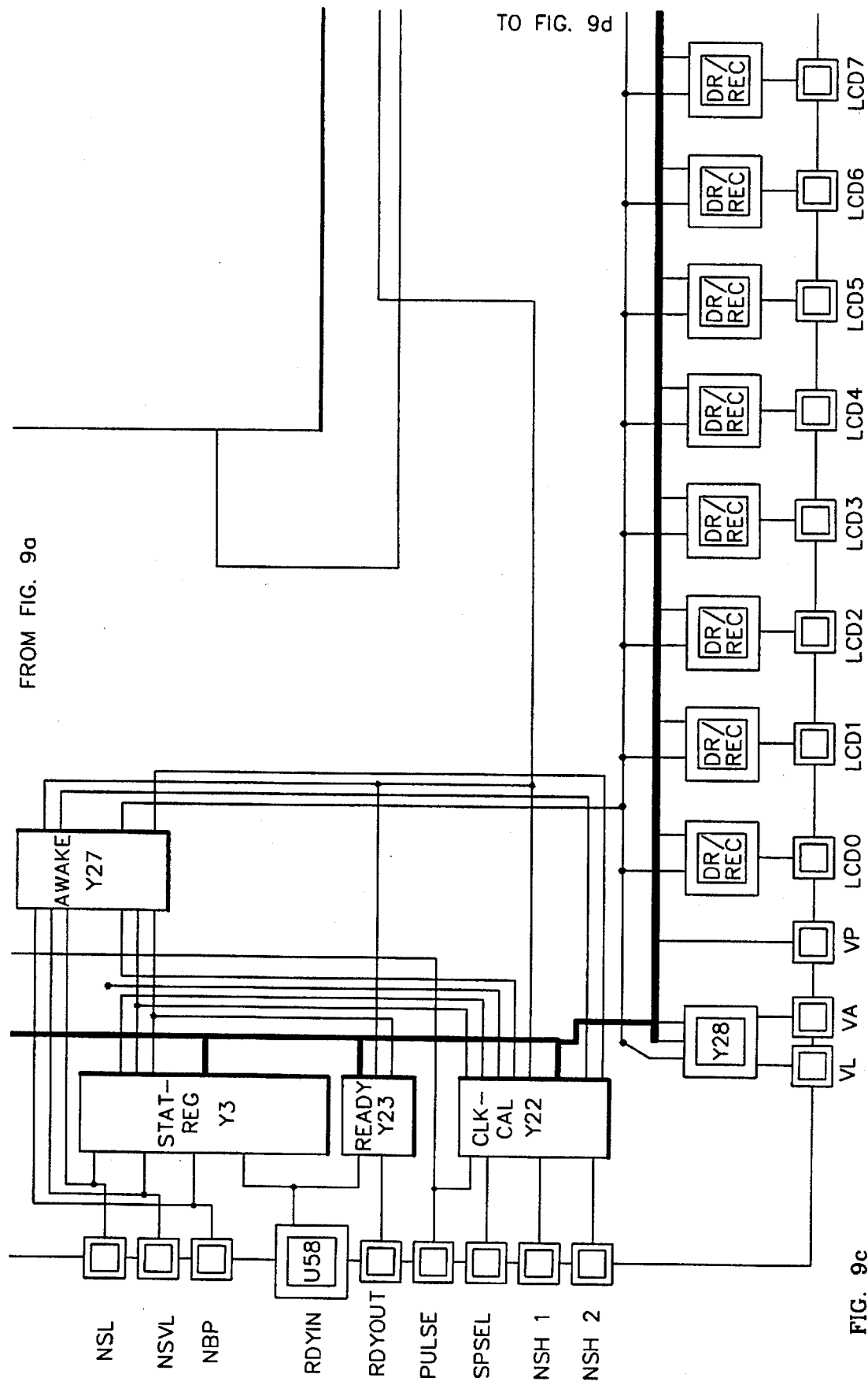

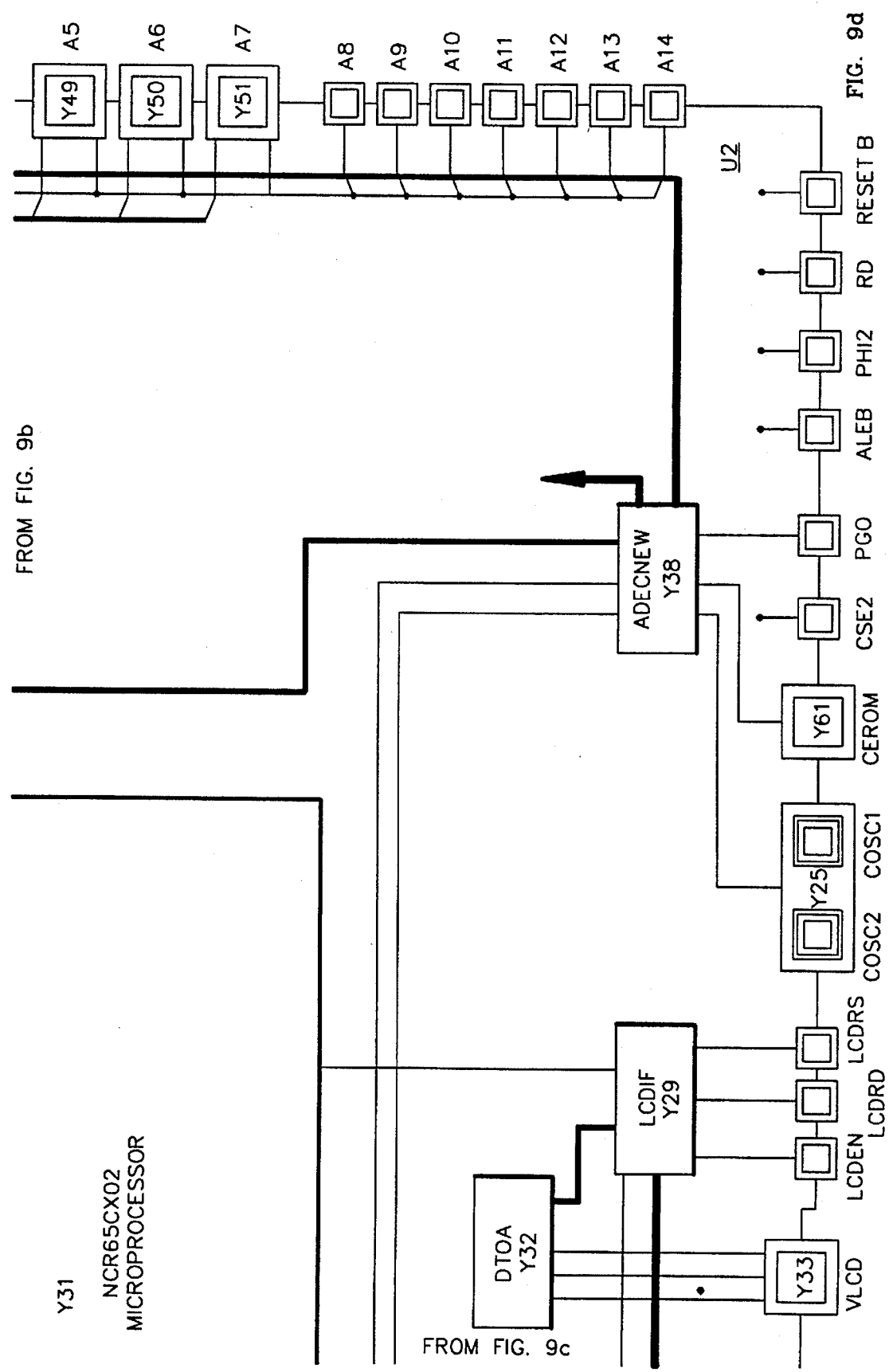

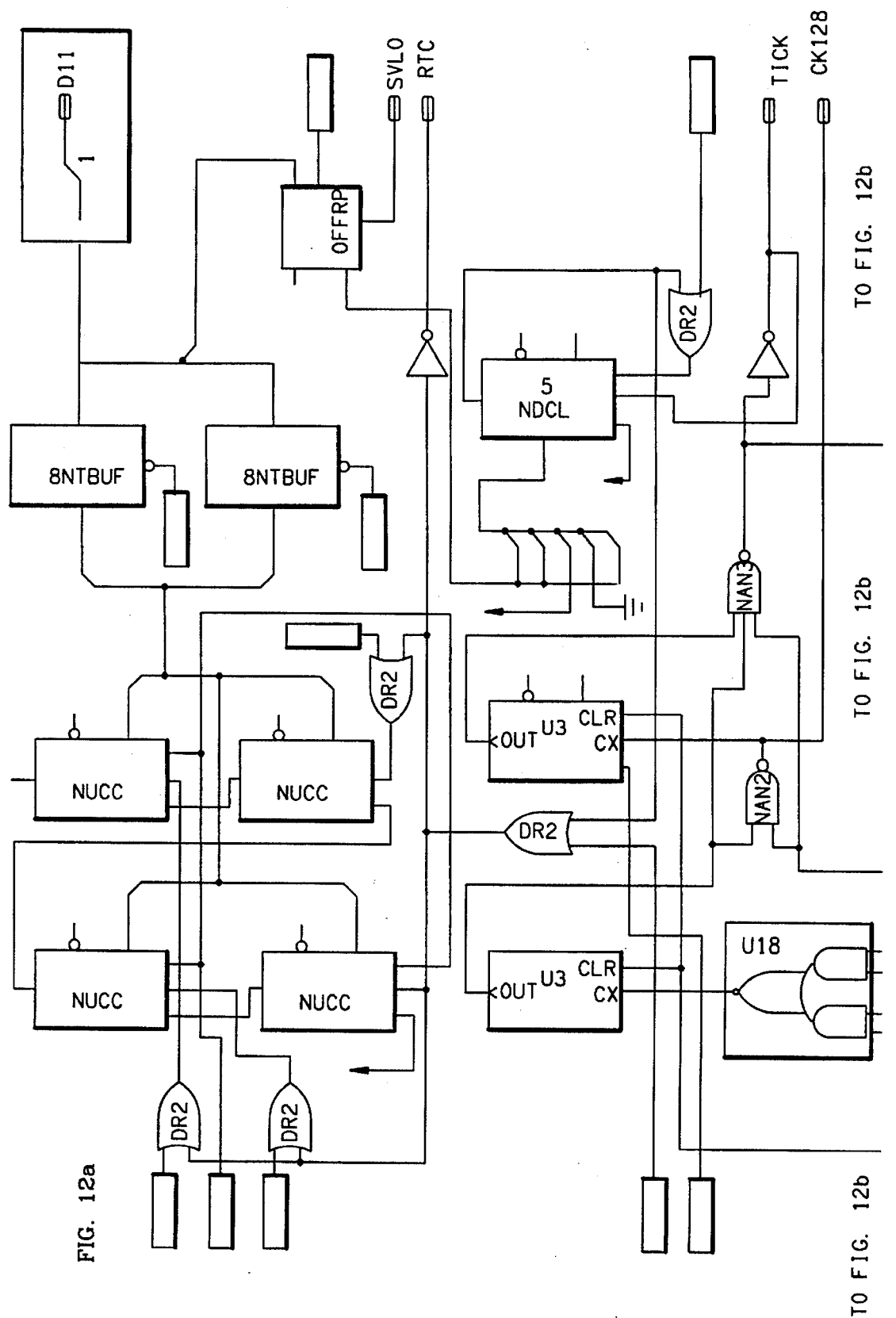

GRACEFUL ENERGIZATION AND DEGRADATION OF AN ELECTRONIC DEVICE MICROPOWERED BY A SOURCE OF ENERGY IN ITS ENVIRONMENT, PARTICULARLY AN IRRIGATION CONTROLLER POWERED BY LIGHT ENERGY

REFERENCE TO RELATED APPLICATIONS

The present patent application is a continuation-in-part of U.S. patent application Ser. No. 253,858 filed Oct. 4, 1988, for a LIGHT-ENERGIZED ELECTRONICS ENERGY MANAGEMENT SYSTEM issued Jul. 20, 1993, as U.S. Pat. No. 5,229,649. That patent application is itself a continuation-in-part of U.S. patent application Ser. No. 250,841, now abandoned, filed Sep. 28, 1988 for a FLEXIBLY PROGRAMMABLE IRRIGATION SYSTEM CONTROLLER, which application was continued as U.S. Ser. No. 687,762 filed Apr. 18, 1991, now U.S. Pat. No. 5,251,153. The present patent application is also a continuation-in-part of U.S. patent application Ser. No. 07/880,062 filed May 7, 1992, now abandoned, for an ENERGY MANAGEMENT SYSTEM, PARTICULARLY FOR ELECTRONICS MICROPOWERED BY LOW-LEVEL SOURCES OF ENERGY IN THE ENVIRONMENT. That application is itself a continuation-in-part of the aforesaid applications Ser. Nos. 687,762 and 250,841. The contents of the predecessor patent applications are incorporated herein by reference.

BACKGROUND OF THE INVENTION

1. Field of the Invention

The present invention concerns the graceful energization, and de-energization, of an electronic device, particularly a microprocessor-based digital electronic device, that is powered, typically with extremely small amounts of power obtained but slowly and erratically, by a low-level source of energy in the environment, particularly by such ambient light energy as is incident on the device.

2. Description of the Prior Art 2.1. The Preliminary Purposes and Operation of the Present Invention to which the Prior Art Must be Compared The present invention will be seen to concern the accumulation of energy in an electronic device so that, after sufficient energy is accumulated, the electronic device may thereafter be operated at least periodically or occasionally. The energy available for accumulation is commonly (i) at very low levels, (ii) sporadic, and (iii) unreliable in amount over any period(s) of time ranging from seconds to months. The energy that is supplied to the electronic device at any one instant of time may potentially be at levels so low that the device would never be able to operate fully if it was to be dependent upon just this instantaneous supply of energy. Instead, the electronic device will typically be able to operate for the production of useful work, and to consume energy, only if, and when, energy has been accumulated over time periods longer than the device will be fully operative.

The present invention will be seen to particularly concern the graceful and correct initialization (or re-initialization) and energization of an electronic device, including computer microprocessors and computer memories. The device energizing an initializing device may start from a condition of absolutely no stored power. It my proceed, over one or more periods of time that may aggregate days and longer in length, to very gradually accumulate energy. The supply, and accumulation, of energy need neither be linear, nor even progressive. The energy supplied to the device may be, and typically is, parsimonious, irregular, and unreliable. It may never exceed an instantaneous magnitude that would ill serve to power a common digital wristwatch. The device accumulating this energy may have periods, including periods when it is not even operational for the conduct of useful work, when it energy stores actually diminish due to leakage and the like.

Nonetheless that an electronic device in accordance with the present invention will be seen to have to accumulate energy most diligently, and occasionally for very long periods, in order to accumulate sufficient energy for its (periodic, energy-conserving) operation, the device will be seen to do impressive amounts of useful work when actually (occasionally, periodically) operating. Moreover, the device always gracefully energizes to, and de-energizes from, its operational state.

If the device is able to store, or maintain, the smallest scintilla of energy then the work performed over multiple periods may be conducted in time sequence from one operational period to the next. Even if the device is deprived of any energy whatsoever for so long, and so profoundly, so as to, after the passage of sufficient time, have completely exhausted its reserves of stored energy (which energy reserves were likely minuscule to begin with), the device will nonetheless re-energize gracefully and, although devoid of knowledge of current real time, commence useful work. This useful work may, and normally does, include work that is scheduled to occur at fixed time intervals.

Particularly when powered from sources of energy in the environment—such as incident light energy—an electronic device in accordance with the present invention will be seen to have the interesting characteristic that, because it draws energy from its environment, the device need not be, and normally never is, shut off. The device will never be permanently stopped simply because, from time to time and at times, it receives no energy and/or has insufficient, or no, energy stored so as to operate.

The idea of a device that runs when it has energy, and that does not when it does not, is as simple as a common solar-powered calculator. However, a solar-powered calculator will not normally accrue energy to attain operability, and must be supplied with instantaneous energy in excess of its instantaneous consumption. Neither does a solar-powered calculator or like device commonly store energy by which it may, hopefully and if the magnitude of stored energy reserves permits, maintain track of real time from one period of operability to the next. Neither does a solar-powered calculator or like device commonly degrade gracefully—terminating present operations in an orderly and coherent manner while preserving, if useful, its present status and results—when it is deprived of power (or, should power be stored such as in batteries, when the stored power falls dangerously low). Of course, some microprocessor-powered "address books" do have a secondary battery to back up the primary battery, and maintain the integrity of information during replacement of the primary battery.

Electronic devices normally maintain the a coherence between their operations during temporally separated periods only so long as the devices are able to have at least some power, or to retain at least some power reserve(s). An electronic device in accordance with the present invention will be seen to cease, and to resume, operations at separated periods even when, between periods, it may be totally devoid of either supplied or (remaining) stored power. The inventors no of no comparable device so functioning.

2.2 Analogous Devices and Methods of the Prior Art—A Start-up from a Total Absence of Power and Energy Further by analogy to the present invention, electrical and electronic devices and systems have previously been adapted to gracefully commence, or to suspend (or even cease), their operation dependent upon the adequacy of the electrical power that is instantaneously supplied to such devices or systems. The approaches previously employed by such devices or systems in response to degraded, or inadequate, electrical power range from the simple to the complex.

One, elementary, prior art approach is to simply suspend all functionality whatsoever during the persistence of no, or inadequate power. A more sophisticated approach, occasionally employed in military devices or systems where power outage or degradation is possible while some coherence and integrity in device or system operation is desired to be maintained, is to store enough power to permit a graceful degradation of functionality upon even the most instantaneous and total interruption of power. Such devices and systems commonly also re-energize gracefully, and re-assume their full operational state, upon the restitution of adequate instantaneous power.

Electronic systems and devices that are sophisticated in response to the degradation or interruption of electrical power are normally not additionally burdened with having to account for the long-term adequacy in duration and in amount, as opposed to the instantaneous adequacy, of the electrical power that is supplied to the system or device. In other words, in the prior art supplied power is generally either sufficient—whether for some purposes or for all purposes of operation—or is insufficient for some, or for all, of these purposes. No consideration needs be, nor has, generally been given in prior art devices (or systems) as to whether such power as has already been supplied to the device (or system)—at certain levels and during certain time periods—has permitted the device (or system), to receive, and to store, a net total amount of electrical energy that is sufficient to now permit the device (or system) to continue, or to recommence, some, or all, of its operations. There is a particularly good reason why the energy history of the device (or system) is not commonly regarded when determining whether to commence, or re-commence, operations. Determination that power, and/or stored power, is adequate (or inadequate) for operation normally takes power. But if input power, and/or stored energy, is extremely low, just where is the power for evaluating the status of the power, or stored energy, to come from? Suppose that there is just enough power supplied, or energy stored, to determine just how little power (or stored energy) there is, and to determine that the device (or system) should not commence operation. What holds off the rest of the device (or system) from operating or attempting to operate, and consuming power, if the determination circuitry so determines? Is it to be control signals? If so, how are these signals to be generated, and interpreted, if there is scant power or energy? If holding the device (or system) dormant is to be the function of the determination circuitry, then how is it that this circuitry is operative to hold off all other circuitry while such other circuitry is not detrimentally consuming power?

Military computers, among other electronic devices, routinely possess an "auto start" capability. To this extent the prior art does show how to commence operations "gracefully". Commonly input power is increasing reasonably rapidly, and reliably—such as when the device is connected to an active power bus. In such a case operations are typically commenced only after a predetermined time delay, such as may readily be accomplished by a resistive/capacitive circuit. But what if power cannot be guaranteed to increase over any predetermined period, howsoever long? And, as before, how is the process of assessing, and reassessing, the adequacy of supplied and/or stored power—which activity itself takes power—to be performed, and repetitively performed, when there is little, or no, power to be had?

Power, or energy, management in the prior art generally makes certain explicit or implicit assumptions about the existence, and the nature of the supply, of energy and power. When these assumptions are absent, or de minimis, then the management of energy and power in an electronic device may approach the bind of being required to manage power (or energy) when there is no power (or energy).

A system or device that occasionally (no matter how infrequently) instantaneously uses more power than the power with which it is instantaneously supplied (satisfying the deficit in instantaneously supplied power from stored energy reserves) obviously must be concerned with energy transfer, as well as with instantaneous power. If it were not so concerned then the system or device might commence to operate upon the presence of adequate instantaneous power, but without adequate stored energy reserves. If so operative without adequate energy reserves, the system or device might be placed in an illogical, and/or unsatisfactory, operational state upon any requirement to expend more power than was instantaneously received.

2.3 Analogous Devices and Methods of the Prior Art—A Start-up when Instantaneous Input Power is Less than the Power Instantaneously Required for Operation, and is Potentially Perpetually so Less Still another set of challenges results when a system or device is required to operate in an adverse power environment. Adverse power environments result when one or more power sources to the electrical system are at times individually and/or collectively unavailable and/or inadequate to meet either the (i) instantaneous or (ii) sustaining power demands of the system. Commercially available devices and systems have not generally been called upon to operate in these power environments. Military devices and systems occasionally are so operative in adverse power environments, but the main approach has been on storing power so as to permit continuing device or system operation (with minimum degradation) while operational emphasis shifts to power restoration.

Power management in electronic systems operating in adverse power environments has generally relied on several strategies.

First, power may be stored, as and when it is available to the electronic system, in energy storage devices such as batteries or capacitors. The operating electronic system draws its power from the energy stored in such energy storage devices.

Second, the use of power may budgeted over periods of any duration ranging from momentary to continuous. The cumulative amount of electrical energy provided to the system must exceed, over all such protracted time intervals as the system is required to be operational, the operational energy requirements of the system plus any losses incurred in the energy storage.

A third alternative, and sometimes complementary, strategy is to simply minimize the energy requirements of the electronic system. Particularly in microprocessor-based digital electronic systems this is commonly accomplished by minimizing the on, or active, time of the microprocessor and its associated electronics. The microprocessor and its associated electronics are typically clocked in operation. If the clock signal is periodically removed and/or is supplied at a low rate—thus lowering the effective duty cycle of the useful work performed—then the amount of power consumed by the electronics is generally reduced. The reduction in consumed power is, however, not necessarily in an amount that is proportional to the reduction in duty cycle and the attendant reduction in useful work. This is because the electronics generally consume some energy even while in a standby, non-operational, mode.

All these prior art schemes break down when no energy input and output budget can be established because, quite simply, the presence of any input power whatsoever is never guaranteed. The necessary strategy of the electronic system must seemingly be to run when (adequate) stored power and energy is, or becomes, adequate to so run, and to lie dormant when such stored power and energy is not so adequate. But then we are back to the potential impasse. If it takes power to monitor power, and to predicate operations based thereon, then who is to say that the power monitoring will not, especially when but extremely sparse and low power is provided to the electronic equipment, itself use up the power reserve faster, or as fast, as it is being accrued? And how is power to be monitored when there is not power? And how may an electronic device come from a condition of a total absence of any received or stored power to a condition of operability if such process takes, instead of a predetermined time period (which is typically a few seconds in the prior art), an undetermined length of time which may be days, weeks, or months and longer in length?

One reason that such electronic devices, and power management schemes, are not believed to exist in the prior art is because few persons desire to own an electronic device that takes on month to turn on. However, the slowness with which a device may turned on says little about the useful work that it may accomplish once turned on. And there may be valid reasons that the electronic device cannot receive, nor reliably receive, much energy. For example, a light-energized irrigation controller is subject in its collection of light energy to latitude, site factors (in the sun or in the shade), weather (cloudy or sunny), seasons (under snow, leaves or water) and human intervention (covered with a workman's coat, or a bag). However, howsoever unreliable and variable the light energy, if the irrigation controller could somehow come from an un-energized condition (maybe as it comes from the factory box, or after a long winter) to an operative and energized condition based on its accrual of light energy, and if it could thereafter operate to control irrigation, then this function would be exceedingly useful.

2.4 Sparse and/or Sporadic Supply of Environmental Energy to an Electronic System The present invention will also be seen to deal with a requirement to manage electrical energy in an electronic device wherein the requirement cannot be met by a straightforward application of the strategies of (i) storing energy, and (ii) minimizing the system's use of the stored energy. The energy management requirement addressed by the present invention characteristically arises in electronic systems that are not powered by any connection to a power grid, and which also, on the whole, do not connect to or depend on battery or other sources of electrical power that are directly substitutionary for a power grid.

Electronics systems of this order receive most, if not all, of the energy which they use in their operation from non-electrical, generally low level, sources of power. Such non-electrical low-level sources of power may be, for example, (i) radiant or light energy, (ii) thermal energy, (iii) pressure variations, or (iv) mechanical forces, such as forces of fluid flow, to which the system is exposed. An energy conversion system converts the energy within the non-electrical external sources of power into the electrical power that an electronics system requires for its substantial continuing operation by means such as solar cells, thermionic generators, and standard electrical generators.

In deriving operational energy from their surrounding environment such electronic systems enjoy an independence of external, non-local and non-environmental power sources. In this manner environmentally-powered electronics systems operate in a manner similar to, and with similar independence to the independence exhibited by, certain exotic, and generally expensive, environmentally-powered clocks. Namely, the clocks derive the (generally mechanical) energy of their operation only, and exclusively, from sources of energy that are present within the environment within which the clocks reside, and to which the clocks are exposed. Such clocks are typically powered by temperature, or by atmospheric pressure, changes in the environment of the clock. Environmentally-powered electronic systems desirably function commensurately, and require no source of energy, nor any energy, other than that obtainable from their immediate environment.

Environmentally-powered electronic systems must manage energy. They characteristically manage such (generally modest) energy as they do consume in a manner that is fundamentally equivalent to conventional, grid-powered electronic systems. This is true regardless of the voltage, amperage or wattage of the environmental source of electrical power—electricity being electricity regardless of its source or derivation. The energy management performed by such systems includes considerations, and strategies, going to component selection, power storage, and power budgeting.

However, the present invention will be seen to contemplate that an "energy" interface to external sources of energy, and the management of this interface, should be much, much different in an environmentally-powered electronic system than it is in conventionally-powered electronic system. A simplistic strategy of "suck up all the energy that the (environmentally-powered) system can get", "store this energy", and "use the stored, and produced, energy until it runs out" is not going to work well for an environmentally-powered electronics system, as is hereinafter explained.

This is because an electronics system powered by sources of energy in the environment—such as light energy—is characterized by (i) sporadic, inconstant, and/or uneven levels of power supply, coupled with (ii) a general paucity in the total amount (watt hours, or watt minutes, or watt seconds, or joules) of energy available.

The (i) sporadic, inconstant, and/or uneven levels of supplied power result because the environment from which power is derived is uncontrollable, uncontrolled, or poorly controlled—especially by the electronic system. The electronic system cannot say "Environment, give me more power"; it is lucky to get what power it can.

For example, electronic systems employing solar cells or generators to derive electrical energy from environmental radiation, thermal and/or mechanical forces often derive and receive electrical energy in a highly sporadic manner. The sun may not shine, ambient temperature may not change, ambient pressure may not change, or fluid may not flow. Even when electrical energy is being instantaneously derived from more than one source of energy present within the environment, the collective rates of such derivations may be extremely low.

The (ii) general paucity in the total amount of energy available to an environmentally-powered system (whether electronic or no) results because localized, particularized, or customized electrical generators of whatsoever nature are often expensive, space-consuming, weighty, and/or unreliable. Fuel cells, nuclear generators, and water- or wind-powered rotary generators are basically akin to batteries, and require a special environment wherein fuel, radionuclides, moving water, or wind are present. The most common, and universally prevalent, ambient environmental energy sources on the planet's surface are (i) light, (ii) ambient temperature changes, and (iii) ambient atmospheric pressure changes.

Devices to extract power from these common ambient environmental energy sources have a volumetric density of power production that is several orders of magnitude worse than is the volumetric density of power consumption in and by common digital electronics. In other words, a generator powered by light, or by ambient temperature changes, or by ambient atmospheric pressure changes must typically be tens of cubic centimeters, or cubic meters, in volume in order to supply the energy consumption of a few cubic millimeters of electronic chips. Generators of reasonable, tens of cubic centimeters, volume that produce power either from light, from ambient temperature changes, or from ambient pressure changes characteristically produce electrical power (i) only sporadically, and then (ii) at milliwatt or lower power levels for (iii) intervals of hours or minutes. Accordingly, such generators characteristically produce only milliwatt hours or milliwatt minutes of energy within each diurnal period. Electrical and electronic systems that operate on such small amounts of electrical energy are called "micropowered".

The present invention will be seen to be concerned with power management in, and power management systems operative in, a power environment that is extremely adverse in terms of both (i) constancy and (ii) adequacy of power and energy production relative to consumption requirements. When the consumed power is, as is typical, environmentally derived in power converters having reasonable weight and volume, then the production, and necessarily the consumption, of power is correspondingly typically micropowered—typically at millijoule and lower energy levels.

2.5 Inconsistent, Sporadic, Unscheduled, and Unforeseeable Demands to Consume Electrical Energy Nonetheless to the extreme adversity of such an environment of power production, the standard techniques of power budgeting, power storage, and minimizing power consumption might barely suffice, when applied at such extreme levels as would be required for satisfactory energy management, but that further complexities in the power management problem are present. These further complexities relate to power consumption as opposed to power production.

To momentarily skip ahead to ultimate point, the present invention will be further seen to also be concerned with a power environment that is adverse in its consumption, as well as (simultaneously) in its production of electrical power. An adverse power consumption environment is one where the use of power is (i) sporadic, inconstant, and/or uneven, and is (ii) occasionally very high relative to, or even greater than, either the magnitude of power that can be instantaneously produced from both generation and storage, and/or the energy that can be produced over certain time intervals from generation. The second, (ii), characteristics are particularly insidious: the demand for power and/or energy is not only irregular but may, by definition, outstrip any predetermined power or energy balance of the system.

In the event that the system energy reserves are soon to be depleted, it is desirable that the system should degrade gracefully, and in an orderly manner.

Environmentally-powered electronic systems have previously generally been limited to those where instantaneous power is adequate to supply instantaneous consumption requirements. For example, the aforementioned solar-powered calculator will calculate only in the presence of energizing light regardless that the net energy balance of the calculator might be positive over a twenty-four hour or longer period. Even for those rare electronic systems, such a roadside emergency radio-telephones, that will work at one time (e.g., at night) from energy gathered at another time (e.g., from daylight), (i) a large, typically rechargeable battery, energy storage reservoir is maintained, while (ii) maximum power and/or energy drain is limited.

Variability in the amounts, times, and rates of power and energy received by an electronic system versus the amounts, times, and rates of power and energy expended necessarily constitute a continuum ranging from electronic systems wherein power management is trivial to those wherein it is impossible. Generally, however, no attempt at managing power from the environment in extremely small amounts has previously been made, regardless of net system energy balance over some useful period such as a day or a week, when both of two different complexities have been present.

The first complexity is a possible dearth of input power and energy for a sustained period. As already explained, this is common for environmentally-powered electronic systems.

The second complexity is the possible uncontrolled timing of a possibly significant power drain. This complexity is also common, typically arising when the system must use energy to communicate or to do unscheduled work.

The present invention will be seen to deal with the energy environment where, on average over some period, there may be energy enough, although possibly just barely enough, to perform useful work even though the instantaneous availability of adequate energy storage to meet an instantaneous power consumption is forever uncertain.

Upon initial consideration, the large number of variables postulated, and/or the extreme constraints encompassed might seem to present an impossibly difficult problem in energy management. Nonetheless to the difficulty of the problem of managing energy in the environment of the "real world", it would be useful if some progress could be made.

If electronic systems could "live" on power derived from the ambient environment in which they exist then they would exhibit a property of "life" other than (artificial) intelligence: such systems would obtain "sustenance" from their environment, much as do living organisms. Like living organisms—and unlike solar-powered clocks, watches, or calculators that perform set functions in a wooden, inflexible manner—such systems would be expected to use more energy at certain times in order to respond to sensed conditions and requirements. For example, a self-energized solar-powered irrigation control system might be expected to be able to "intelligently" control irrigation watering in accordance with sensed soil moisture conditions.

Interestingly, electronic systems that were capable of reliably deriving power from their environment, and that intelligently managed the power so derived, might, in accordance with the well-known longevity of digital electronic circuitry, effectively "live" for a very long time—much like a perpetual clock. Such environmentally-powered electronic systems might function nearly as long as the sun shone, the temperature changed, or the atmospheric pressure changed.

2.6 Still Further Problems of Power Management in an Adverse Power Environment Meanwhile to the general problems of power management in an adverse power environment, there are at least two other particular problems—other than the general paucity, and randomness, of environmental energy sources and the lack of control in time and magnitude of energy consumption—that confront electronic systems attempting to operate substantially only from non-electrical energy sources within the environment of such electronic circuits.

A first problem—dealt with by the present invention—involves the graceful start up, and graceful degradation (if necessary) of the operation of the electronic system. If the electronic system is initially placed into the environment totally without any stored energy, and if its instantaneous average operational power consumption immediately exceeds the instantaneous average power that may be derived by conversion from non-electrical sources of power within the environment, then the system cannot accumulate any positive energy balance, and will perpetually remain in a nonoperative, dysfunctional, state.

By definition, if the electronic system is to derive operational power over protracted periods of time solely from converting a non-electrical source(s) of energy that are present within the environment of such system into electrical power, then the net power inflow from this (these) energy source(s) within the environment, after inefficiencies of conversion, must be greater than the average power consumption of the electronic system. However, these energy balances may be very close. Accordingly, an electronics system that is not specially controlled to start, or "come alive", gracefully within a degraded power environment may undesirably languish many hours, days, or weeks before sufficient power is accumulated so as to permit the electronic system to accomplish that processing for which it is designed and tasked.

As a specific example, consider if an irrigation controller was to be electrically energized by converting solar energy, or temperature changes, or pressure changes, or running water in the irrigation pipes that it controls, or some other ambient non-electrical source of energy into electrical power. Suppose that this environmentally-energized irrigation controller is taken out of its factory carton and installed. It must somehow accumulate sufficient energy so as to begin performing its irrigation control function(s) in an orderly, and timely, manner.

Alternatively, if, due to the insufficient provision of energy from environmental sources, the electrical energy balance within an electronic system that is dependent upon such environmental energy sources falls below a certain level, then the electronic system should degrade, suspend or cease its operations in a graceful and controlled manner.

As a specific example, again consider the hypothetical environmentally-energized irrigation controller. If its solar array were to be covered, or if the ambient temperature or pressure did not change, or if the irrigation pipes were to run dry, then it is certainly possible that the irrigation controller would run out of energy. It is of course, desirable that the irrigation controller should not choose to "die" for lack of energy while it has one or more irrigation valves turned on, and running water.

A second, and more subtle, problem facing electronic system that must operate in an environment of sparse, and sporadic, power input is due to possible asynchronous demands upon such electronic systems to "come alive", and to operate at a relatively high, or continuous, duty cycles in order to perform significant work. An electronic system may be asynchronously, and randomly, called upon to perform the selfsame processing that it might otherwise periodically, and regularly at long intervals, accomplish. If the electronics system is energy-budgeted for accomplishing its processing only periodically at intervals, then a problem arises only when the system is called upon to (i) perform the processing for more repetitions than its budget permits, or (ii) to re-perform the processing so soon after a scheduled processing that insufficient energy has been accumulated from the sporadic environmental sources of energy.

Another typical asynchronous demand upon an electronic system—which demand necessarily causes such electronic system to consume energy at a high rate—is a demand for communication. This asynchronous communication may transpire either by a communications channel to another electronic system, or by an operator interface to a human. When a human, in particular, wants to communicate with an electronic system then he/she cannot be expected to belay his/her request in consideration of the cumulative energy stored, or instantaneously available, to such electronic system. Neither can he/she be expected to prolong the duration of his communication only so long as the energy budget of the electronic system permits.

Both of these two eventualities—asynchronous demands on an electronic system to accomplish its normal function(s) in excess of the energy budget for such function(s) and asynchronous demands upon an electronic system to communicate—may be illustrated by the hypothetical example of an irrigation controller that derives its substantial operational energy from the environment within which it is located. Such operational energy might be derived, for example, by the conversion of incident sunlight into electrical energy. Such operational energy might alternatively be derived, for example, by a generator producing electricity in response to fluid flow within the irrigation watering system that is controlled by the irrigation controller.

The irrigation controller accumulates energy available from its environmental sources of energy, and performs its processing, and its control of irrigation valves, while operating under an energy budget. This energy budget is derived from the minimum energies that the irrigation controller may reliably extract from its environment.

If a human being asynchronously arrives at an irrigation controller then the human being may wish to (i) communicate with the controller, such as for purposes of programming its operations, and/or (ii) cause the controller to run trial, or test, irrigation sequences. Either of these two eventualities causes a severe energy drain on the stored energy of the irrigation controller. Even if the irrigation controller has stored significant electrical energy from its continuing conversion of non-electrical sources of energy present within its environment into electrical energy, and even if the irrigation controller has an immediate positive energy storage balance sufficient to perform the directed commands, it will not necessarily be reliably left with sufficient energy so as to continuously reliably perform the very irrigation control for which it is installed after completes (i) communication and/or (ii) test sequences with a human operator. Quite simply, a human operator that (i) communicates and/or (ii) tests a self-energized irrigation controller so as to pronounce it operative may, by the very act of (i) communication and/or (ii) testing leave the irrigation controller so bereft of stored energy that its subsequent failure is inevitable.

If the problem of energy insufficiency upon, or after, an asynchronous demand upon an electronics circuit to increase its functionality, and to attendantly increase its energy consumption, is to be satisfied then, by definition and by default, either (i) additional energy must be stored, or (ii) additional energy must be supplied to the electronic circuit. Previous electronics energy management systems do not resolve the question of where this (extra) energy should come from, and/or when it should be stored or provided.

As a further and alternative example of the complex, multi-faceted, energy environment within which modern electronics systems are operative, consider electronics equipments within a hospital. It is of great benefit to (i) safety, (ii) immunity to power reductions or outages, and (iii) transportability of hospital electronics equipments if they are not even connected to wall power, and are instead, insofar as is possible, self-contained—providing power for their own operation.

Modern micropowered and microminiaturized electronics may perform many useful monitoring and control functions in the hospital environment within minute energy utilization budgets. These minute energy budgets can readily be met by batteries. However, battery-powered electronic machines are extremely undesirable in the hospital environment because (i) they require a rigorous maintenance schedule for periodic replacement of the batteries, and because (ii) severe, life-threatening, consequences may result from hospital equipment unavailability due to the draining, or failure, of its battery power supply.

Hospital electronics equipments that are not connected to wall power might be energized, alternatively to the use of batteries, by small solar collectors. These solar collectors would convert the significant light energy present in the hospital environment into electrical energy used by the electronics equipments in performance of their prescribed function(s). Normally, however, the instantaneous rate at which electrical power can be converted from light energy that is incident upon a solar collector of reasonable size is very small. This small power is sufficient to power the monitoring and control functions of the hospital electronic equipment. However, the small instantaneous rate of electrical power production is manifestly insufficient to power an asynchronous, and irregular, demands that are made upon the electronic equipment, such as demands for operator communication.

Recalling the example of the irrigation controller, it is not desirable to attempt to meet asynchronous demands for increased energy consumption in and by a hospital electronic equipment by the storage of electrical energy. Any asynchronous demands might only then serve to deplete the energy store. A hospital electronic equipment that was left with an inadequate instantaneous energy storage balance so as to reliably perform its prescribed function(s) for a predetermined future period of time, even should no further energy be received, would be both undesirable and potentially dangerous. Accordingly, if reliably operative hospital equipments are to be powered by light or by some other source of power within the equipment environment, then their energy must be managed in a sophisticated manner to account for the many vagaries of both energy supply and energy use in the environment of such equipments.

The present invention will be seen to deal with energy management in a complex and adverse energy environment where energy, both electrical and non-electrical, is sporadically and parsimoniously supplied to an electronic system, and where the electronic system is called upon, sometimes sporadically and asynchronously, to expend energy at different rates for different purposes. The purpose of the present invention will be to manage energy for and within an electronic system (of a readily-available and readily-constructed type) sufficiently well so as to permit the electronic system to function normally, and operationally, and productively within an energy environment that provides only sparse and sporadic non-electrical sources of energy to the electronic system. This will be true even though the electronic system will accept and accommodate asynchronous demands that it should expend energy at a much greater rate and/or for a much longer time than can be accounted for by any reasonable energy budget based on a reasonable collection the environmental sources of non-electrical energy. In other words, energy management in accordance with the present invention will be directed to keeping an electronic system "alive" and reliably functional in the real world even though the real world is stingy, unreliable, and sporadic in its supply of energy while being capricious in its demands for such function(s) as the electronic system performs (with an attendant consumption of energy).

2.7 Irrigation Controllers and Valves would Desirably be Powered from their Environment Almost all existing irrigation systems are a.c. powered. Use of a.c. power increases the cost of installing both the controllers themselves and the hydraulic components of the irrigation system as well. Traditional controllers are normally either wall mounted—normally on an internal or external wall of a building—or else are pedestal mounted in the landscape. Wall mounted controllers offer the convenience of being located in a central location where there is a.c. power available. However, this central controller location often necessitates the costly installation of long wire runs to bring the required low-voltage wiring from the controller to the valves. Controllers are often specified to reduce the cost of installing wiring to the valves, but a trade-off exists in that the cost of trenching and laying a.c. conduit to supply power to these controllers can be high. In addition, the pedestals alone are expensive. In either case, extensive wiring underneath pavement or heavily used areas is costly to install, repair, replace, or extend to new landscape areas.

Many municipal ordinances require temporary irrigation, before building construction can begin, to stabilize newly graded slopes. Temporary a.c. power has to be installed at considerable cost just to supply power to the irrigation controllers, often long before the actual building development begins.

There are reliability problems associated with dependence on a.c. power. Existing irrigation control systems are often sensitive to power supply disruptions and line spikes. Power outages typically cause a.c. powered controllers to revert to default "backup" programs, and necessitate professional attention to reprogram the controllers. Line spikes and surges can also disrupt or even completely destroy controllers. To protect controllers from line spikes, expensive power conditioning equipment is often specified by designers of irrigation controllers. Effective protection can cost almost as much as the controller itself. Because irrigation controllers are often distributed and wired over broad landscape areas they are frequently effected by line spikes caused by electromagnetic pulse or electrostatic discharge due to lightning.

An additional problem with existing controllers and common twenty-four volt alternating current (24 v.a.c.) valves is that the buried control wires are "ground referenced" and tend to pick up large "ground currents", particularly near power transmission lines. These induced currents have basically the same damaging effects as a.c. power line spikes.

The regulatory environment for the a.c. wiring of irrigation control is tightening. The National Electric Code requires any electrical wiring which is connected to a.c.

power mains, and which might come into contact with water or plumbing, to be restricted to 15 volts or less. Presently, nearly all solenoid actuated diaphragm valves operate on 24 volts, so that existing equipment does not comply with this standard. Furthermore, changing to 12 volt solenoids would require more than twice the current to operate valves and hence would demand heavier, more costly, wiring and other components.

The cost of labor and materials in wiring a.c. power to the controllers of an irrigation system is a considerable portion of the overall system cost. For the example of an integrated multi-station irrigation control system for a large residential complex the wiring costs might amount to about 63% of total irrigation system installation cost.

If the irrigation controllers were self-energized, and did not require a.c. power, then they could be located closer to the valves, and the length of low voltage wiring from the dispersed self-energized controllers to the valves would be much reduced. The contractor's wiring costs for the same installation might then be reduced by up to 85%. There is thus a very great cost savings if a.c. wiring could be eliminated in an irrigation control system. If the costs of controllers and valves remained the same (which is by no means certain) then the overall irrigation system installation cost might decrease by up to 54% (i.e., 63%×85%).

2.7.1 Irrigation Controllers and Valves Typically Require a Remote, Alternating Current, Supply of Power because of their Energy and Power Use A typical solenoid-actuated diaphragm valve, of which many tens or hundreds are typically used in an irrigation system, draws about 0.25 ampere continuous current at 24 v.a.c., or continuously dissipates about 6 watts. These solenoid-actuated valves are driven by electronic or electro-mechanical controllers. Because of the heavy power consumption of the solenoids, these systems are typically connected to a.c. power.

Latching solenoid-actuated diaphragm valves are available that draw current for a lesser time duration only upon opening and closing (latching and unlatching). Although these latching solenoid valves are generally more expensive, more complex, and more failure prone, they do reduce total system energy requirements. However, an irrigation system using latching solenoid valves still typically requires about 6 watts instantaneous power upon each occasion of a valve actuation.

An electronic irrigation controller of the type typically used in an irrigation system to typically control a number of irrigation stations or valves typically continuously dissipates about 0.5 amperes current at 120 v.a.c., or 60 watts. The power requirements of an efficient, modern, irrigation control system having a controller and eight typical solenoid valves will thus be recognized to be on the order of 66 watts when driving a valve.

Although a 24 hour per day 365 day per year usage of between 60 and 66 watts electrical power is not an insignificant cost in operating an irrigation system, it is the initial installation costs of an a.c. powered versus a self-energized irrigation system that is a primary problem helped by an environmentally-powered irrigation controller using an energy management system in accordance with the present invention.

Technological problems exist in realizing a self-energized irrigation system that alleviates any need for the remote supply of power, typically a.c. power. These problems have been discussed, and are recapitulated in the following section. To some extent these problems are a function of the power consumed in an irrigation system. Therefore it is useful to estimate the probable energy consumption of an irrigation system that could be constructed with existing technology so as to be very energy efficient. Typical low energy latching solenoid valves require about 24 vdc, 200 ma for 100 msec to change state. An irrigation controller constructed of low-power complementary Metal Oxide Semiconductor (CMOS), Medium Scale Integrated (MSI) and Large Scale Integrated (LSI) circuit technology might use about 200 chips. Such a low power irrigation controller might be built to consume less than 0.01 watts, or 240 milliwatt hours per day. On this power the controller would do sufficient calculation, and would execute an irrigation schedule, that would be sufficient to cycle one or more irrigation valves about 128 total times for all valves. Each of these valve cycles would consume about 480 milliwatt seconds or 0.13 milliwatt hours. The total 128 valve cycles would thus consume about 17 milliwatt hours. The energy budget for a very, very low power custom irrigation system would thus be on the order of 257 milliwatt hours per day, plus losses. This is on the order of 5000 times less than the 1440 watt hours that a conventional controller might use daily. It will be discussed in the following sections how difficult it is to meet even this modest energy budget.

2.7.2 Batteries Can Meet the Power and Energy Requirements for Irrigation Control Systems, but Present Problems Batteries suffice to meet both the power and energy requirements of irrigation control systems. A battery has a low internal resistance, and can typically easily supply the 200 ma of current needed for a short time (about 100 msec) by a latching solenoid valve. The total energy consumption of energy-efficient irrigation systems may also be satisfied by batteries. At least one previous battery-powered irrigation controller exists in the market circa 1988. It uses four standard 6 volt lantern batteries.

Dry cell batteries have proven unreliable to meet the power demands of irrigation control. The battery is in an outdoor enclosure, and is subject to all prevailing climatic extremes of heat, cold, and humidity. The precise longevity of the battery, which is in part based on its intermittent power drain for controlling the switching of irrigation valves, is difficult to calculate. The batteries typically require replacement bimonthly or sooner. Even when often replaced (at considerable cost) the batteries are prone to deteriorate without warning to a condition inadequate to power the irrigation system. Because great damage to vegetation due to under-watering can quickly accrue, especially during hot weather, the failure of an irrigation system due to battery power failure is a highly detrimental occurrence.

2.7.3 Batteries Rechargeable by Solar Arrays can Power Irrigation Control Systems, but Present Problems In response to the high expense, frequent periodic service requirement, and unreliability of using dry cell batteries to power irrigation control systems, at least one solar-powered irrigation control system has been attempted. Wet cell batteries that are approximately the size and power storage capacity of automotive batteries are used in the system. These batteries exhibit a significant charge leakage, or self-discharge rate, even if no energy is drained to power the irrigation control system. The batteries must power a typical irrigation controller that controls 8 latching solenoid valves that are collectively actuated up to 128 total cycles daily. In order to satisfy the leakage and consumed energy requirements a solar array of many square feet, typically at least six square feet (6 ft$^2$), would be required to collect adequate solar power. A solar array this large is expensive, challenging to install and to guard against physical damage, and ungainly in appearance. It is unsuitable for most commercial and residential irrigation applications.

The wet cell batteries, although exhibiting a greater longevity than dry cell batteries, have a relatively short lifetime of months or years. They are expensive and cumbersome to replace. They may be unsafe in some applications where electrolyte leakage could be hazardous to plant or animal life.

2.7.4 Carbon Paste Electrode Electrolytic Capacitors can Store Appreciable Energy, but Cannot Discharge High Power Per Unit Time Capacitors are a known means of storing electrical charge, or power. Relatively new high performance electrolytic capacitors based on carbon paste electrodes store large electrical charges. One such capacitor is the subject of U.S. Pat. No. 3,536,963.

These high performance, or "super", capacitors can be ranked as devices between a battery and a conventional capacitor. It is known to use these super capacitors as back up power sources in systems with microcomputers and/or CMOS memories.

Unfortunately, super capacitors are not practical to power conventional irrigation systems including controllers and valves. An array of many tens or hundreds of these super capacitors, each of which is relatively more expensive than a battery, would typically be required to store adequate power. An array this large exhibits significant leakage. Such leakage would require a similar, relatively large, solar energy collection array as would be required to keep wet cell batteries charged.

Finally, super capacitors have high equivalent series resistance (ESR), and are accordingly limited in the amount of power that each can deliver per unit time. Although considerate total power can be extracted from many tens, or hundreds of these super capacitors in a parallel array, just a few super capacitors are typically unable to provide adequate current flow so as to actuate a low-power latching solenoid valve.

These cost and electrical current limitations of super capacitors are not unique to their prospective use in rechargeable power sources for conventional irrigation systems. Although these super capacitors exhibit unique properties, their prior application in temporary backup power sources to digital logic devices has required that they should be initially charged by a device power supply that is typically a.c. powered.

2.8 No Matter what Kind of Energy Source is used for an Environmentally-Energized Irrigation System, the Source Incurs Severe Problems in According Sufficient Energy Storage Capacity so as to Accommodate Asynchronously-Occurring User Communication, and to Act Upon any Commands Resultant from this Communication An energy source for a environmentally-energized irrigation system would normally be designed to supply all normal, quiescent, energy requirements of the system. If the energy source was to be sunshine, or light, then the energy collection and storage capacity should be sufficient to maintain the system in operation during periods of night, successive cloudy days, etc.

As previously explained in section 2.3, an environmentally-energized irrigation system must countenance the asynchronous arrival, night or day, of a user-maintainer of the system. The user-maintainer may proceed to communicate with the irrigation controller, cycle the irrigation valves, and/or initiate an irrigation schedule that may call for numerous immediate cycles of the valves. Each of these activities is individually difficult to budget and to satisfy with necessary energies. If the energy storage within an irrigation controller or system must power the communication of the system then it must store much more energy than would be needed for quiescent operation.

Yet asynchronously-occurring communication demands on an irrigation system by a user-maintainer are completely routine, and are to be expected. These demands place a great, essentially un-quantified and uncontrolled, demand on the energy storage capacity of any environmentally-energized irrigation system. Even when the system energy storage is of adequate capacity to meet these demands temporarily, as is normally the case with batteries, it is very common that a user-maintainer's communication with the system will seriously deplete or exhaust the energy storage of the system.

This is especially true if the user-maintainer exercises the system by causing cycling of the irrigation valves. All too commonly such an exercise and validation of an environmentally-energized irrigation system will so exhaust the power storage of the system so as to induce a power outage, and system failure, immediately or shortly after termination of the exercise and operational validation.

Still another problem occurs if the user-maintainer sets up a new irrigation control schedule. A rechargeable self-contained energy storage device, such as a battery recharged by solar power, may have exhausted its day's energy budget in performance of irrigation control and be awaiting recharge prior to again controlling the same diurnal cycle of irrigation. A user-maintainer may set up a new irrigation schedule, while the energy source device is depleted, that calls for an immediate energy drain. This energy drain will occur before the energy storage device may be, in due course, recharged. It is thus not sufficient that an environmentally-energized irrigation system should avoid unbudgeted energy losses during communication with, or exercise by, a maintainer-user. Rather, the system's energy source must be, for certain scenarios, left with more energy storage after communication than before!

Accordingly, no matter how energy-efficient an irrigation system is, and no matter how generously over-designed is its energy storage capacity, no environmentally-powered irrigation system is likely to store sufficient energy so as to permit that an unscheduled energy drain of significant magnitude may occur asynchronously with normal system power usage for the conduct of irrigation.

SUMMARY OF THE INVENTION

1. Graceful Energization

The present invention contemplates an electronic device powered from a source of energy and accruing energy from the source so as to progress, over time, from an inoperative unpowered to an operative powered condition in an orderly manner. The progression is positively controlled, meaning that there is never any ambiguity or uncertainty regarding the power status of the device regardless that the device should, from time to time and at times, be totally devoid of energy, and regardless that the device should accrue energy only but exceedingly slowly over periods of days, weeks and longer. The device may be, for example, a light energized irrigation controller.

One strategy of the present invention for realizing the gracefully-energizing electronic device is to employ a circuit which serves to monitor the status of the accrued energy, and power, that is made from an electrical circuit technology that is reliably operative at a relatively low voltage level. Meanwhile, other electrical circuits of the electronic device, which circuits perform useful work, are operative only at a relatively higher voltage level. The energy-monitoring circuit is typically made from BICMOS technology whereas the other, work-performing, electrical circuits are typically made from CMOS technology. When power is marginal the low-operational-voltage energy monitoring circuit reliably produces one or more status signals well before the other, higher-operational-voltage, circuits even commence to operate. When, with increasing accrued power, the higher-operational-voltage work-performing circuits ultimately commence to operate then the extent, and nature, of their power-consuming operations are predicated on status signals already in existence.

The work-performing circuits preferably include a microprocessor. Preferably at least two, and more preferably three, status signals positively control the microprocessor (that has become operative with increasing device energy) in the conditions of very-low, low and, preferably full—not adequate but full—device energy balances. The microprocessor performs housekeeping, including the recognition of real time, at minimal energy expenditure when a very-low-energy balance is achieved, and for the duration thereof. The microprocessor performs most normal system tasks, including the control of irrigation if the electronic device is an irrigation controller, at nominal energy expenditure when a low-energy balance is achieved, and for the duration thereof. However, the special task of communication is not only energy intensive to the microprocessor, but, as conducted with a human operator/maintainer through a display and maintenance panel, is essentially unbounded in its energy requirement. The microprocessor will accordingly perform communication, at whatever energy expenditure is required, only when a full energy balance is achieved, and maintained by the constant provision of supplemental energy to the electronic device.

2. Graceful De-Energization

The present invention further contemplates, as the substantial converse of the graceful energization, a gracefully de-energizing electronic device. The gracefully de-energizing electronic device does not have, in particular, the luxury of an energy reserve so great as will permit it to postpone a "wrap-up" of all power-consuming tasks until, an energy deficit being detected, a curtailment, or even a shutdown, is probable or even imminent. Instead, the electronic device gracefully de-energizes progressively, in stages.

The gracefully de-energizing electronic device may be, for example, a microprocessor-based irrigation controller that is powered from a limited source of energy that accrues energy from such source for controlling the opening and the closing of electrical irrigation valves, The irrigation controller degrades gracefully in its operation, closing all controlled irrigation valves when the accrued energy falls so low that, but for an orderly de-energization, reliable continuing control of the valves would be hazarded. Its microprocessor does not stop, but does revert to housekeeping at minimal energy consumption. This occurs upon the same low energy balance, and low-energy status signal, that is otherwise used during increasing energy balances. Similarly, a decline in energy balances resulting in the same very-low-energy status signal that is alternatively, and otherwise, developed during increasing energy balances causes the microprocessor to, after such a small delay as permits the logging of final data, suspend even housekeeping, and to assume dormancy. The microprocessor, may, or may not, thereafter loose all power depending upon changes in system energy. If the microprocessor ultimately loses all power then it will, in accordance with the principles of the present invention for graceful energization, still re-assume operability should system energy balances ever again so permit.

Just as with the graceful energization, the graceful degradation is positively controlled, meaning that there is never any ambiguity or uncertainty regarding the power status of the irrigation controller nor of the electrical irrigation valves. This is the case regardless that the irrigation controller should, from time to time and incipiently at times, cease to receive absolutely any energy of any nature whatsoever from any-source; regardless that the irrigation controller should have been or should in the future be supplied energy only but slowly, sporadically, inconsistently in amount and in duration, and/or inadequately over periods of days, weeks and longer; and regardless that the irrigation controller may, at the very instant that its accrued energy reserves fall to a low (or to a very low) level, not be receiving any energy at all.

One strategy of the present invention for realizing the gracefully-de-energizing irrigation controller is to monitor the stored (accrued) energy reserves so as to produce multiple successive status signals in the event of a continuing deterioration of these reserves. Functional sections of the irrigation controller respond to the successive status signals by progressively successively terminating and suspending operations, including but not limited to the closing of irrigation valves, in an orderly manner.

These and other aspects of the present invention are directed to making an electronic device operate, and operate successfully coherently, upon all such times that it can accrue adequate energy for its operation, so operating again and again and again if necessary. Particularly if the electronic device receives its energy from sources of power in the environment—such as light illumination or temperature changes or pressure changes—and if the electronic device is sophisticated—such as an irrigation controller controlling (with its own energy) multiple, potentially large (i.e, to 3 and more inches) electric irrigation valves that gate high pressure water (i.e., to 150 and more p.s.i.)(pressurized by another energy source)—such an "eternal" operation can appear bizarre, and beyond normal ken. Operation may be suspended, but as soon as energy becomes, or again becomes, available then operation will recommence as soon as adequate energy is accrued. For example, in the case of a light-energized irrigation controller irrigation control will recommence after the controller has spent months under winter snows, or after weeks under flood waters. The irrigation controller, which is actually a small special purpose computer, will theoretically work forever, or at least until its mechanical or electrical integrity is violated or its components fail.

3. A Specific Gracefully-Energizing Electronic Device

In accordance with the first aspect of the present invention, an electrical device that is powered from a source of energy accrues energy from the source so as to progress, over time, from an inoperative un-powered to an operative powered condition.

The device includes a storage-and-supply electrical circuit for receiving and for storing energy from the source of energy, and for producing an unregulated electrical supply voltage that increases proportionately to the amount of energy stored. This storage-and-supply circuit typically includes an electrical generator for producing electrical energy from a non-electrical source of energy, including from such a non-electrical-source of energy in the environment of the device; for example, incident light energy. The electrical generator using light energy is preferably a photovoltaic module. The storage-and-supply circuit typically also includes, as storage means for storing the electrical energy produced by the electrical generator, a capacitor, and more particularly two pair of supercapacitors.

A voltage regulator receives the unregulated supply voltage from the storage-and-supply circuit and produces therefrom a regulated electrical supply voltage.

A power monitor circuit receives the unregulated supply voltage from the storage-and-supply circuit. This power monitor circuit remains dormant, no matter how long, until such time, if ever, as the unregulated supply voltage reaches a first voltage level. It then internally assumes a reset condition. It maintains this reset condition during a period, howsoever long, between the time that the unregulated supply voltage reaches the first voltage level and when, if ever, the unregulated supply voltage reaches a second voltage level greater than the first voltage level. At such time the internal reset condition is dropped.

The power monitor circuit then produces a logic true condition of a very-low-voltage status signal, which signal condition means that unregulated supply voltage is at a very low level. This very-low-voltage status signal is continually produced during a period, howsoever long, between the time that the unregulated supply voltage reaches the second voltage level and a time, if ever, that it reaches a third voltage level greater than the second voltage level. At this time the very-low-voltage status signal assumes the logic false condition.

The power monitor circuit further produces a logic true condition of a low-voltage status signal, which signal condition means that unregulated supply voltage is at a low level. This low-voltage status signal is produced during a period, howsoever long, at least between the time that the unregulated supply voltage reaches the third voltage level and a time, if ever, that it reaches a fourth voltage level greater than the third voltage level. At this time the low-voltage status signal assumes the logic false condition.

Another, functional, circuit is operative at a relatively higher voltage than is the power monitor circuit. The functional circuit receives the regulated supply voltage from the voltage regulator, and also the very-low-voltage and the low-voltage status signals from the power monitor circuit.

The functional circuit remains dormant until the received regulated supply voltage reaches a voltage level greater than the second voltage level but less than the fourth voltage level. At this time sufficient operability is achieved so that the conditions of the status signals are regarded.

If the now-operative functional circuit detects the very-low-voltage status signal is in the logic true condition, which necessarily means that the low-voltage status signal is also in the logic true condition, then it simply waits, forebearing to do anything that would consume more than minimum power. However, if the very-low-voltage status signal is in the logic false condition while the low-voltage status signal is in the logic true condition, then the functional circuit performs limited housekeeping operations (only). In so doing it consumes but slight power. However, if both the very-low-voltage and the low-voltage status signals are in the logic false condition, then the functional circuit performs regular functional operations, and consumes during the course of so doing all such power as the performed operations require.

For example, consider the case where the electronic device is an irrigation controller. In this case the functional circuit might include, inter alia, a microprocessor running a firmware program stored in both a Read Only Memory (ROM) and, during execution, in a Random Access Memory (RAM), in order to control the opening and the closing of electrical irrigation valves. In accordance with the operation of the electronic device the functional circuit, or microprocessor, would, although operatively powered, not even commence to do "limited housekeeping operations", for example checking status and time, until the unregulated supply voltage, indicative of the stored energy, exceeded a very low voltage threshold. The microprocessor would, in particular, not attempt to communicate with the RAM or ROM, which communication would be unreliable as well as wasteful of energy. The functional circuit, or microprocessor, would not commence "regular functional operations", for example the control of irrigation valves, until the unregulated supply voltage, indicative of the stored energy, exceeded a low voltage threshold. In order to perform regular functional operations the microprocessor communicates with the RAM for, if necessary, the loading of the irrigation control program from the ROM, for the execution of the irrigation control program as stored in, and read from, the RAM.

"Regular functional operations" need not, and do not, include all the operations of which the gracefully-energizing electronic device is at any time capable. Namely, and as is explained in the aforementioned companion patent application for an ENERGY MANAGEMENT SYSTEM, PARTICULARLY FOR ELECTRONICS MICROPOWERED BY LOW-LEVEL SOURCES OF ENERGY IN THE ENVIRONMENT, any device that operates on limited accrued energy can be exhausted of its energy reserves, howsoever great, by the simple expedient of demanding that the device communicate information. (Information has an energy cost even under the laws of thermodynamics.)

Accordingly, the present invention still further contemplates that the power monitor circuit should further producing a logic true condition of a not-fully-charged status signal. This signal condition is indicative that unregulated supply voltage is at less than a predetermined fifth voltage level (which level is greater than the fourth voltage level), and is produced during a period, howsoever long, between the time that the unregulated supply voltage reaches the fourth voltage level and it reaches the fifth voltage level. At this time the not-fully-charged status signal assumes the logic false condition. The functional circuit also receives this not-fully-charged status signal. It performs—when both the very-low-voltage and the low-voltage status signals are in the logic false condition—less than the entirety of functional operations of which it is capable of performing. The functional circuit only performs all such operations as it is at any time capable of performing only upon any such times as the not-fully-charged status signal assumes the logic false condition.

For example, in the case of the irrigation controller, the functional operations performed that are less that the entirety of which the functional circuit means may perform include the opening and the closing of electrical irrigation valves. However, the operation of communication with an operator/user through a display and keyboard is excluded.

The power monitor circuit of the electronic device is typically made from BICMOS technology whereas the functional circuit—which is operative at a relatively higher voltage than is the power monitor circuit—is typically made from CMOS technology.

4. A Specific Gracefully De-Energizing Electronic Device

A preferred embodiment of a gracefully de-energizing electronic device in accordance with the present invention is an irrigation controller. The irrigation controller is powered from a source of energy, and accrues energy from such source for controlling the opening and the closing of electrical irrigation valves. The irrigation controller must, and does, degrade gracefully in its operation, closing all controlled irrigation valves, when its accrued energy falls so low that reliable continuing control of the valves is hazarded.

The operationally gracefully degrading irrigation controller includes a storage-and-supply circuit for receiving and for storing energy from the source of energy, and for producing an unregulated electrical supply voltage that increases proportionately to the amount of energy stored.

A voltage regulator receives the unregulated supply voltage from the storage-and-supply circuit and produces therefrom a regulated electrical supply voltage.

A power monitor circuit receives the unregulated supply voltage from the storage-and-supply circuit. It produces a logic false condition of a low-voltage status signal, which condition indicates that supply voltage is at a low voltage level, and also a logic false condition of a very-low-voltage status signal, which condition indicates that supply voltage is at a very low voltage level, when and upon such times as the supply voltage is sensed to be at neither a low, nor a very low, voltage level and is, consequently and by definition, at a normal voltage level.

The low-voltage status signal is, however, changed to the logic true condition if and upon such times as the supply voltage is sensed to fall below a first voltage level. Moreover, the very-low-voltage status signal is also changed to the logic true condition if and upon such times as the supply voltage is sensed to fall below a second voltage level less than the first voltage level.

The power monitor circuit, quite naturally and inevitably, becomes dormant if the supply voltage falls below a third voltage level less than the second voltage level.

Meanwhile, a functional circuit receives the regulated supply voltage from the storage-and-supply circuit and the low-voltage and very-low-voltage status signals from the monitor circuit. If and upon such times as both the first and the second voltage status signals are in the logic false condition, the functional circuit performs functional operations, consuming during the course of so doing all such power as the performed operations require.

However, if and upon such times as the very-low-voltage status signal is in the logic false condition but the low-voltage, status signal is in the logic true condition, the functional circuit turns off all controlled valves and thereafter performs only housekeeping operations while consuming but slight power. Finally, if and incipiently upon such times as the very-low-voltage, status signal assumes the logic true condition—which necessarily means that the low-voltage status signal is also in the logic true condition—the functional circuit continues performing its housekeeping operations for a short predetermined period of time. The housekeeping operations include the detection of the logic true condition of the very-low-voltage status signal, and, resultant thereto, the taking of final action(s) in advance of shutdown. The predetermined period time having elapsed, the functional circuit goes into a hold state, and simply waits, while forebearing to perform operations, in order to consume minimum power. A real time clock is still maintained.

Finally, if and upon such times as the regulated supply voltage received from the storage-and-supply circuit becomes inadequate for maintenance of the hold state, the functional circuit simply falls dormant.

By this operation the irrigation controller curtails its further control of irrigation valves, leaving the valves in a proper off condition, after a low voltage condition is sensed. At this time there is still adequate stored energy to reliably do so. Moreover, the irrigation controller shuts down in an orderly manner during a short grace period after a very low voltage condition is sensed.

These and other aspects and attributes of the present invention will become increasingly clear upon reference to the following drawings and accompanying specification.

DETAILED DESCRIPTION OF THE INVENTION

Figure 1:
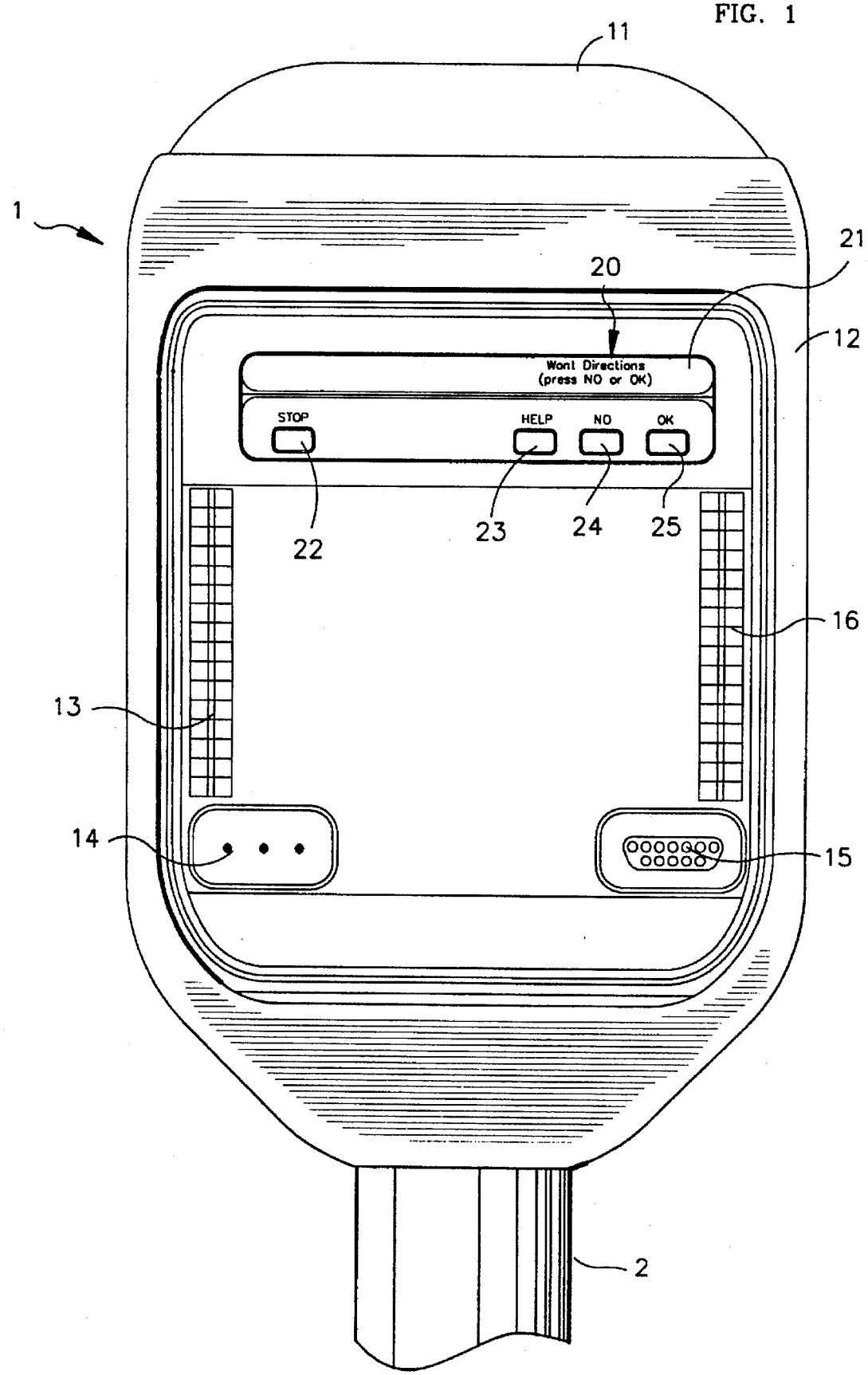
FIG. 1 is a pictorial diagram of a device having, and performing, graceful energization and de-energization in accordance with the present invention, namely an irrigation controller.

1.0 The General Energy Management System of the Invention

The present invention concerns the accumulation and use of power and energy, particularly in electronic systems that are powered, at least in part, from non-electrical sources of power in the environment. Electrical power derived from the environment is generally weak, sporadic and/or unreliable in relation to the overall power requirements of an electronic system (whatsoever their absolute magnitude). Such environmental power sources include, for example, photoconversion of incident light, when such light is available, into electricity. Such a photoelectric power source is typically weak relative to overall system requirements because it must typically be physically large and economically expensive relative to other system components in order to supply even modest power (relative to system requirements). Such a photoelectric power source is sporadic and unreliable because of the uncertain availability, and intensity, of ambient light illumination.

An environmental power source, howsoever "weak", must by definition, be adequate, when averaged over an indefinitely long time period, to power the useful work of the electronic device if the electronic device is to be considered "environmentally powered". The electronic device must accumulate the energy that it receives, and must become operative only when, and if, sufficient energy reserves are accumulated. The electronic device should not deplete its energy reserves in monitoring the adequacy of such reserves to support operation(s) by more than the energy received.

Still another challenge is presented. Even when sufficient energy for operation is accumulated, a weak, environmental, source of power is generally manifestly unable to reliably satisfy any and all asynchronous operational demands that may be made upon the electronic device. These asynchronous demands typically require the electronic device to consume power at an accelerated rate in order to perform, for the arbitrary duration of the interval of the demand, commensurately more useful work.

Foremost among the asynchronous demands that are commonly made of an electronic device are demands that the device should communicate. Although visual, or optical, communication such as is typical of a clock, or of the display of an electronic system, may transpire at but a modest energy cost, the energy requirements of communication are, if not unbounded, typically poorly subject to being quantitatively predicted—especially if a human is at the receiving end of a communication link. Dependent upon how precise, timely, accurate, focused, astute, knowledgeable, and/or comprehensive a human is in his/her (typically) informational demands on the electronic device, the device may have to communicate indeterminate amounts of data indeterminate numbers of times during intervals of indeterminate length.

According to poorly quantitatively predictable power usage arising from asynchronous demands for communication, and other activities, an environmentally-powered electronic device may, form time to time and at times, be electrically connected to another, relatively strong, source of energy than the energy received from the environment. Such a relatively strong source of power is, for example, a battery.

The present invention contemplates establishing priorities for the conduct of operations, and the attendant the consumption of power. If available, power from the relatively strong, battery, source of power is used first, and ahead of power from the relatively weaker, environmental, source of power. Availability of this source of power solves all concerns, and the device may perform all operations, including communications, of which it is at any times capable. More precisely, the very activity—nominally communication—that requires the relatively strong power source is not permitted to transpire until, and unless, this (charged, enabled) power source is present and connected. Moreover, the connection of the strong power source actually initiates that activity—communication—which requires the relatively greater rate of power consumption. Accordingly, the connection of the relatively strong power source is the (i) necessary, (ii) adequate, and (iii) causative condition of the performance of the communication activity with its attendant relatively greater power consumption.

However, most normally the relatively strong, battery, power and energy source will not be available, nor will it become available. Communication (only) is thus, of course, precluded. However, energy form the weaker, environmental, source of power is accumulated and stored until successively more and more operations, with their attendant power consumption, can be performed.

Energy from the environmental power source is stored in a power store—normally supercapacitors. In the rare occasions when the relatively strong, battery, source of power becomes available, then this source is drained to charge the energy store.

1.1 A Particular Energy Management System of the Invention

An exemplary electronic device, or system, in accordance with the present invention is an irrigation system that includes an electronic irrigation controller and electrically-actuated valves. The controller, at different times, (i) performs irrigation control and (ii) communicates, either directly or indirectly through an interface, with a user/programmer of the irrigation system.

A light-energized first power source supplies all necessary energy to the irrigation system for its function of irrigation. This first power source includes photovoltaic devices for converting light to electricity and high performance capacitors for energy storage during periods of darkness.

A second power source supplies all necessary energy to the irrigation controller of the irrigation system for its communication function. This second power source is portable, and is typically a battery. The battery is transported to the irrigation controller and electrically connected thereto in order to initiate, as well as to power, communication of the controller with a user/programmer. This communication may either transpire directly though a man/machine interface provided by local control panel, or indirectly through a communications link provided by an I/O port of custom design.

The irrigation control that is powered by the light-energized first power source typically requires less power per unit time than the user communication that is powered by the portable second power source. This is the case whether or not the user communication transpires through a man/machine interface by the display of messages and the receipt of switch actuations, or through an I/O channel by the communication of electrical signals. The communication typically takes more power and energy not only because of its requirement to drive a display or transmit an electrical signal, which each require energy, but because the control of irrigation will, in accordance with a further aspect of the present invention to be later explained, require so little power and energy.

Accordingly, the present invention contemplates supplying power from the portable second power source to keep the controller "up" and communicating, when most power is needed, and from a light-energized first power source at other times. The dilemma of needing to asynchronously communicate day or night with a power-budgeted electrical system, such as an irrigation controller, having limited power reserves is thereby solved. This is because the initiation of communication inherently brings with it the necessary power to conduct the communication.

Moreover, further in accordance with the present invention, the energy storage capacitors of the first power source are charged by the battery of the second power source. This means that each communication undertaken with the irrigation controller leaves the first power source fully charged and capable of powering subsequent irrigation control, even irrigation control that must commence at night or after the system had previously been subject to a period of disuse and discharge. The second power source not only satisfies the power requirements for communication but always leaves the irrigation system ready to function to the utmost of its first power source storage capacity.

The present invention still further contemplates a new type of power source that stores energy that is derived from light as electrical charge on a capacitor, and particularly on a high performance capacitor. A photovoltaic power source produces voltage in the presence of light energy. A capacitor is diode-connected across the photovoltaic power source. The capacitor accumulates electrical charge from the voltage developed by the photovoltaic power source. A voltage sensor connected across the capacitor produces a control signal when the charge upon the capacitor exceeds a predetermined reference level. A delay circuit receives the control signal and delays it in time in order to produce a delayed control signal. A controllable electrical shunt circuit connected across the photovoltaic power source short circuits the voltage produced by the photovoltaic power source selectively during receipt of the delayed control signal.

The first power source's capacitors are typically of an electric double layer type that store electrical charge at an interface by an electric field between two available phases. One phase is typically activated carbon, and the other phase is an ionically conducting electrolyte, typically sulfuric acid solution. Such capacitor type is commonly called a high performance, or "super", capacitor, and is capable of storing large energies. Four such super capacitors each of 1 farads capacitance are used within the preferred embodiment of the first power source. The capacitors can store in combination about 23 joules=23 watt seconds=6.5 MWH of electrical energy.

Meanwhile, the photovoltaic power source typically produce 35 ma at 10 v.d.c., or 350 milliwatts, at one sun light level from an extremely modest size collector area of 18 square inches. This power production is significantly derated for dim light due to overcast weather or a poor site, northern latitudes, transmission losses through a transparent cover that may become dirty, and during hours of darkness. Under worse case light levels and poor site conditions the photovoltaic power source produces 7.6 MWH of energy daily.

The energy storage and production capacities of the preferred embodiment of the first power source present an extremely challenging energy and power budget for even the quiescent, non-communication, control of an irrigation system.

In accordance with the present invention, this challenge is met. In accordance with the present invention, the irrigation controller is fully "awake" and operating to control irrigation stations only for very short periods of time, on the order of fractions of a second, at typically long time separations, on the order of minutes or hours. The controller is typically awake for 10 milliseconds every second. An elapsed time clock within the controller is constantly updated from a constant frequency source. The rest of the controller logic, consisting primarily of a microprocessor, is completely "dead", or static and inoperative. In this state the logic consumes virtually no power. An elapsed time clock is implemented in CMOS circuitry. It consumes extremely little power, typically much less than a digital watch that must also drive a display. The microprocessor and associated logic circuitry are preferably also implemented in CMOS logic, preferably as two Application Specific Integrated Circuits (ASICs). When so implemented, the entire controller consumes, on a 24 hour basis (of which day the controller is awake only an infinitesimal amount of time) no more energy than 6.4 milliwatt hours. On this energy budget the controller will calculate and execute an irrigation schedule that may control the cycling of one or more ultra-low power irrigation valves up to a total 128 cycles among all valves.

In order to perform communication the irrigation controller must be up and running, or "awake". This means, in the case of a microprocessor-based irrigation controller, that the microprocessor must operate at an acceptable duty cycle and clock rate commensurate with its computational responsibilities to manage communication. The irrigation scheduling and control task is computationally trivial by comparison.

The irrigation system that uses the present invention will preferably be implemented with ultra-low power valve actuators. Such actuators if used would consume on the order of 9.4 microwatt hours per cycle or 1.2 milliwatt hours daily in performing on the order of 128 actuation cycles. Such actuators if used would make the energy consumption of the entire irrigation system to be on the order of 7.6 milliwatt hours per day. This is the minimum power output from the photovoltaic module.

In accordance with the energy storage capacity of the preferred embodiment of the first power source, the self-energized irrigation controller can store enough energy to control 128 irrigation valve cycles without intervening recharge. In accordance with the energy collection capability of the preferred embodiment of the first power source, it can collect sufficient light energy for sustained operation by collection of the incident light falling upon approximately 18 square inches even in northern latitudes (e.g., Canada) on cloudy days. The light-energized first power source will even power the irrigation controller by bright moonlight.

The light energized irrigation controller in accordance with the present invention thus is vastly different from prior irrigation controllers and systems requiring a.c. power, large batteries, and/or large solar collectors. This light-energized quiescent operation is enabled in part because the operation of the controller for communication, drawing more power per unit time, is energized by the portable second, battery, power source. This light-energized quiescent operation is further enabled in part because the controllers active, "on", periods transpire only when and for such duration as is absolutely necessary, with almost all of the power-consuming portion of the controller remaining in a totally un-powered state for almost all of the time.

2.0 The Preferred Embodiment of the Invention is in a Light-Energized Irrigation Technology Controller The present invention is embodied in an 8-station light-energized irrigation controller. The irrigation controller is spoken of as being "light-energized" and (along with the irrigation valves that it controls) to embody "Light-Energized Irrigation Technology" (LEIT). This description is in lieu of describing, for example, the controller to be "solar powered" because it employs an extremely small area light (solar) collector. Resultant to the small energy collected, the controller uses extremely little energy for all irrigation functions, including control of up to eight (8) valves. The acronym LEIT when applied to irrigation controllers is a trademark of Solatrol, Inc. (assignee of the present invention), i.e., LEIT™ Irrigation Controllers.

2.1 Operational Specification of the Preferred Embodiment of an Irrigation Controller in Accordance with the Present Invention No electrical power input is required. Light energy required is 0.4 milliwatts/sq cm incident light for a minimum of 7 hrs/day. This is equivalent to one tenth of the amount of light at 55° northern latitude (e.g., in Canada) on a cloudy winter's day.

The power for the controller's display (when actuated) is derived from a POWERKEY™ (trademark of Solatrol, Inc.) power source. The POWERKEY™ power source packages a 9-volt alkaline battery that is used to energize the Liquid Crystal Display (LCD) of the controller during installation and programming.

The signal output of the controller to its controlled valves is 3.5 volts DC, 0.04 amps. No circuit breaker and no transformer are required.

Up to 8 valves (including up to 4 Master Valves) may be connected to each controller. Up to 8 electronic soil moisture sensors or optionally, other electronic sensing devices, may also be connected to each controller.

A user-defined emergency backup program and critical system parameters are stored in non-volatile memory in case of memory loss from prolonged light interruption; no batteries are needed.

2.2 The Preferred Embodiment of a LEIT™ Irrigation Controller Interfaces with Certain Optional Accessories The preferred embodiment of a LEIT Irrigation controller in accordance with the present invention interfaces to certain optional accessories and equipments.

A POWERKEY™ (trademark of Solatrol, Inc.) power source is a combination key ring and key fob-cased battery for powering the display during programing and/or interactive operation.

An optional Multiprogrammer™ unit plugs into the digital interface of the controller for uploading and downloading the watering programs for up to 64 controllers.

An optional WIRESCOPE™ (trademark of Solatrol, Inc.) unit is a hand-held diagnostic unit that checks for proper controller and valve operation from the valve station end of each station wire, and can optionally give an identifying readout of valve and sensor numbers by station and controller.

Up to 8 optional soil moisture sensor units can connect to the controller to give precise irrigation system control based on readings of available soil moisture tension, or optionally, percentage soil saturation.

An optional remote test command assembly is a replacement controller face-plate that receives signals from a hand-held transceiver in order to allow wireless remote "manual" operation of valves and sensors from the valve or sensor locations.

An optional radio-link central module mounts permanently below the controller and acts as a transceiver for wireless communication between the controller and a radio-link central system.

The POWERKEY™ power source is manually plugged to the controller in order to provide power to the controller for first use pre-charging, and during each occurrence of the programming/parameterization of the controller's operation and/or the reviewing of data in the controller's memory. In the latter two cases, the POWERKEY™ power source also provides built-in illumination of the controller's display and control switches. The power source during operation of the controller to control irrigation may be the POWERKEY™ power source if it is still plugged (an abnormal condition), but is normally light (even extremely dim light, such as moonlight) that falls upon the controller.

2.3 Features and Benefits of the Preferred Embodiment of a LEIT Irrigation Controller in Accordance with the Present Invention The preferred embodiment of an irrigation controller in accordance with the present invention is light-energized with a built-in incident light collector. It exhibits sufficient energy storage to drive a custom CMOS ultra-low-power microcomputer with 32K RAM memory and to cycle up to eight (8) ultra-low-power irrigation valves up to sixteen (16) times per twenty-four (24) hour period. This provides complete independence from any need for AC power, saving on energy and installation costs and permitting the controller to be located closer to the valves.

3.0 Overview

The preferred embodiment of an irrigation controller in accordance with the present invention uses Light Energized Irrigation Technology (LEIT™). It can operate with the amount of incident light available in northern latitudes on a worst-case cloudy winter's day without needing any of the batteries, external solar panels, or the A.C. power connections required for traditional controllers. It is also extremely flexible and versatile in its operation.

A diagrammatic view of a preferred embodiment of a controller 1, with its cover plate removed and an operator's panel area exposed, is shown in FIG. 1a. Controller 1 is typically attached to a post 2. An array of photovoltaic devices 10 (not shown) is located under transparent lid 11 to case 12.

Various electrical connectors are presented. A valve connector block 13 permits electrical connection by wires (not shown) to up to eight (8) electrically actuated valves. A control key socket 14 accepts a pluggable POWERKEY™ power source (not shown), being a 9 vdc battery suitably packaged so as to plug into socket 14. A digital accessory connector 15 permits communication connection to a multiprogramming unit (not shown) that may upload and download programs into the controller 1 (among other alternative ways of programming controller 1). The connector 15 is a standard type, and may, under firmware control within controller 1, interface to further devices. A sensor connector block 16 permits connection of up to eight (8) optional soil moisture sensors or other sensing devices. These soil moisture sensors, and the control proceeding therefrom, are not taught within this specification for being unimportant to the present invention.

A control panel 20 contains a liquid crystal display (LCD) 21 for showing information, questions, and directives. The control panel 20 also contains push button switches 22–25. A STOP switch 22 stops the present controller 1 operation and turns off any valves previously turned on. A HELP switch 23 causes the controller 1 to display more information and/or instructions, keyed to the current operation or displayed questions, in LCD 21. The NO switch 24 and the OK switch 25 are used to answer controller-presented questions about the installation and the parameters of irrigation (e.g., the watering schedule) and to enable selectable readout of controller stored data.

The controller 1 is controlled in its operation by firmware running on a special Application Specific Integrated Circuit (ASIC) that includes a microprocessor. The explanation of the controller 1 hardware is contained in major sections 3–5 of this specification. The firmware executed by controller 1 is attached as Appendix A to this specification. This major section 2 deals with the user interface to controller 1, and serves to show its many unique aspects in accordance with the present invention.

The term "programming" used throughout this specification includes actions performed at the operator interface to the controller 1—actions normally but not necessarily performed in the field—by which the controller 1 is parameterized and directed in its programmed operation. The firmware itself is, of course, also "programmed". In some cases the act of "programming" at the operator's panel will alter the flow, as well as the parameters used, within the firmware; thus constituting a form of "programming" at the process control level. The word "programming" is used to refer to the total compendium of operator/programmer interface to, and control of, irrigation controller 1. The word includes actions more exactingly thought of as parameterization (typically done in the field), as well as actions more exactingly thought of as coding (typically done in the factory or depot).

3.1 Overview of the Preferred Embodiment of an Irrigation System

Figure 2:
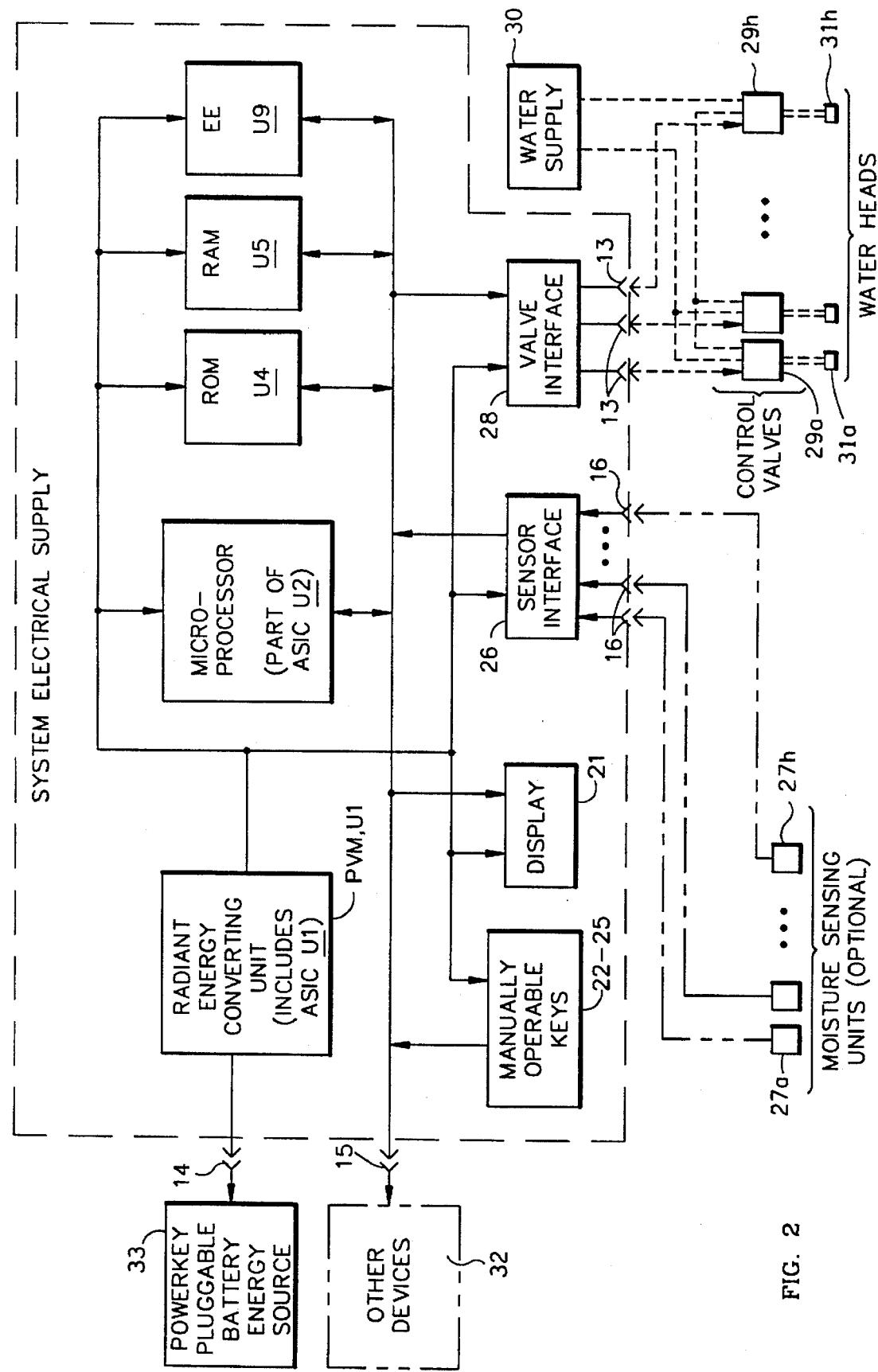
FIG. 2 is a block diagram of an irrigation system, including the irrigation controller previously seen in FIG. 1b, that performs the graceful energy transitions in accordance with the present invention.

A preferred embodiment of an irrigation control system in accordance with the present invention is shown in FIG. 2. An irrigation controller 1 (previously seen in FIG. 1) operates under control of MICROPROCESSOR U2 (partial) executing programmed firmware that is resident in memories types ROM U4, RAM U5, and EE U9. The MICROPROCESSOR U2 (partial) communicates with MANUALLY OPERABLE KEYS 22–25 (previously seen in FIG. 1) for receipt of data and control. It interfaces with DISPLAY 21 (previously seen in FIG. 21) for the display of questions, parameters, and help messages to a human user/programmer (as detailed in previous section 2.0).

The MICROPROCESSOR U2 (partial) of irrigation controller 1 optionally communicates externally through a SENSOR INTERFACE 26 of plug jack 16 (shown in FIG. 1) to up to eight MOISTURE SENSING UNITS (optional) 27a–27h (shown in phantom line). This optional communication is the purpose of sensing soil moisture at up to eight locations. The MICROPROCESSOR U2 (partial) communicates through VALVE INTERFACE 28 of plug jack 13 (shown in FIG. 1) to up to eight electromagnetically actuated CONTROL VALVES 29a–29h (shown in dashed lines). This communication is for the purpose of gating the flow of pressurized water from WATER SUPPLY 30 through a selected one of CONTROL VALVES 29a–29h at any one time to a corresponding one of WATERING HEADS 31a–31h (shown in dashed line).

The MICROPROCESSOR U2 (partial) may optionally communicate through plug jack 15 (shown in FIG. 1) to OTHER DEVICES 32 (shown in phantom line) for purposes of receiving the download of firmware programs, parameters, and/or commands. This interface need not be enabled to operate the irrigation controller 1, which in preferred embodiment comes from the factory with that control program that is contained within the appendix to this specification within its ROM memory U4 and EE memory U9, and which in the preferred embodiment may have all necessary parameters and control entered through MANUALLY OPERABLE KEYS 22–25. Indeed, if necessary firmware could be entered into controller 1 through it's MANUALLY OPERABLE KEYS 22–25. The digital interface to OTHER DEVICES 32 simply represents a less tedious way of communicating.

The preferred embodiment of the controller 1 normally derives all its power, and all power for MOISTURE SENSING UNITS 27a–27h and CONTROL VALUES 29a–29h, during quiescent operation both day and night from radiant light energy impinging upon RADIANT ENERGY CONVERTING UNIT (includes ASIC U1) that comprises each of PVM1, U1, and ASSOCIATED CIRCUITRY. "PVM" stands for photovoltaic module and "ASIC" stands for application specific integrated circuits. All "U" designations stand for integrated circuit chips that may be referenced in FIG. 3 (to be discussed).

The preferred embodiment of controller 1 is powered during its operation to accept user programming not by the RADIANT ENERGY CONVERTING UNIT PVM1, U1, and ASSOCIATED circuitry but rather by electrical connection through plug jack 14 (shown in FIG. 1) to the POWERKEY™ PLUGGABLE BATTERY ENERGY SOURCE 33. This SOURCE 33, normally not a part of irrigation controller 1 during its quiescent operation, is shown neither in shadow line for being optional, nor in dashed line for being related to the controller 1 of the present invention but not part thereof. Rather, the POWERKEY™ PLUGGABLE BATTERY ENERGY SOURCE is shown in solid line in order to illustrate that for the purposes of programming the controller in accordance with the present invention it must be present.

This required presence is because the SOURCE 33 supplies the greater power that the MICROPROCESSOR U2 (partial) needs to exit the predominantly somnolent (inactive) state that it only intermittently and momentarily leaves to effect irrigation control in accordance with the schedules, and to assume a high duty cycle at operation. The SOURCE 33 also supplies the power requirements of MANUALLY OPERABLE KEYS 22–25 and of DISPLAY 21 during user programming. Although the energy storage within the RADIANT ENERGY CONVERTING UNIT might suffice to permit user programming, it is unwise to deplete this energy storage to an undetermined amount (dependent on the length and adeptness of user programming)— especially at night when no energy recovery is possible and especially when the controller is programmed to immediately begin controlling irrigation cycles. Instead, the SOURCE 33 actually charges the energy storage means within the RADIANT ENERGY CONVERTING UNIT, and always leaves the controller 1 fully powered and ready to control irrigation of the end of a user programming sequence.

Figure 3:
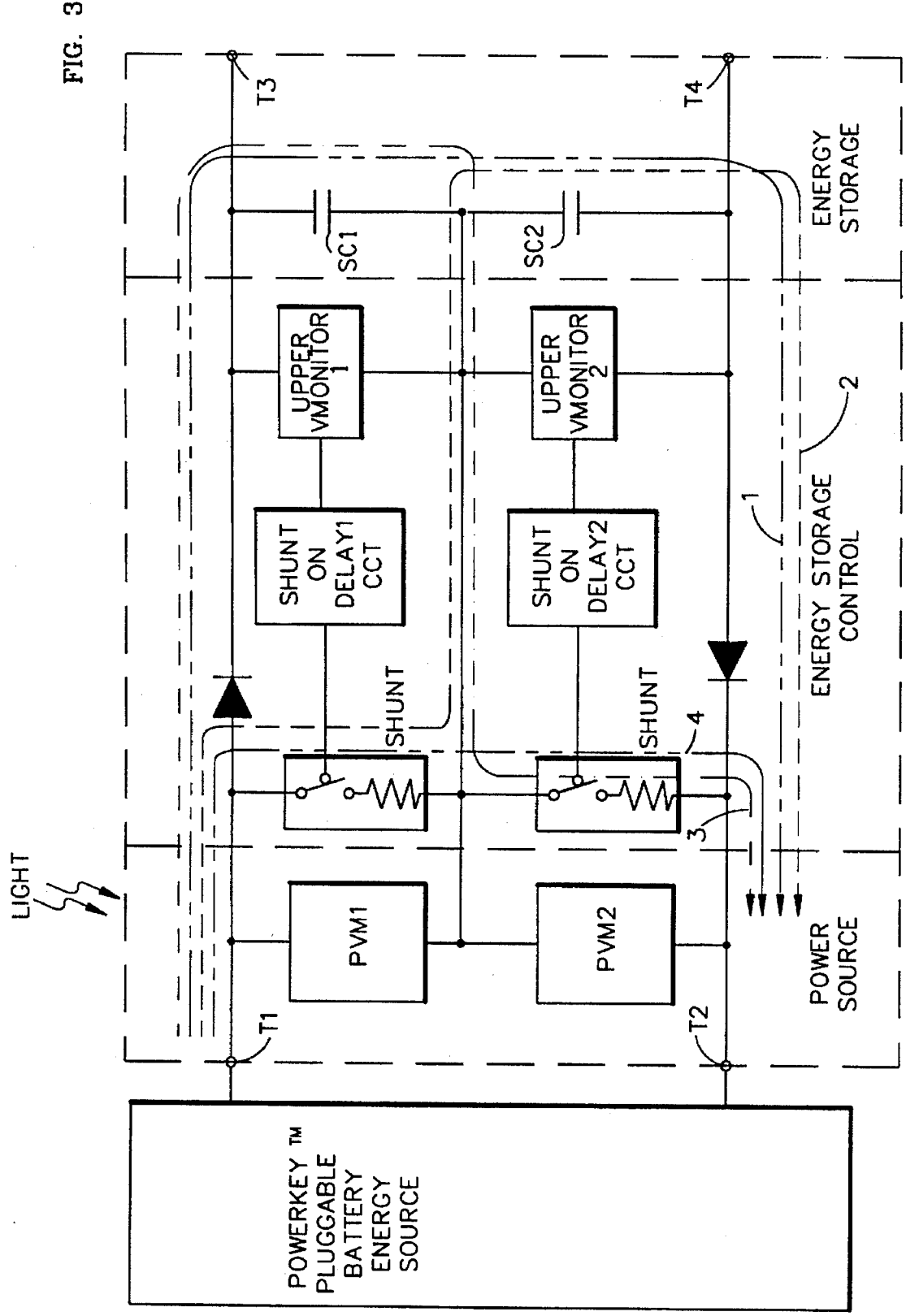
FIG. 3 is a first block diagram of first, photovoltaic, and second, battery, power sources for the irrigation controller that performs the graceful energy transitions of the present invention.

3.2 Basic Electrical Circuit for the Capacitor Storage of Energy from Light, and for Energy Management Within an Electronics Device Requiring at Times More Energy than is Stored An electrical circuit implementing the basic principles of the invention is shown in block diagram in FIG. 3. The RADIANT ENERGY CONVERTING CIRCUIT PVM, VI (previously seen in FIG. 2) consists of PHOTOVOLTAIC POWER SOURCE, ENERGY STORAGE CONTROL, and ENERGY STORAGE sections. A POWERKEY" PLUGGABLE BATTERY ENERGY SOURCE is selectively connected to terminals T1, T2 of circuit PVM, U1. When so connected it is in electrical parallel with the PHOTOVOLTAIC POWER SOURCE that consists of two series-connected photovoltaic modules PVM1, PVM2. The modules PVM1, PVM2 produce voltage from incident LIGHT ENERGY. Both the POWERKEY PLUGGABLE BATTERY ENERGY SOURCE and the PHOTOVOLTAIC POWER SOURCE act as power sources.

It should be envisioned that still other sources of electrical energy might complement the PHOTOVOLTAIC POWER SOURCE, and provide additional power when required to the irrigation controller 1, than a battery in the form of the POWERKEY PLUGGABLE BATTERY ENERGY SOURCE. The controller 1 might be temporarily connected to a d.c. power supply from an engine, or an a.c. wall outlet if available. A d.c. generator might generate power from flowing irrigation water. The controller might thus control the periodic generation of its own supplemental energy supply.

The energy derived from either the PHOTOVOLTAIC POWER SOURCE or the POWERKEY PLUGGABLE BATTERY ENERGY SOURCE is gated by the ENERGY STORAGE CONTROL to be stored in the ENERGY STORAGE. The terminals T3, T4 across the ENERGY STORAGE supply power to the rest of irrigation controller 1. The ENERGY STORAGE section is based on capacitors, and more particularly on high performance electrolytic capacitors having a carbon paste electrode, commonly called "super" capacitors.

The super capacitors SC1, SC2 must be maintained charged to a limited amount and not overcharged or subjected to overvoltage. Control of the charging of the super capacitors SC1, SC2 is the function of the ENERGY STORAGE CONTROL section. The voltage upon each of the super capacitors SC1, SC2 is respectively monitored by voltage sensing and monitoring circuits UPPER V MONITOR 1, UPPER V MONITOR 2. These circuits produce a control signal when the charge upon the associated super capacitor SC1, SC2 exceeds a predetermined reference voltage, normally 5.4 volts d.c. The control signals from each of the UPPER V MONITOR 1 and UPPER V MONITOR 2 circuits are respectively routed through the SHUNT ON DELAY 1 and SHUNT ON DELAY 2 circuits, and each signal is delayed. The delayed control signals are then used to respectively close the SHUNT 1 and/or SHUNT 2 circuits in order to respectively short circuit the voltage produced by photovoltaic power sources PVM1, PVM2 from further charging the respective super capacitors SC1, SC2.

The current flow path for the simultaneous charging of super capacitors SC1, SC2 is identified in FIG. 3 by the numeral 1. If super capacitor SC1 is fully charged (i.e., to 5.4 v.d.c.) then after a delay time SHUNT 1 will close and the current path will be as indicated by numeral 2. Conversely, if super capacitor SC2 is the only super capacitor fully charged then, after a delay, the current path will be as indicated by the numeral 3. When both super capacitors SC1, SC2 are fully charged (to the predetermined threshold level), then both SHUNT 1 and SHUNT 2 will be conductive and the current flow produced by photovoltaic modules PVM1, PVM2 will be sunk in the shorting resistances of the shunt circuits through path 4.

Figure 4A:
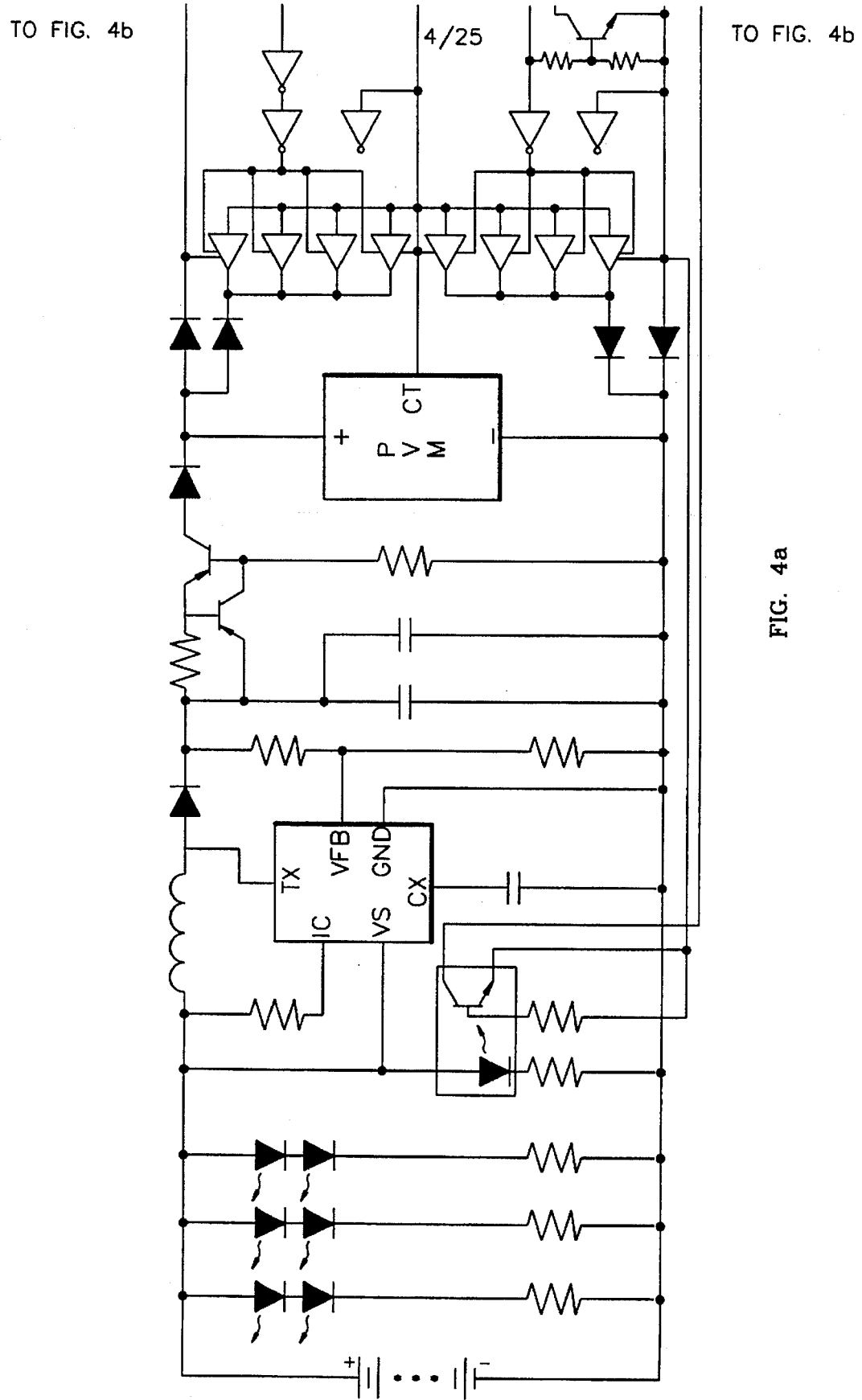
FIG. 4, consisting of FIG. 4a and FIG. 4b, is an electrical schematic diagram of a first embodiment of a light-energized first power source in accordance with the power management of the present invention for powering a device and/or system, particularly for powering an irrigation controller and an irrigation system.
Figure 4B:
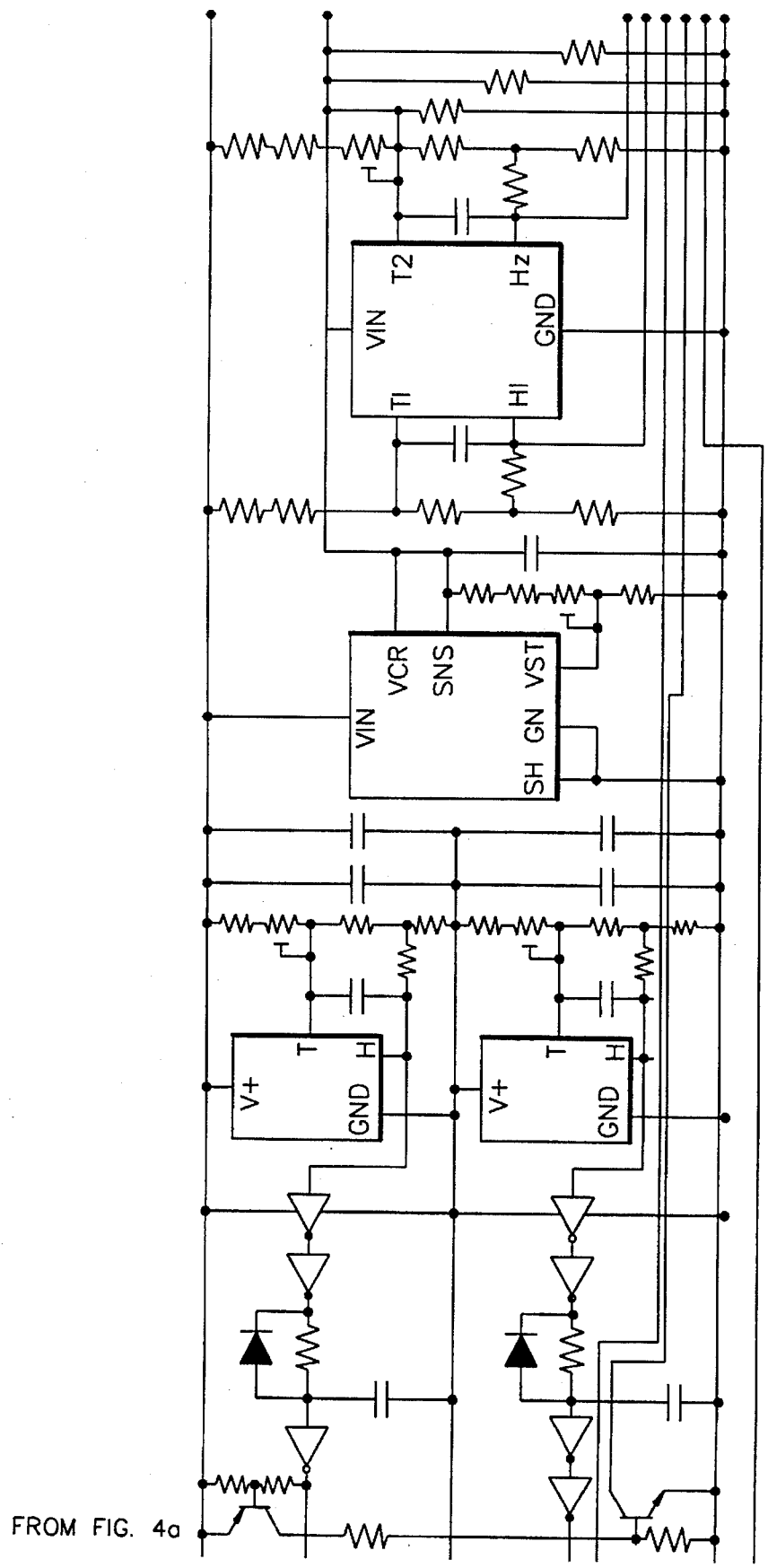

A detail schematic of a first embodiment of the first power source electrical circuit that is block diagrammed in FIG. 3 is shown in FIG. 4. It may be noted that four super capacitors are actually used, and are arranged as two in series in parallel with the remaining two in series. The operation of the circuit shown in FIG. 4, which is implemented with discrete components, may be recognized by reference to FIG. 3.

Figure 5B:
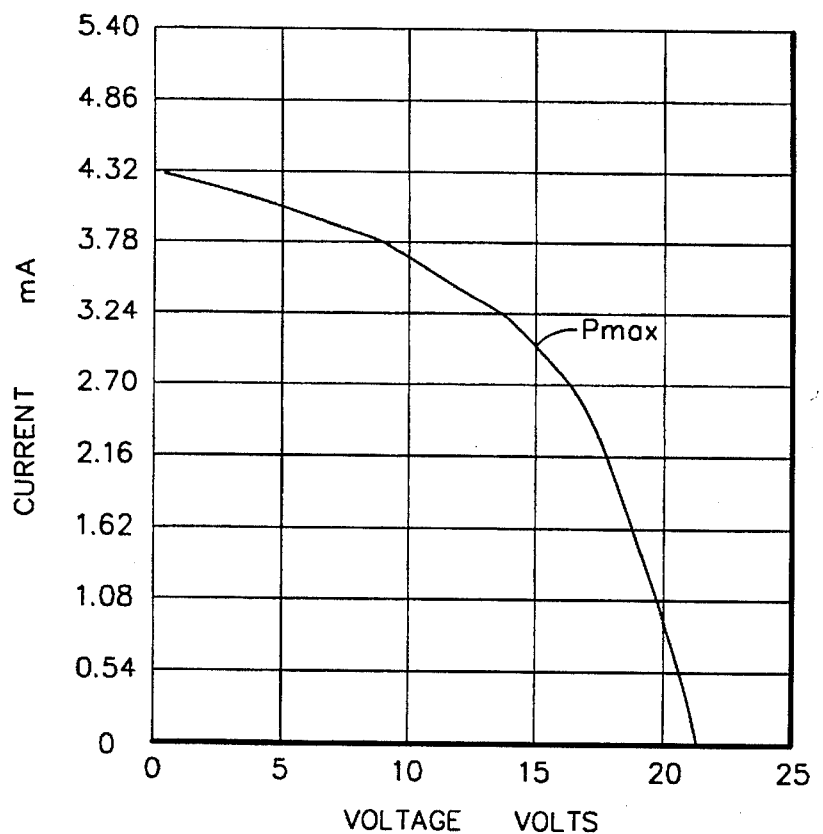
FIG. 5b is a graph of the current versus voltage supplied by the first embodiment of the first power source.
Figure 5A:
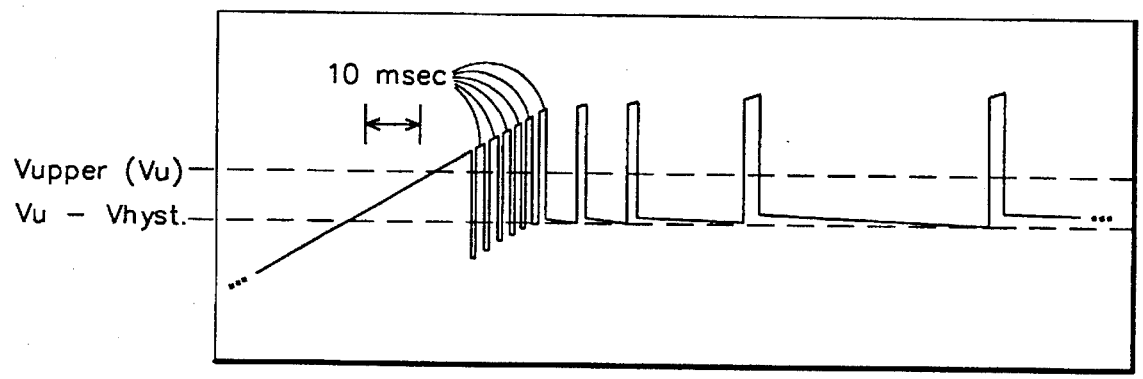
FIG. 5a is a diagram of the voltage charging waveform on the "super" capacitors within the first embodiment of the light-energized first power source.

The charging voltage waveform on the super capacitors is illustrated in FIG. 5a. The voltage rises until V upper (Vu) normally 5.4 volts for each super capacitor (10.8 volts for a series connected pair) is exceeded. After a delay time the shunt circuit closes, and the voltage across the super capacitor quickly falls off, meaning that the voltage level Vu-V hysteresis is quickly reached. The shunt circuit opens and charging recommences. This charging is maintained for the delay time even through Vu is soon exceeded. This predetermined delay time is typically 10 msec. The alternate charging and shunting continues. The super capacitor even more slowly decays in voltage to Vu-V hysteresis. Ultimately a short, typically 10 msec. interval of charging occurs only infrequently (if charging voltage is even available due to the presence of light). If the super capacitor is discharged, causing a fall in its voltage, then recharging will immediately commence in the presence of a charging voltage developed from incident light energy.

Figure 6A:
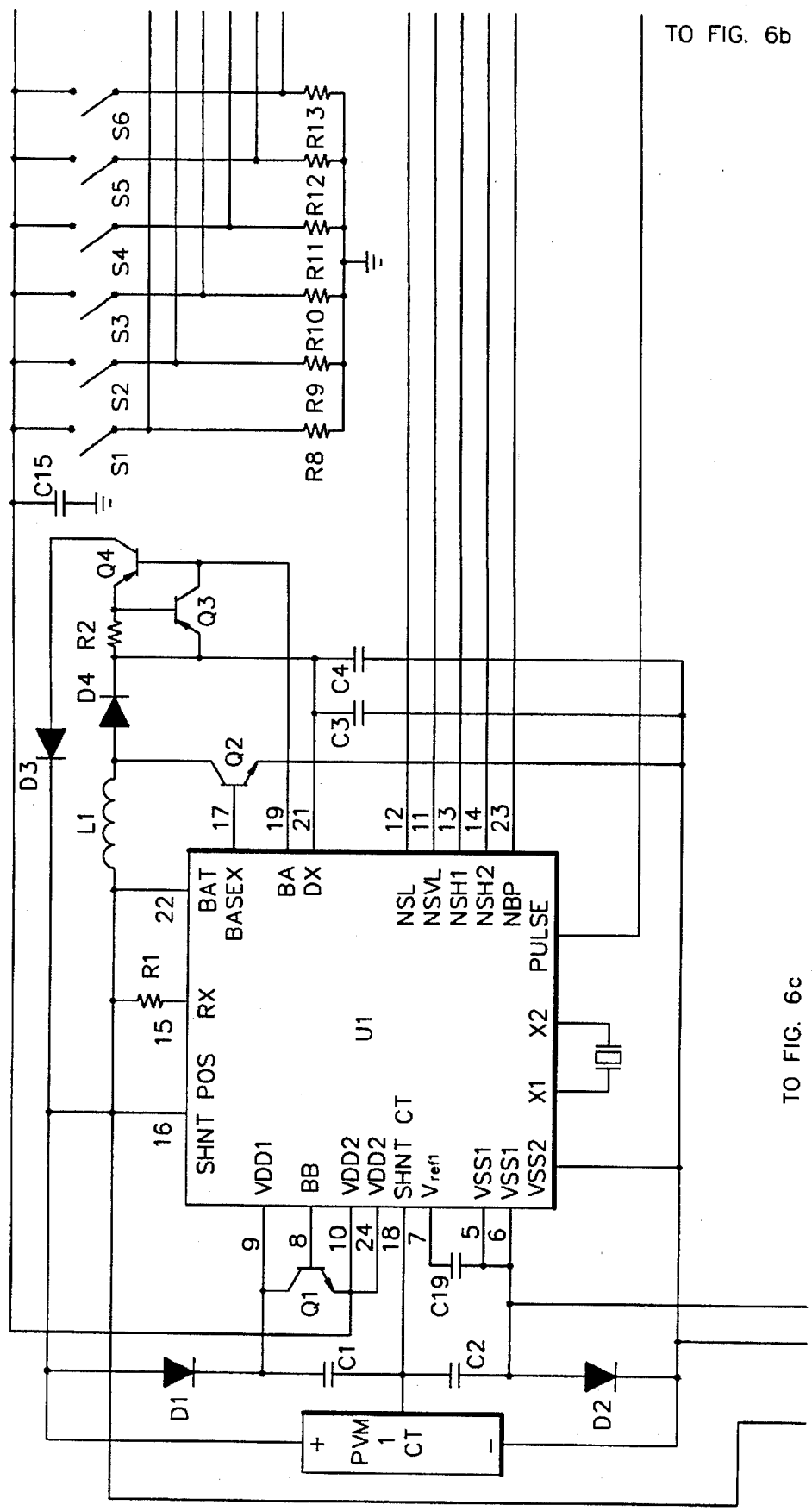
FIG. 6, consisting of FIG. 6a through FIG. 6h, is a schematic diagram of the preferred embodiment, including the distribution of signals used in energy management, of an irrigation controller performing the graceful energy transitions in accordance with the present invention, the irrigation controller including a second, preferred, embodiment of the first power source.
Figure 6D:
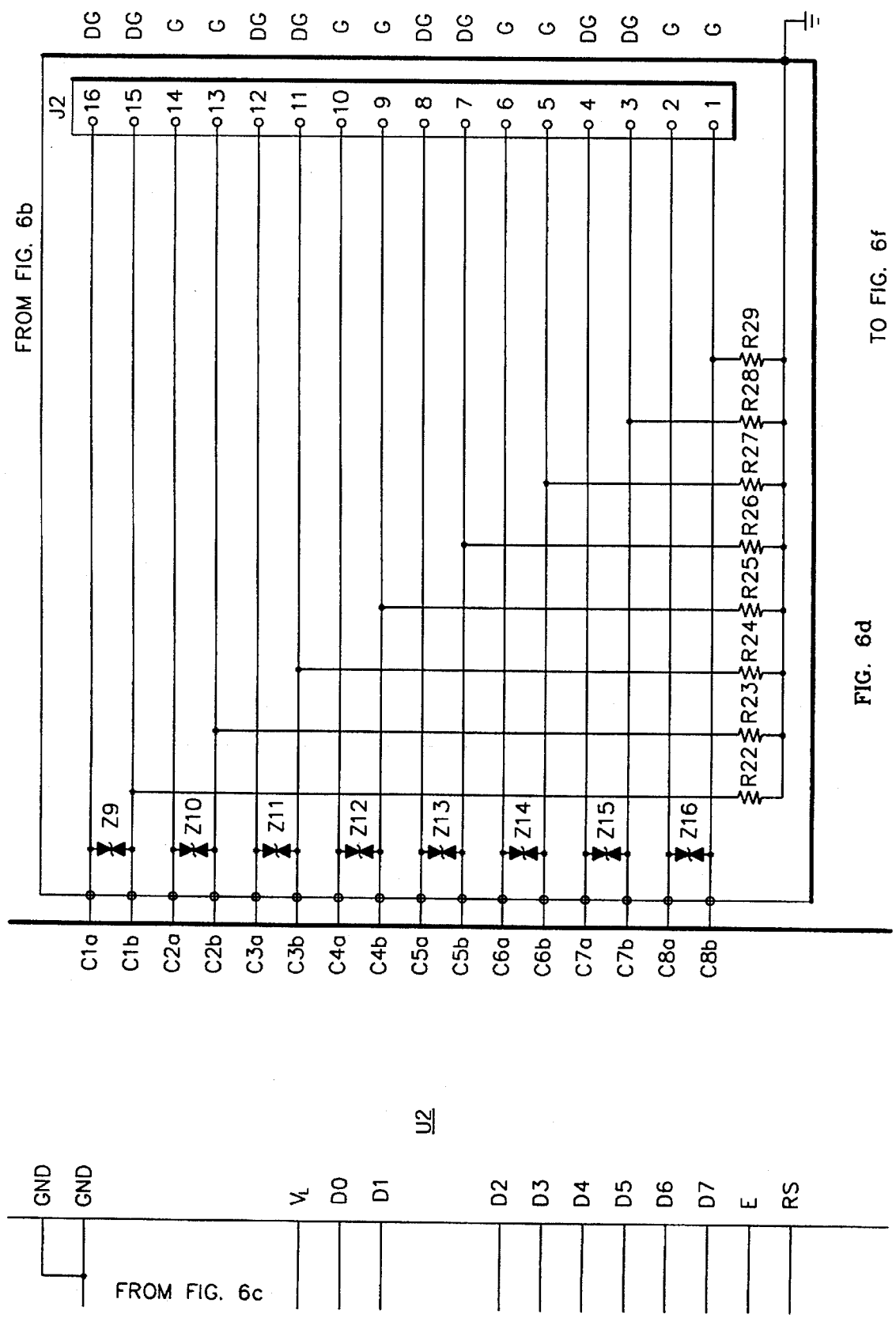
Figure 6E:
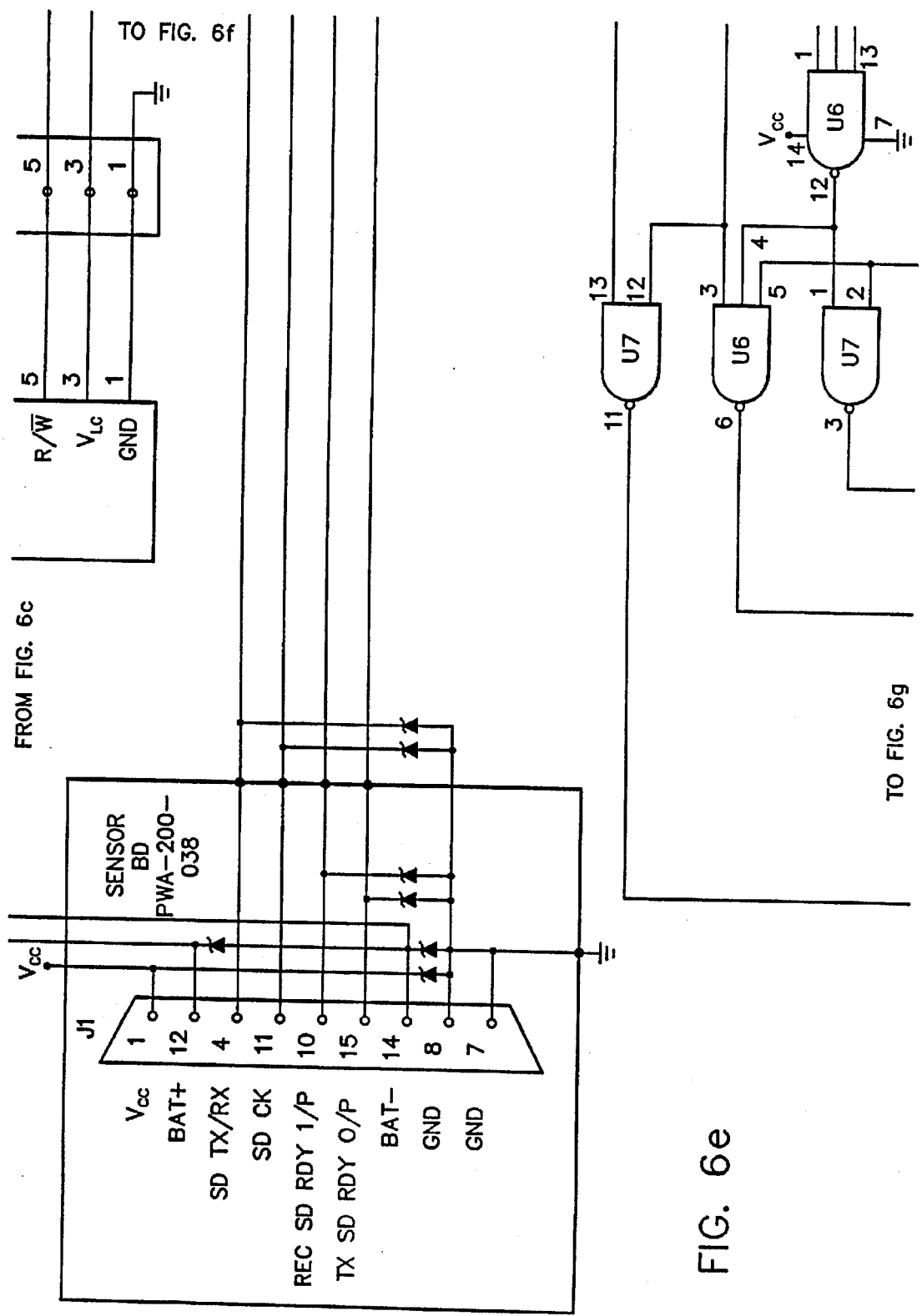
Figure 6H:
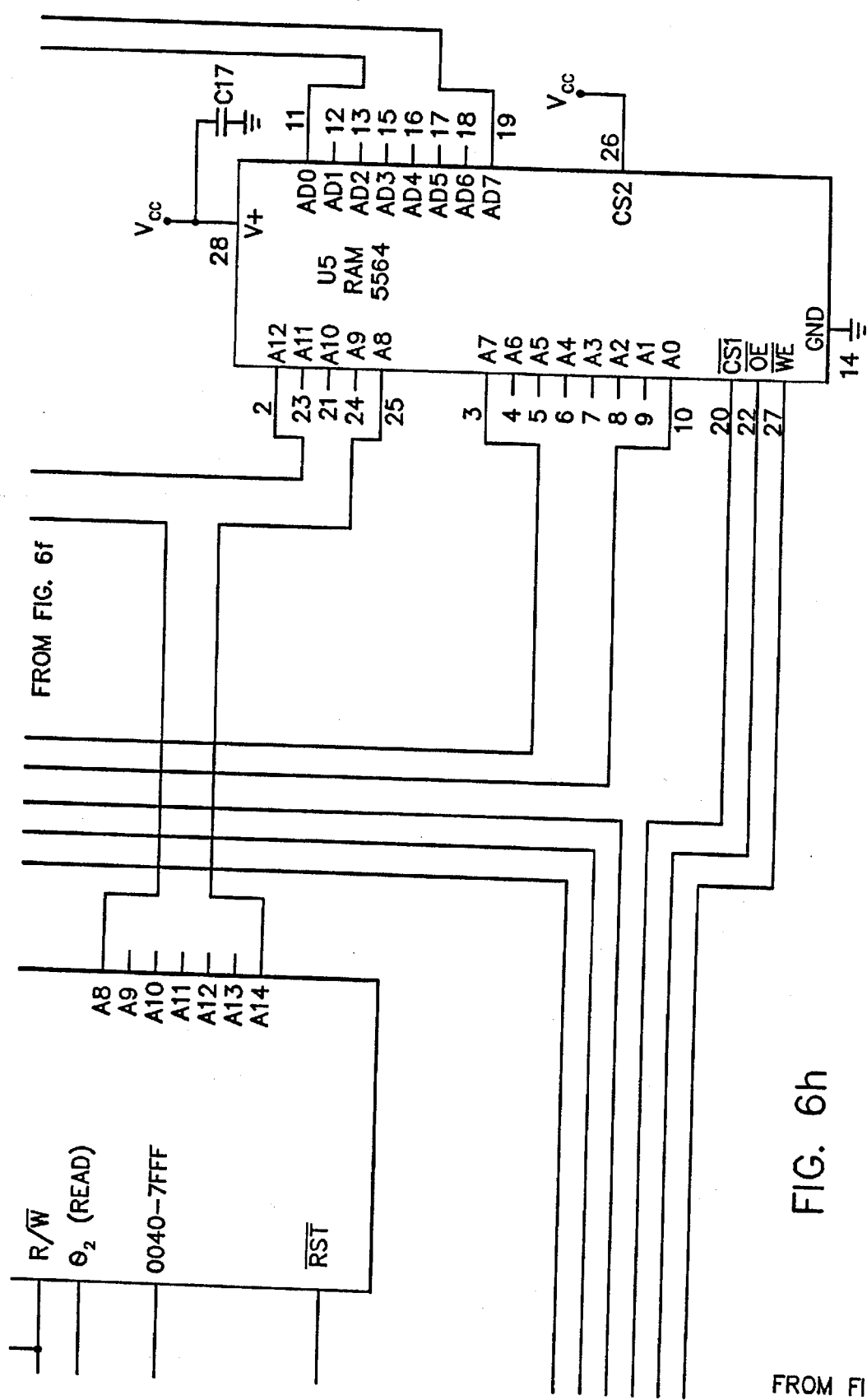
Figure 7A:
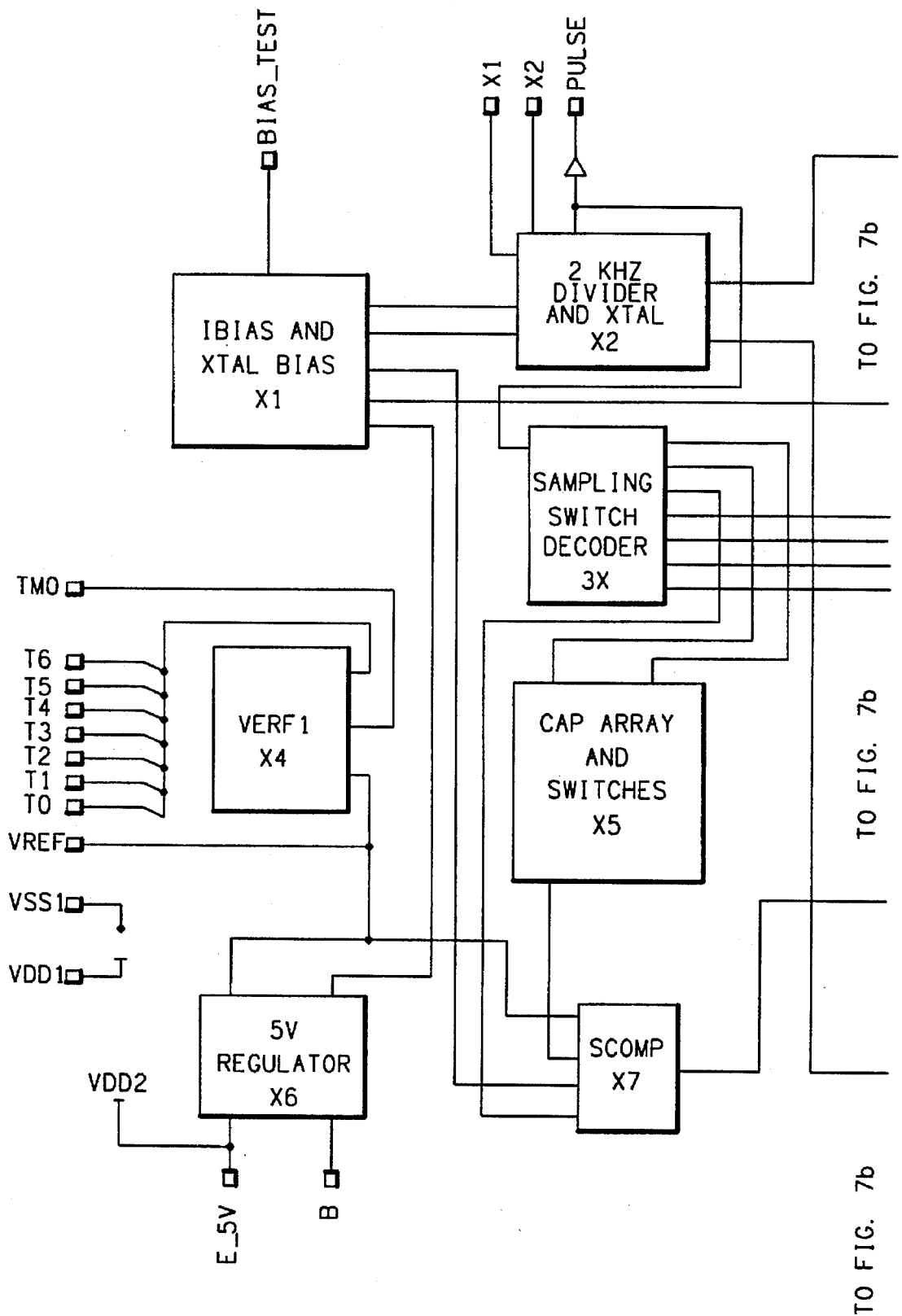
FIG. 7, consisting of FIGS. 7a and 7b is a high level block diagram of a first, U1, analog Application Specific Integrated Circuit (ASIC) used in the preferred second embodiment of the first power source within an irrigation controller performing energy management in accordance with the present invention, which analog ASIC develops certain control signals used in energy management.
Figure 7B:
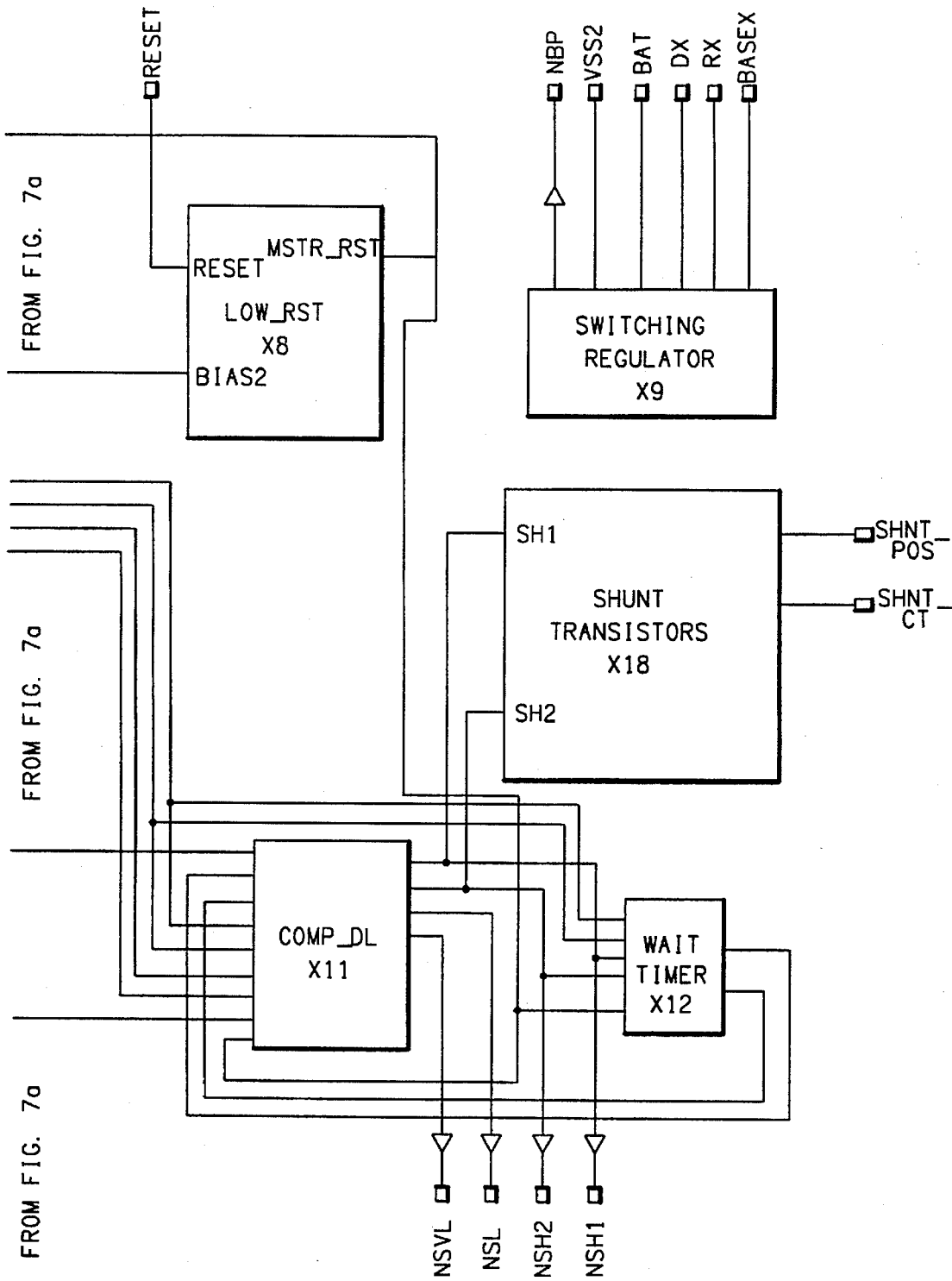
Figure 8A:
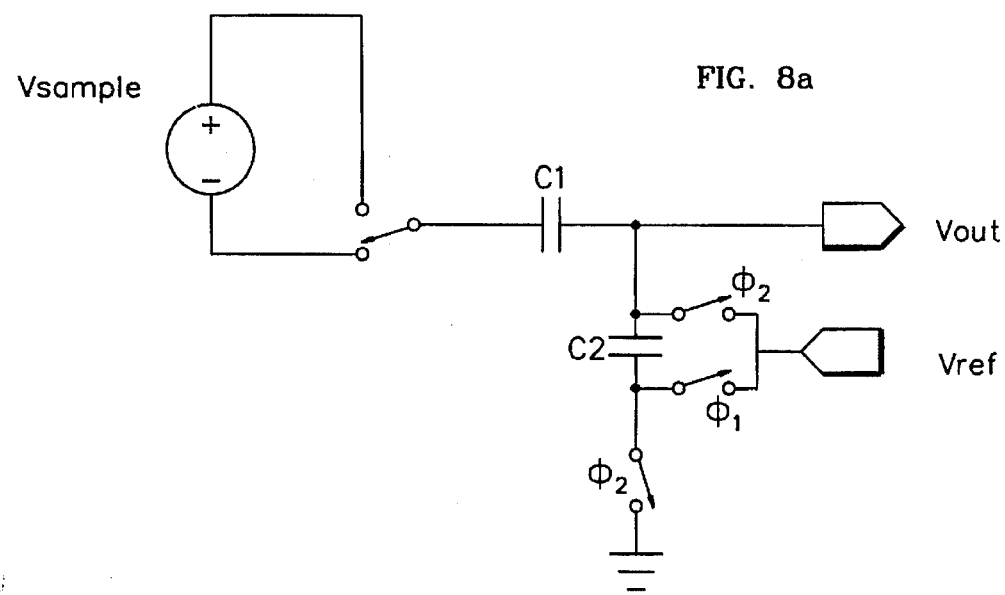
FIG. 8a is a simplified electrical schematic diagram of the sampling capacitor array and switches used in the analog ASIC U1 previously seen in FIG. 7.
Figure 8B:
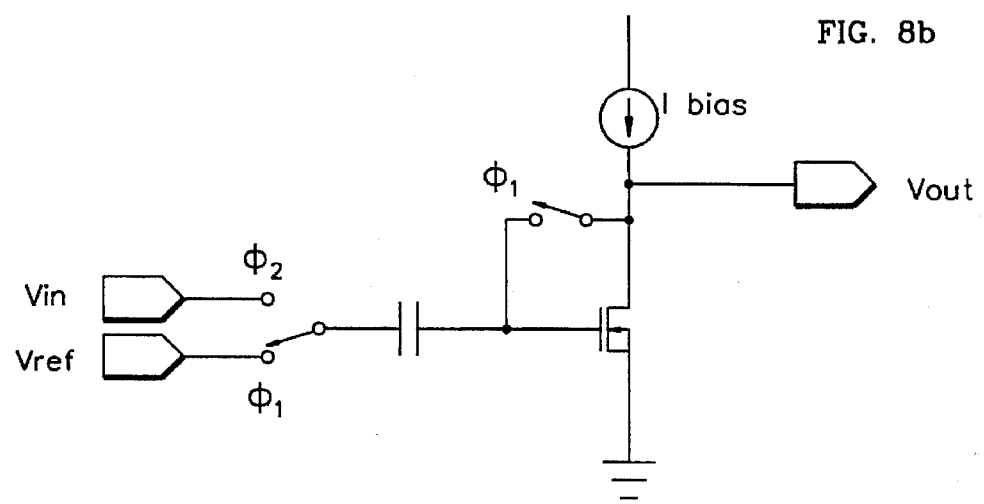
FIG. 8b is a simplified electrical schematic diagram of a sampling comparator used in the analog ASIC U1 previously seen in FIG. 7.
Figure 8C:
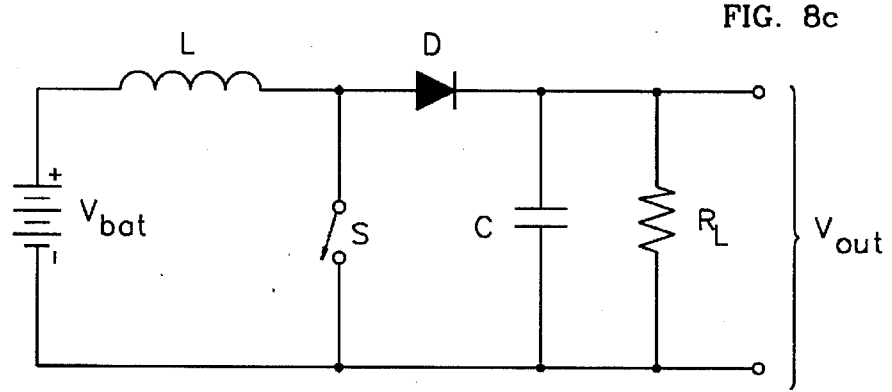
FIG. 8c is a simplified electrical schematic diagram of a step-up DC-to-DC Converter used in the switching regulator of the analog ASIC U1 previously seen in FIG. 7.
Figure 9B:
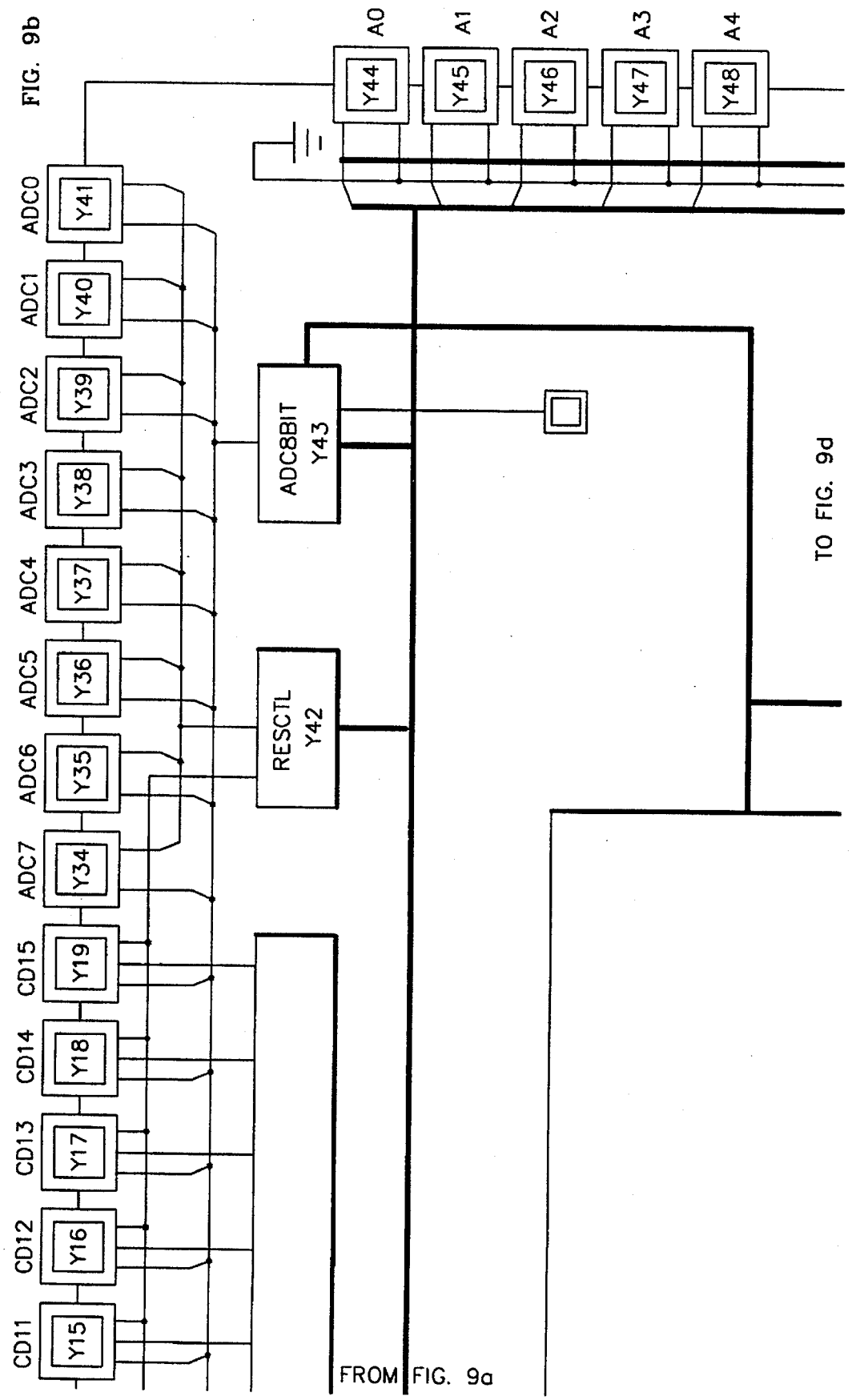
FIG. 9, consisting of FIG. 9a through FIG. 9d, is a layout diagram of a second, U2, digital Application Specific Integrated Circuit (ASIC) used in the preferred embodiment of an irrigation controller performing graceful energy transitions in accordance with the present invention.

The current versus voltage response curve of either that embodiment of power source 1 shown in FIG. 4, or a preferred embodiment to be shown in FIGS. 6 and 7, is graphed in FIG. 5b. Each super capacitor exhibits an internal equivalent series resistance (ESR) of approximately 7 ohms. The maximum current in milliamperes that the collective 4 super capacitors can supply is graphed, on a times ten scale, versus the collective supply voltage. The supply voltage is maintained at 10.8 volts (derived from two super capacitors in series), which is the maximum power point on the curve of FIG. 5b. At this voltage the first power source collective four super capacitors can source about 0.39 milliamperes.

4.0 Functional Description of the Preferred Embodiment of an Irrigation Controller in Accordance with the Present Invention A preferred embodiment of an irrigation control system in accordance with the present invention is shown in FIG. 2. An irrigation controller 1 (previously seen in FIG. 1) operates under control of MICROPROCESSOR U2 (partial) executing programmed firmware that is resident in memories types ROM U4, RAM U5, and EE U9. The MICROPROCESSOR U2 (partial) communicates with MANUALLY OPERABLE KEYS 22–25 (previously seen in FIG. 1) for receipt of data and control. It interfaces with DISPLAY 21 (previously seen in FIG. 21) for the display of questions, parameters, and help messages to a human user/programmer (as detailed in previous section 2.0).

The MICROPROCESSOR U2 (partial) of irrigation controller 1 optionally communicates externally through a SENSOR INTERFACE 26 of plug jack 16 (shown in FIG. 1) to up to eight MOISTURE SENSING UNITS (optional) 27a–27h (shown in phantom line). This optional communication is the purpose of sensing soil moisture at up to eight locations. The MICROPROCESSOR U2 (partial) communicates through VALVE INTERFACE 28 of plug jack 13 (shown in FIG. 1) to up to eight electromagnetically actuated CONTROL VALVES 29a–29h (shown in dashed lines). This communication is for the purpose of gating the flow of pressurized water from WATER SUPPLY 30 through a selected one of CONTROL VALVES 29a–29h at any one time to a corresponding one of WATERING HEADS 31a–31h (shown in dashed line).

The MICROPROCESSOR U2 (partial) may optionally communicate through plug jack 15 (shown in FIG. 1) to OTHER DEVICES 32 (shown in phantom line) for purposes of receiving the download of firmware programs, parameters, and/or commands. This interface need not be enable to operate the irrigation controller 1, which in preferred embodiment comes from the factory with that control program that is within the appendix to this specification within its ROM memory U4 and EE memory U9, and which in the preferred embodiment may have all necessary parameters and control entered through MANUALLY OPERABLE KEYS 22–25. Indeed, if necessary firmware could be entered into controller 1 through it's MANUALLY OPERABLE KEYS 22–25. The digital interface to OTHER DEVICES 32 simply represents a less tedious way of communicating.

The preferred embodiment of the controller 1 normally derives all its power, and all power for MOISTURE SENSING UNITS 27a–27h and CONTROL VALUES 29a–29h, during quiescent operation both day and night from radiant light energy impinging upon RADIANT ENERGY CONVERTING UNIT (includes ASIC U1) that comprises each of PVM1, U1, and ASSOCIATED CIRCUITRY. "PVM" stands for photovoltaic module and "ASIC" stands for application specific integrated circuits. All "U" designations stand for integrated circuit chips that may be referenced in FIG. 3 (to be discussed).

The preferred embodiment of controller 1 is powered during its operation to accept user programming not by the RADIANT ENERGY CONVERTING UNIT PVM1, U1 and ASSOCIATED circuitry but rather by electrical connection through plug jack 14 (shown in FIG. 1) to the POWERKEY™ PLUGGABLE BATTERY ENERGY SOURCE 33. This SOURCE 33, normally not a part of irrigation controller 1 during its quiescent operation, is shown neither in shadow line for being optional, nor in dashed line for being related to the controller 1 of the present invention but not part thereof. Rather, the POWERKEY™ PLUGGABLE BATTERY ENERGY SOURCE is shown in solid line in order to illustrate that for the purposes of programming the controller in accordance with the present invention it must be present.

This required presence is because the SOURCE 33 supplies the greater power that the MICROPROCESSOR U2 (partial) needs to exit the predominantly somnolent (inactive) state that it only intermittently and momentarily leaves to effect irrigation control in accordance with the schedules, and to assume a high duty cycle at operation. The SOURCE 33 also supplies the power requirements of MANUALLY OPERABLE KEYS 22–25 and of DISPLAY 21 during user programming. Although the energy storage within the RADIANT ENERGY CONVERTING UNIT might suffice to permit user programming, it is unwise to deplete this energy storage to an undetermined amount (dependent on the length and adeptness of user programming)—especially at night when no energy recovery is possible and especially when the controller is programmed to immediately begin controlling irrigation cycles. Instead, the SOURCE 33 actually charges the energy storage means within the RADIANT ENERGY CONVERTING UNIT, and always leaves the controller 1 fully powered and ready to control irrigation of the end of a user programming sequence.

4.1 Hardware Description of the Preferred Embodiment of an Irrigation Controller in Accordance with the Present Invention The schematic diagram of FIG. 6a through FIG. 6h—substantially a block diagram because the very substantial function of the circuit shown is contained in two Application Specific Integrated Circuits (ASICs) U1 (shown in FIG. 4) and U2 (shown as FIGS. 9a–9d)—shows the preferred embodiment of irrigation controller 1 (previously seen in FIGS. 1 and 2) in accordance with the present invention.

Commencing in FIGS. 6a and 6c, primary power is provided to the irrigation controller in accordance with the present invention by photovoltaic module PVM 1 or, alternatively, by a POWERKEY™ power source. The POWERKEY™ power source is a battery that is connected between terminals BAT + and BAT −. During programming of the irrigation controller 1 the POWERKEY™ power source (not shown) is always connected. Thereby the battery provides the considerable power necessary to energize the display LCD 1, and, importantly, operate the entire controller 1 at the high duty cycle necessary to conduct communications with the operator. The battery also serves to initially charge the capacitor power storage (both at a current limited rate) each time the POWERKEY™ battery power source is re-plugged to its receptacle 14 (shown in FIGS. 1 and 2). This insures that after each user interface communication the controller is always left in a fully charged condition.

During normal, quiescent, operation all low-power CMOS circuitry and the low-power valves are energized by energy stored in supercapacitors ("SUPERCAPS") SC1, SC2. It is the function of first ASIC U1 to manage the voltage and power levels of the irrigation controller, and, most particularly, to control the charging of SUPERCAPS SC1, SC2 by PVM 1 and the POWERKEY™ power source. The SUPERCAPS SC1, SC2 will automatically be charged by connection of the POWERKEY™ power source. The ASIC U1 operates to control this charging through a constant current source implemented by transistors Q3, Q4 and resistor R2. This constant current source is controlled by a switching regulator implemented from transistor Q2, inductance L1, diode D4, and capacitors C3, C4, all under the control of ASIC U1. The switching regulator and constant current source act jointly to pass, during the presence of bright sunshine or of the POWERKEY™ power source, up to 63 milliamperes through steering diode D3 to charge SUPERCAPS SC1, SC2. The diodes D1, D2 prevent discharge of the charged SUPERCAPS SC1, SC2.

Continuing in FIG. 6a, connections to the ASIC U1 that is used for power management and control include VDD 2. VDD 2 is the main +5 vdc power for the irrigation controller 1 and other components (such as CONTROL VALVES 29a–29h or MOISTURE SENSING UNITS 27a–27h both shown in FIG. 2) to which it is attached in order to form an irrigation system. Signals BA and DX provide local control to the switching regulator and constant current source. The abbreviation NSL stands for system low voltage, NSVL stands for system very low voltage, NSH1 stands for the first shunt from the upper SUPERCAP, NSH2 stands for the second shunt from the lower SUPERCAP, and NBP produces a battery present control signal. The output PULSE is a real time clock interrupt of 30 microseconds duration occurring each ½ millisecond.

The logical control function of the irrigation controller 1 is substantially implemented by digital ASIC U2, shown extending across each of FIGS. 6b, 6d, 6f, and 6h. The main switch control inputs S1–S6 to ASIC U2, used for operator programming of the irrigation controller 1, are from corresponding switches S1–S6 shown in FIG. 6a. The switches S1–S6 respectively implement the stop, unused, unused, help, no, and ok switch control inputs to ASIC U2. These switches S1–S6 are called the MANUALLY OPERABLE KEYS 22–25 in FIG. 2.

Referring to FIGS. 6b and 6d, up to eight soil moisture sensors that are selectively connected to terminal block J3 produce signals that are received into corresponding eight analog to digital converter channels, AD CH1 through AD CH8, of ASIC U2.

In a similar manner one side of each coil driver of up to eight valves that are hooked to the eight valve channels on terminal block J2 is internally connected within ASIC U2 as a signal input to one of the remaining eight analog to digital converter channels. Thus, ASIC U2 offers a total of 16 A/D channels, of which eight are internal and eight are external. The irrigation valve control, or drive, signals developed by ASIC U2 are brought to terminal block J2. This terminal block J2 is brought out to plug jack 13 shown in FIGS. 1 and 2.

Referencing FIGS. 6f and 6h, the ASIC U2 operates on firmware instructions, and on parameters, that are stored within both read only memory ROM U4 and in random access memory RAM U5. The ASIC U2 addresses both such memories through ADDRESS DECODER U7. The irrigation controller 1 is generally versatilely programmable, as well as parameterizable. Thus, many firmware instructions that ASIC U2 executes are present in RAM U5 and are loaded therein in accordance with user requirements. Other firmware instructions reside in ROM U4.

Referencing FIG. 6g, the irrigation controller 1 in accordance with the present invention connects to still another programmable memory other than RAM U5 (shown in FIG. 3h). This is Electrically Erasable (EE) 1024 bit serial memory U9. This EE memory is particularly distinguished in that it will retain its informational contents in the total absence of power (unlike RAM U5). Yet it is alterable in its contents, unlike non-volatile ROM U4. The 1024 bit serial memory U9 permits the field programming of secret codes, vital set up information, and other information that is desirably user specified (unlike the factory-programmed informational contents of ROM U4), wherein this information will desirably not be lost during any interruption of power to the controller.

The complete firmware program, which is resident in memories U4, U5 and U9 and which is executed by the microprocessor contained in ASIC U2, is attached to the related predecessor application Ser. No. 253,858 filed Oct. 4, 1988, now issued as U.S. Pat. No. 5,229,649 as Appendix A.

Circuits U6 (save for one unused spare gate shown in FIG. 6g), U7, and U8 form a control interface of a standard type from ASIC U2 to the 1024 bit serial EE memory U9. In the address bus between the ASIC U2 and the control interface circuit U8, address line AD0 powers up, address line AD1 selects, and address line AD2 clocks serial data present on line AD3 into, 1024 bit memory U9. The single, serial, data output bit D0 of 1024 bit memory U9 is amplified in non-inverting element U10 and communicated to ASIC U2 as bit AD0 upon its address bus.

The function of the circuits of irrigation controller 1, substantially contained in ASIC U1 and U2, to manage irrigation control will become increasingly clear upon the detailed discussion of such ASIC U1s and U2 in respective following sections 4 and 5, and by reference to the complete firmware program attached to the related predecessor patent application as Appendix A.

5.0 Functional Description of the U1 ASIC Device

The diagrams of FIGS. 7 and 8a–8c show the overall architecture of the first, U1, Application Specific Integrated Circuit (ASIC) used within the preferred embodiment of the irrigation controller in accordance with the present invention. The detail function of ASIC U1 is essentially unimportant for the purposes of the present invention, and is included within this specification only for purposes of completeness. The photovoltaic module (PVM, shown in FIG. 3 and 4a), SUPERCAPS SC1 and SC2 (shown in FIG. 3) and ASIC U1 (shown in FIG. 2) may be considered to simply be the implementation of a special form of a light-energized power supply. The general implementation of an a.c. or battery source power supply is, of course, routine in the electrical arts.

The U1 ASIC device is used to generate a 5 volt power supply using power from a photovoltaic module or battery. Power is stored by charging very large supercapacitors ("SUPERCAPS") to 10.8 volts. The stored energy is then used for operation during dark periods. Because the energy stored in the SUPERCAPS=½ $CV_{cap}^2$, the run time duration of the controller during conditions of darkness is greatly affected by how closely the maximum charge voltage can be brought to the maximum tolerable voltage for the SUPERCAP components. Therefore, to increase the dark run time, the "SUPERCAPS" are very carefully monitored, so that they may be charged to a maximum value without being over-charged.

The U1 ASIC device is designed to use minimal power while providing five (5) functions:

First, it monitors SUPERCAP voltages and shunts the charging current if they are over-charged. The monitoring holds this voltage to within ±1.75%.

Second, it provides a 5 volt ±2.5%, 0–65 Ma output voltage to power other electronics.

Third, it provides status signals indicating the condition of the power supply.

Fourth, it provides a 2 Khz, 30 us pulse for use as a time base.

Fifth, it steps up a 9 volt battery to 17 volts to charge the SUPERCAPS and provide current during programming of other electronics. (Power consumption is less of a concern in this mode.)

Sampling capacitors are used to monitor the various capacitor and power supply voltages, allowing the use of only one comparator to conserve current. CrSi 100 kΩ resistors are used to minimize analog currents.

The voltage reference is trimmed using on-chip metal fuses.

There are 3 potential 'most positive' voltages and two potential 'most negative' voltages, making substrate connections difficult. This is handled by using bipolar junction isolation that employs the isolated n-regions as separate CMOS substrates. This allows the CMOS circuitry to operate from several supplies, any one of which could be at the highest potential at different times.

The logic generally runs from VSS1 (OV) to VDD2 (0–5 V), level shifting where required. Analog references run from VSS1 to VDD1 (0–11 V). Switching regulator components run from VSS2 (−0.7 to +5.5 V) to VBAT (0 to 15 V). The upper shunt transistor is connected to a voltage which can range from 0 to VDD1 +0.7 V.

5.1 VREF1 Voltage Reference

The VREF1 circuit X4 is a voltage reference for monitoring supercaps, system low, and system very low. The circuit requires no op-amps, reducing offset error. NMOS transistors at collectors of non bandgap transistors are used to eliminate early voltage effects. The circuit has a buffered output which multiplies the bandgap voltage and is trimmed to 1.50 volts. This trimming is with on-chip metal fuses. The trim range is approximately 1.5±0.1 volts with minimum steps of 3 millivolts. An extra ±−1 LSB is provided in case original trim is incorrect. The circuit temperature coefficient is 60 ppm/°C. typical, 150 ppm/°C. worst case.

5.2 IBIAS & XTAL BIAS Current Generator

The IBIAS & XTAL BIAS circuit X1 generates 20 Na bias currents for other cells, and 100 nA bias (voltage) for xtal oscillator. It generates buffered 2 Vth voltage "VLOW" used to run the xtal oscillator and high-order dividers at low current. CrSi and p-resistors are combined to match TC of Vbe. The bias varies approximately ±28% over all parameters.

5.3 XTAL OSC & High Order Dividers

The XTAL & 2 Khz DIVIDERS circuit X2 generates a clock for capacitor switch sequencing. It uses a low current oscillator (CASC1 from TCJ) running from the second Vth supply voltage called VLOW. Internal trim capacitors are added to the crystal pins and are metal mask trimmable. Dividers to 2 Khz run from VLOW, then are level shifted to VSS1, VDD2 (0 to 5 V). This avoids level shifting at 32 Khz, conserving current.

Circuit input PULSE receives a 2 Khz 30 microsecond pulse used for on and off chip timing. Circuit input NSTROBE receives a 2 Khz, 15 us negative pulse occurring 60 us after PULSE and is used for on chip timing. The level shifters use approx. 30 Na each at 2 Khz.

5.4 Sampling Switch Decode

The SS DECODE circuit X3 is clocked by input PULSE. A one-shot is used to effectively generate a non-overlapped clock for the switch output signals. All switch signals are disabled (by inputs E and NE) for 0.6 to 4 us after each clock.

Switch sequencing samples the upper supercap, lower supercap, system low, and system very low in that order. Inputs NSC1, NSC2, NSSL, NSSVL define which voltage is being sampled. Each voltage is sampled once every 7.8 ms Input NCMP_CLK is the comparator clock. Input NCMP_ON powers down the comparator during unused periods.

5.5 Sampling CAP Array & Switches

The CAP ARRAY & SWITCHES circuit X5 contains sampling capacitors that are basically unit sizes. Due to the variety of voltages sampled, fractions of units are required. Poly etch tolerance can cause approximately 0.2% ratio error.

Inputs S1, S2, S3, S8 and S9 require signals level shifted above VSS2 (the normal logic level is VSS1, VDD2). Inputs S1, S2, S3, S8, S9 must save bodies tied to VSS1 & VDD1. All other switches may be tied to VSS1, VDD2. Note that this includes p-channel bodies, since they are isolated from the substrate in this process.

Sampling occurs such that the node OUT should remain at the reference voltage level if the sampled voltage is at its exact trip point. This avoids parasitic capacitance effects at this high-impedance node.

100 Mv of hysteresis is added to the SL and SVL tests by switching between two slightly different capacitor values.

A simplified electrical schematic of the CAP ARRAY & SWITCHES circuit X5 illustrating its function is shown in FIG. 5a. In operation, $V_{OUT}=V_{REF}$ if $V_{SAMPLE} \cdot C1 = V_{REF} \cdot C2$.

5.6 Sampling Comparator

The SCOMP circuit X7 compares output from the capacitor array to the reference voltage. It is inherently offset compensated. It's response time is less than 25 us.

A simplified electrical schematic of the SCOMP circuit X7 illustrating its function is shown in FIG. 5b. Phase 1 shorts the n-channel so that its gate voltage moves to the voltage where it carries exactly the current source current. The input capacitor is shorted to VREF and stores the difference between this gate voltage and VREF. Phase 2 opens the n-channel and connects the capacitor to the input voltage. If the input voltage is different from the reference, the gate is forced higher or lower, pulling the output of the current source down or allowing the current source to pull up.

5.7 Comparator Data Latches

The COMP DL circuit X11 stores the output of the comparator in the latch corresponding to the voltage being tested. It is clocked by input NSTROBE.

5.8 Wait Timers

The WT TIMER circuit X12 is used as a "timed hysteresis" when the SUPERCAP voltages are sampled.

When near the trip voltage, the capacitors will tend to be above the trip voltage when charging, and immediately fall below the trip voltage when the charging current is shunted away. This is due to approximately 7 Ω internal resistance in the SUPERCAPS.

The SUPERCAPS are sampled every 7.8 ms, and under the above conditions would alternate charging/discharging at a 50% duty cycle. A typical charge current of 20 Ma would average 10 Ma, while a typical load current is 12 Ma continuous, resulting in a net energy loss. This would result in the capacitor charging to less than its maximum value by the internal I-R drop.

To avoid this situation, the comparator data latch is disabled for 3×7.8 ms after it comes out of a shunt mode. This results in a 3:1 charge to shunt ratio, ensuring that the net charge current is positive.

5.9 Shunt Transistors

The SHUNT TRANSISTORS X10 shunt up to 70 Ma away from the SUPERCAP when the maximum voltage is exceeded. The SHUNT TRANSISTORS X10 have a resistance of approximately 3.5 Ω.

5.10 Switching Regulator

The SWITCHING REGULATOR circuit X9 provides 17 volts from a 9 volt battery. The inductor shorting transistor of the circuit is off-chip (the IC is not required to handle the 17 volts).

Output NBP signals the VDD2, VSS1 logic when a battery is attached to the BAT, VSS2 terminals.

A simplified electrical schematic of a step-up DC-to-DC Converter circuit used in SWITCHING REGULATOR circuit X9 and illustrating its function is shown in FIG. 5c. When switch S is closed the battery voltage is applied across the inductor L. Charging current flows through the inductor, building up a magnetic field, increasing as the switch is held closed. While the switch is closed, the diode D is reverse biased (open circuit) and current is supplied to the load by the capacitor C. Until the switch is opened the inductor current will increase linearly to a maximum value determined by the battery voltage, inductor value, and the amount of time the switch is held closed ($I_{PEAK}=V_{BAT}/L \times T_{ON}$). When the switch is opened, the magnetic field collapses, and the energy stored in the magnetic field is converted into a discharge current which flows through the inductor in the same direction as the charging current. Because there is no path for current to flow through the switch, the current must flow through the diode to supply the load and charge the output capacitor.

If the switch is opened and closed repeatedly, at a rate much greater than the time constant of the output RC, then a constant DC Voltage will be produced at the output.

5.10.1 Switching Regulator Bias

The internal bias of SWITCHING REGULATOR circuit X9 is used only for biasing switching regulator components. The bias is provided by a Standard 5 Ua bias cell type A54020. Its absolute value is not critical.

5.10.2 VREF2

The SWITCHING REGULATOR circuit X9 has an internal reference for monitoring switching regulator output voltage. The reference is provided by a standard cell reference type A53000 that is modified to use CrSi.

The reference circuit is chosen to keep non collectors at positive voltage. (Switching regulator can have voltages below the substrate voltage VSS1.)

The value and temperature coefficient of the circuit are not critical, and trim is not required.

5.10.3 RC OSC

The SWITCHING REGULATOR circuit X9 has an internal clock for switching the regulator at approx. 25 Khz. The clock is divided from 50 Khz to give a 50% duty cycle. It employs a standard cell reference type A55010 that is modified for CrSi. An approximate 150 kΩ external resistor is required.

5.10.4 Switching Regulator Comparator

The SWITCHING REGULATOR circuit X9 has a comparator that uses positive feedback for an improved response time of 3.5 us maximum.

5.11 VREG

The 5 V REGULATOR circuit X6 provides a 5 volt ±2.5% regulated output for external electronics as well as VDD2 for internal logic. An external NPN is used to avoid thermal effects on the IC.

5.12 Low Voltage Reset

The LOW RESET circuit X8 resets the entire U1 ASIC. The power supply can (under various light conditions) take minutes to hours for power up, which eliminates normal power-on-reset circuits. This circuit must ensure that all outputs are valid until the analog circuits are operational.

The output holds all latches in reset until the bias, reference, and regulator circuits are all running at levels acceptable for operation.

5.13 Preferred Technology for the U1 ASIC

The U1 ASIC is suitably implemented in BIPOLAR-CMOS technology available from several semiconductor foundries. It is typically implemented in the BI-CMOS process of Micro-Rel Division of Medtronic, Inc., 2343 W. 10th Place, Tempe, Ariz. 85281.

6.0 Functional Description of the U2 ASIC Device

The block diagram of FIG. 6, consisting of FIG. 6a through FIG. 6f, shows the overall architecture of the second, U2, Application Specific Integrated Circuit (ASIC) used within the preferred embodiment of the irrigation controller in accordance with the present invention.

The U2 ASIC device is concerned with calculation, command, and control. It is primarily digital in operation, and may be considered to be a specialized microprocessor with substantial analog as well as digital I/O capabilities. The diagram of the U2 ASIC device shows the detailed interconnection of the various functional blocks.

6.1 U2 ASIC Device Architecture

6.1.1 Microprocessor

The central microprocessor Y31 of the U2 ASIC device is a NCR 65CX02 macrocell. It employs an 8-bit data path structure controlled by an internal programmable logic array (PLA) using 8-bit instructions and having a 16-bit addressing capability. Importantly, all circuitry internal to the microprocessor is completely static and complementary so that the clock signal may be frozen and only leakage current will be consumed. It has a clock speed of 455 Khz and a 2.2 microsecond cycle time.

The microprocessor Y31 executes the instruction repertoire of commercially available microprocessor type 6502. The mnemonic codes for the instructions of this repertoire, such mnemonic codes as appear with the firmware program listing attached as Appendix A to this specification, are commonly recognized mnemonics, and a complete description of the microprocessor type 6502 instruction repertoire, are contained, among numerous other places, in the book "6502 Assembly Language Programming" by Lance A. Leventhal, published in 1979 by Osborne/McGraw Hill, 630 Bancroft Way, Berkeley, Calif. 94710. It will be recognized that, consonant with the modest computational requirements of an irrigation controller, the relatively simple 6502 microprocessor macrocell is not the sole type that could be employed, and that many microprocessors including types commonly incorporated in ASICs are suitable for use within the irrigation controller in accordance with the present invention.

The firmware instructions executed by microprocessor Y31 occupy memory addresses in accordance with the following memory map table:

| | |
|---|---|
| 00-3F | I/O Parts |
| 40-7FFF | RAM Memory U5 (shown in FIG. 3h) |
| 8000-FFFF | ROM Memory U4 (shown in FIG. 3f) |

The operand fields of the firmware instructions are interpretable in accordance with the following memory map table:

| | | |
|---|---|---|
| 00 | O | Microprocessor power off |
| 01 | O | RTC counter clear |
| 02 | O | A/D power, 1 = on, 0 = off |
| 03 | O | A/D interface, 1 = enable, 0 = disable |
| 04 | O | LCD power, 1 = on, 0 = off |
| 05 | O | LCD interface, 1 = enable, 0 = disable |
| 06 | O | Valve select byte |
| | | bits 0–2 - valve #, + side |
| | | bits 3–5 - valve #, − side |
| | | bit 6 - polarity, 0 = normal, 1 = reversed 07 |
| | O | Valve enable, 1 = on, 0 = off |
| 08 | O | TIMER hi byte latch |
| 09 | O | TIMER lo byte latch |
| 0A | O | TIMER control, 1 = on, 0 = off |
| 0B | O | RTC, 1 = 10 seconds, 0 = 1 minute |
| 0C | O | Serial clock |
| 0D | O | TIMER load |
| 0E | O | Write serial data out |
| 0F | O | Serial output ready |
| 10 | I | RTC counter hi byte |
| 11 | I | RTC counter lo byte |
| 12 | I | Status register 1 |
| | | bit 0 - 0 = external battery present |
| | | bit 1 - 1 = watchdog timeout |
| | | bit 2 - 0 = system power low |
| | | bit 3 - 0 = system power very low |
| | | bit 4 - 0 = RTC pulse |
| | | bit 5 - 1 = battery low or caps charging |
| | | bit 6 - 1 = serial data link present |
| | | bit 7 - 0 = serial data link ready |
| 13 | I | Status register 2 |
| | | bit 0 - Switch 1, 1 = pressed STOP |
| | | bit 1 - Switch 2 |
| | | bit 2 - Switch 3 |
| | | bit 3 - Switch 4 HELP |
| | | bit 4 - Switch 5 NO |
| | | bit 5 - Switch 6 OK |
| | | bit 6 - |
| | | bit 7 - 0 = A/D end of conversion |
| 14 | I | Read serial data in |
| 15 | I | Read A/D converter |
| 16 | I | Load serial shift register |
| 17 | I | Clear input ready latch |
| 18 | I | LCD busy flag & address counter (RS = 0) |
| | | bit 7 - 1 = busy |
| | O | LCD instruction register (RS = 0) |
| 19 | I | LCD read data (RS = 1) |
| | O | LCD write data (RS = 1) |
| 1A | O | LCD contrast select (0–7) |
| 1B | O | Clear watchdog timer |
| 1C | O | Clock RTC counter |
| 1D | I/O | EEPRM |
| 1E | O | Coil test drivers |
| 1F | O | Sensor test drivers |
| 20 | O | Start A/D channel 0, sensor 1 |
| 21 | O | Start A/D channel 1, sensor 2 |
| 22 | O | Start A/D channel 2, sensor 3 |
| 23 | O | Start A/D channel 3, sensor 4 |
| 24 | O | Start A/D channel 4, sensor 5 |
| 25 | O | Start A/D channel 5, sensor 6 |
| 26 | O | Start A/D channel 6, sensor 7 |
| 27 | O | Start A/D channel 7, sensor 8 |
| 28 | O | Start A/D channel 8, valve 1 |
| 29 | O | Start A/D channel 9, valve 2 |
| 2A | O | Start A/D channel 10, valve 3 |
| 2B | O | Start A/D channel 11, valve 4 |
| 2C | O | Start A/D channel 12, valve 5 |

-continued

| | | |
|---|---|---|
| 2D | O | Start A/D channel 13, valve 6 |
| 2E | O | Start A/D channel 14, valve 7 |
| 2F | O | Start A/D channel 15, valve 8 |
| 30-3F | | |
| 40-FF | | Zero page variables, pointers, and tables |
| 100-1FF | | Stack |
| 200-3FF | | Program variables |
| 8000 | | ROM start |
| FFFA-FFFB | | NMI vector |
| FFFC-FFFD | | RESET vector |
| FFFE-FFFF | | IRQ vector |

6.1.2 Drivers

The coil drivers Y20 work in pairs to supply relatively large bidirectional current pulses to operate electromagnetically actuated valves. Only one pair of coil drivers is active at a time, as specified by the contents of the data bus. Additionally, the output (coil) drivers have the capability to sink a regulated current for testing and programming purposes.

6.1.3 Timer

The timer Y26 consists of two 8-bit latches on the data bus and a 16-bit down counter which is clocked at 2 Khz. Loading of the counter and latches is under the control of the processor. When the counter reaches zero, a processor interrupt is generated.

6.1.4 ADC

The Analog-to-digital converter Y43 receives signals from external sensors and from the valves, a total of 16 channels in all, which are converted to digital information and placed on the data bus. The selection of the channel to be digitized is made on the basis of the contents of the address bus. The converted data is expressed as an eight-bit fraction. For the eight channels originating at the sensors and for the eight channels originating at the coils, this fraction is the ratio of the input voltage to the full power supply. All 16 ADC inputs may be pulled to ground through a poly resistor and an n-channel switch which together constitute a nominal 330 ohm resistance. The resistors associated with the eight channels originating at the sensors are enabled individually (as determined by the contents of the data bus) upon command of the processor. The performance specifications of the Analog-to-digital (A/D) Converter are as follows:

a. Resolution/Accuracy—8 bits±one-half LSB for VIN=1(Vd)
   —8 bits±one LSB for VIN=½ (Vd)

b. Conversion Time—

$$\frac{8}{f_{osc}} \times n$$

where n=8 or 9 depending upon whether the conversion is full scale or half scale.

c. Operating Current—3 Ma maximum d. Analog Reference—Digital Supply Voltage (Vd)

e. Analog Inputs (Vin)—Each input voltage is ratiometric with the digital supply voltage (Vd) where:
   Vin for full scale=½(Vd) for A/D channels 1 through 8
   Vin for full scale=1(Vd) for A/D channels 9 through 16

6.1.5 Clock/Calendar

This clock/calendar Y22 provides several timing functions. It generates a 2 second thing tick at 10 second or 1 minute intervals.

It keeps watch on the status of the programmer battery by generating a "Battery Low" status bit if either of two "Supercap Shunt" signals are absent for more than 64 second during programming activity.

It counts up to 65535 ticks while the processor is in a low voltage shutdown mode so as to provide calendar memory. The calendar contents may be placed on the data bus.

It maintains a 128 second dead-man timer which can generate a hardware reset if the processor fails.

6.1.6 Switch Register

The switch register Y2 acts as an interface between six external configuration switches and the data bus. An additional input is the end-of-conversion signal from the analog-to-digital converter.

6.1.7 Status Register

The status register Y3 makes the following internal flags available to the processor as data on the data bus: Battery Present, Dead-man timeout, System Low, System Very Low, Real Time Clock Tick, Battery Low, Serial Data Link Present, and External Ready.

6.1.8 Serial Data Link

The serial data link Y1 provides high speed synchronous two-way communication between the device and a remote data transceiver. Data is loaded or retrieved via the data bus under control of the processor. Transmission of serial data is also directly controlled by the processor.

6.1.9 Ready

These circuits Y23 provide handshaking between the processor and an external device (such as a serial data link) through the status register and data bus.

6.1.10 Wakeup

The wakeup circuit Y27, upon stimulation by either the Serial Data Link Present or the clock/calendar time-tic or the Battery Present signals, starts the main system oscillator and then after a 500 microsecond delay, removes the system reset. Upon stimulation by the System Very Low signal or by the processor, the wakeup circuit immediately causes the system to be reset. The dead-man timeout signal will cause a 30 microsecond reset pulse to occur at two second intervals until the processor resets it.

6.1.11 Main Oscillator

The main oscillator Y25 uses an external capacitor and a charge-discharge scheme to produce a high-speed clock for the processor. This oscillator can be shut down to conserve power. It will restart immediately upon command. The frequency of oscillations is determined by the size of the external capacitor. The relationship between capacitor size and frequency, as well as the frequency stability over changes in operating environment, may be tailored in consideration of the operational environment within which the irrigation controller is used.

6.1.12 LCD Interface

The LCD interface Y29 consists of a latch on the data bus and the control circuitry needed to operate an external liquid crystal display and the DAC. The LCD interface can be configured to function as the 6502 Data I/O port. The interface is configured in this way only during a special test mode. Under processor control, a flip flop is set which alters the internal logic paths so that the LCD bus will be configured as a 6502 Data I/O port. This special test feature allows the 6502 to be tested independently of the peripheral logic.

6.1.13 DAC

The four bit digital-to-analog converter Y32 provides a voltage, as specified by the contents of the data bus, through the LCD interface for contrast control of the external liquid crystal display.

The performance specification of each DAC is as follows:

a. Resolution: 4 bits b. Accuracy: ±½ LSB for all voltage steps c. Vout=n(0.147) where $0 \leq n \leq 15$ d. Io (min)=500 Ua sink for Vout=0V±50 Mv e. Vo (max)=±50 Mv for Io=500 Ua for the DAC setting D3=D2=D1=D0=0

6.1.14 Address Decoding

The address decoder circuit Y38 uniquely maps all internal functions into page zero of the processor's memory space. The decoder produces timing and control signals for these internal circuits as well as for reading and writing of external memory.

6.1.15 Power Switching

The power switch circuit Y28 controls the power for the external ROM and display as well as the internal analog functions in order to conserve power and to permit the irrigation controller to enter a "sleep" mode.

6.1.16 Resistor Control

The resistor control circuit U42 permits reconfiguration of the sensor and coil interfaces to enable communication upon each of the A/D channel lines so that integrity of both valve coils and moisture elements may be self-tested. This is accomplished by selectively switching a low value resistor between the channel signal line and ground.

6.2 U2 ASIC Input/Output Description

6.2.1 CD0–CD15—Coil Driver Outputs

These pins operate in pairs, one pair at a time, when driving the coils of the electromagnetically actuated valves. One pin of the pair goes high while the other goes low in order to provide bidirectional current. Inactive coil driver pairs assume a high impedance state. When the coil is deenergized the driver circuitry must absorb the energy of the collapsing field. CD8–CD15 also function as analog inputs to the ADC. These pins have the additional capability of sinking a regulated current for testing and programming purposes.

6.2.2 ADC0–ADC15 Analog Inputs to the ADC

These pins provide information from the coils and sensors whose integrity the processor must evaluate. ADC8–ADC15 are shared with the 8 valve lines CD8–CD15. ADC0–ADC7 are shared with the 8 sensor lines. All these 166 lines have the capability of sinking a regulated current for testing purposes.

6.2.3 SL—System Low

An active low input indicates that the condition of the power supply is such that further operation will soon be impossible. The processor, upon receiving this signal, will immediately turn off all valves in anticipation of approaching shutdown.

6.2.4 SVL—System Very Low

An active low signal indicates that the condition of the power supply is such that further operation is impossible. Upon receiving this signal the processor will immediately go into hibernation. After approximately 100 milliseconds, a hardware system reset will occur independently of the processor.

6.2.5 SH0, SH1—Supercap Shunt Signals

If either of these signals persists in the high state for longer than 64 seconds, a Battery Low status will be generated.

6.2.6 BPR—Battery Present

An active low signal indicates that a battery is connected to the power supply so that the processor may run continuously.

6.2.7 S1–S6—Switch Inputs

Active high inputs with internal pulldowns go directly to the switch register.

6.2.8 A0–A14—Address Outputs

The external RAM and ROM are addressed by these pins. A0–A7 in conjunction with ALE also functions as D0–D7.

6.2.9 D0–D7—Bidirectional Data Bus

The external RAM and ROM use these lines for transferring data to and from the device. The lower address bits are multiplexed with the data on these lines in conjunction with the ALE signal.

6.2.10 ALE—Address Latch Enable

When this signal is high, data transfers may take place on the D0–D7 pins. When this signal is low, these same pins are used as A0–A7 outputs.

6.2.11 RDYIN—Ready Input

This signal appears as one of the bits of the status register. RDYIN provides handshaking protocol from a distant serial data link. A low-to-high transition of this signal sets the Serial Data Link Present status bit low. The signal is provided with an internal pulldown.

6.2.12 RDYOUT—Ready Output

This signal passes the contents of data bus bit zero out of the device under control of the processor to provide handshaking protocol to a distant serial data link.

6.2.13 CEROM—ROM Chip Enable

This signal is used to enable the outputs of the external ROM onto the D0–D7 pins.

6.2.14 LCD0–LCD7—Liquid Crystal Data

These bidirectional signals transfer data to and from the external liquid crystal display. They are provided with internal pulldowns.

6.2.15 LCDEN—LCD Enable

This output signal enables the external liquid crystal display. This output signal can be made to exhibit high impedance with an internal pulldown.

6.2.16 LCDRS—LCD Register Select

This output signal informs the external LCD module that either data or command appears on the data inputs. This output signal can be made high impedance with an internal pulldown.

6.2.17 LCDRD—LCD Read

This output signal controls the direction of data flow to or from the external liquid crystal display. This output signal can be made to exhibit high impedance with an internal pulldown.

6.2.18 VLCD—Analog Output from the DAC to the External Liquid Crystal Display This analog output signal is used to control the display contrast.

6.2.19 VL—Switched Power to the External Liquid Crystal Display

When this signal is switched on it provides current from the device power input VDD. When it is switched off, it sinks current into the device power return VSS.

6.2.20 VA—Switched Power to the External Sensors

When this signal is switched on, it provides current from the device power input VDD. When it is switched off, it sinks current into the device power return VSS.

6.2.21 VP—Switched Power to the External ROM

When this signal is switched on, it provides current from the device power input VDD. When it is switched off, it sinks current into the device power return VSS.

6.2.22 Serial Clock—Clock Input/Output for Serial Data Transfer

When driven by the device for outward data transmission, this signal alternatively assumes a low impedance high state and a low impedance low state. If the low state persists for more than 20 to 40 nanoseconds then the signal remains at a high impedance with an internal pulldown. In this last state, the pin may be driven by an external source for inward data transfer (reception). The clocks generated by this pin may have a rate of up to 32,000 Hertz. This pin may be loaded with up to 300 picofarads capacitance.

6.2.23 Serial Data—Data Input/Output for Serial Data Transfer

When driven by the device for outward data transmission, this signal assumes a low impedance state whenever the Serial Clock is high, and then, if the clock low state persists for more than 20 to 40 nanoseconds, a high impedance with an internal pulldown. In this last state, the pin may be driven by an external source for inward data transfer (reception). The data generated by this pin may have a rate of up to 32,000 bits per second. This pin may be loaded with up to 300 picofarads.

6.2.24 C01, C02—Capacitor Connections

These provide a connection for a capacitor whose value determines the frequency of the Main Oscillator.

6.2.25 READ (WRITENOT)—R/W Signal From the Processor

This signal indicates whether a memory read or memory write cycle is in progress.

6.2.26 PH12—Processor Clock

This signal is high during the active portion of the processor's operation. When low, the processor is precharging its internal busses. This signal must logically combine with Read and the appropriate address decode to create the control signals to apply to external memory.

6.2.27 CSE2—EEPROM Chip Select

This signal is used in conjunction with READ and PH12 for external EEPROM operations.

6.2.28 RSTB—Processor Reset

This active-low signal indicates that the processor is shut down and may be used to initialize external circuitry to the correct state for processor start-up.

6.2.29 PAGE0—Page Zero

This pin goes high when the address bus is in address area 0040H through 7FFFH inclusive.

6.2.30 VDD

This is the device positive supply.

6.2.31 VSS

This is the device negative supply.

6.2.32 CK—Real-Time Clock Input for Clock Calendar Timer

The frequency is nominally 2 Khz with a 30 us high-going pulse.

6.2.33 SPSEL

When SPSEL=1, the chip requires a 32 Khz time base on the CK input. When SPSEL=0, the chip requires a 2 Khz time base on the CK input.

6.3 ASIC U2 Power Supply Requirement

Power supply requirements are as follows:

| Parameter | Symbol | Min | Max | Units |
| --- | --- | --- | --- | --- |
| Power supply All circuitry active | VDD A | 4.5 | 5.5 | V |
| Power Supply | VDD B | 2.00 | 5.5 | V | when the real time clock, interrupt, and battery low detection circuitry operative. All other circuits are at a static, defined logic level (therefore, not being clocked).

| | | |
| --- | --- | --- |
| Active Supply Current | Ia | 6.0 Ma |
| VDD = 5.5 v, 2 Khz Real time clock running, main oscillator | | |

VDD=5.5 v, 2 Khz Real time clock running, main oscillator running, processor, ADC, LCD interface logic running (only), DAC running, coil drivers in high-impedance state, external interface circuitry to EEPROM, ROM and RAM is active, however, the active current of the EEPROM, ROM and RAM is not included.

| | | |
| --- | --- | --- |
| Quiescent Supply Current | Iq | 1.5 Ua |
| VDD = 5.5 v, Real time clock running, main oscillator stopped, | | |

VDD=5.5 v, Real time clock running, main oscillator stopped, processor stopped, coil drivers in high-impedance state, ADC, LCD, DAC are all powered off. External EEPROM and ROM are powered off. External RAM is at a static, defined logic level (therefore, not being clocked). The quiescent current of the RAM is not included in Iq.

6.4 ASIC U2 Signal Pin Requirements

Unless otherwise stated, the following characteristics apply over the applicable operating power supply range as specified above. All pins are protected against electrostatic discharge.

| Parameter | Symbol | Min | Max | Unit |
| --- | --- | --- | --- | --- |
| Capacitance of Inputs | Ci | | 10 | Pf |
| Capacitance of Outputs | Co | | 10 | Pf |
| Capacitance of Tristate | Ct | | 10 | Pf |
| Input Leakage Current | Iil | −1 | +1 | Ua |
| Tristate Leakage Current | Itl | −1 | +1 | Ua |
| Passive Pulldown Current (@ Vih = VDD) | Ipd | −1 | −30 | Ua |
| Active Pulldown Current (@ Vi = 2.5 v) | Irpd | −4 | −12 | Ma |
| VA, VL, VP | | | | |
| Output High Voltage | Voh | VDD − 0.3 | VDD + 0.3 | V |
| Output Low Voltage | Vol | −0.3 | +0.4 | V |
| Output High Current (@ Voh = VDD − 0.3 V) | Ioh | −6.0 | | Ma |
| Output Low Current | Iol | 6.0 | | Ma |
| VLCD | | | | |
| Output Voltage Range | Volcd | 0.0 | 2.2 | V |
| Output Current (@ Vol = 0.05 V) | Ioled | +0.5 | | Ma |
| Coil Driver Pins | | | | |
| Input Voltage Range See ADC8 - ADC15 below | | | | |
| Output Pair Drop (@ I = 45 mA, Vdd = 4.5 v) | Vdr | 0.0 | 1.0 | V |
| ADC0–ADC15 | | | | |
| Input resistance | Rin | 10 Meg | | Ohm |
| Input Voltage Range | Vina | −0.0 | VDD | V |
| C01, C02 | | | | |
| Output High Voltage | Voh | 0.5 | VDD + 0.3 | V |
| Output Low Voltage | Vol | −0.3 | 0.4 | V |
| Output High Current (@ Voh = 2.5 V) | Ioh | −4.0 | −12.0 | Ma |
| Output Low Current (@ Vol = 0.4 V) | Iol | 4.0 | | Ma |
| All Other Pins | | | | |
| Input High Voltage | Vih | 2.0 | VDD + 0.3 | V |
| Input High Voltage | Voh | VDD − 0.5 | VDD + 0.3 | V |
| Output High Voltage | Vil | −0.3 | 0.8 | V |
| Output Low Voltage | Vol | −0.3 | +0.4 | V |
| Output High Current (@ Voh - VDD − 0.5 V) | Ioh | −2.0 | | Ma |
| Output Low Current (@ Vol = 4.0 V) | Iol | 4.0 | | Ma |

6.5 ASIC U2 Mechanical Characteristics 6.5.1 Package Requirements

The device is packaged in an 84-pin plastic leaded chip carrier. The package life exceeds 20 years.

6.5.2 Environmental Requirements

The limits below represent the environmental limits to which the device will ordinarily be subjected.

| Rating | Value | Unit |
| --- | --- | --- |
| Storage Temperature | −40 to +85 | deg C |
| Operating Temperature | −10 to +70 | deg C |
| Lead Temperature (4 min soldering) | 250 | deg C |
| Humidity | 85/85 | deg C/percent |

6.6 Preferred Technology for Implementation of the U2 ASIC

The preferred embodiment of ASIC U2 is preferably implemented in the CMOS technology of NCR Corporation, Dayton, Ohio. This technology, and the design rules and standard cells therein, is discussed in the "NCR ASIC Data Book" for January 1987. The equivalent technologies of other manufacturers will be realized to be equally suitable. It will be understood that the irrigation system of FIG. 2 could also be implemented using standard integrated circuit and microprocessor components in combination with a control program corresponding to that of Appendix A of the related predecessor application Ser. No. 253,858 filed Oct. 4, 1988, now issued as U.S. Pat. No. 5,229,649. Such a system could be used alternately to implement the present method.

7. Interaction of the Analog ASIC U1 and the Digital ASIC U2 to Realize the Graceful Power Transitions in Accordance with the Present Invention A functional block diagram of those portions of the irrigation controller—previously seen in FIGS. 1 and 2—that are particularly concerned with production of such status signals as permit the graceful energization and de-energization in accordance with the present invention are shown in functional block diagram form in FIG. 10. Except for the photovoltaic module PVM 1,2, the particular portions of the circuitry shown therein that are within the U1 ASIC are enclosed in a solid line.

Developed control and status signals of particular concern to the operation of the present invention are the following:

| Signal | Description |
| --- | --- |
| NBP | No Battery Present |
| PULSE OUT | a 2.048 Hz Clock |
| NSVL | System Very Low Voltage (Active Low) |
| NSL | System Low Voltage (Active Low) |
| NSH1 | Shunt Transistor 1 Toggling (Pulses) |
| NSH2 | Shunt Transistor 2 Toggling (Pulses) |

7.1 Production of Status Signals by the Analog ASIC U1

Figure 10:
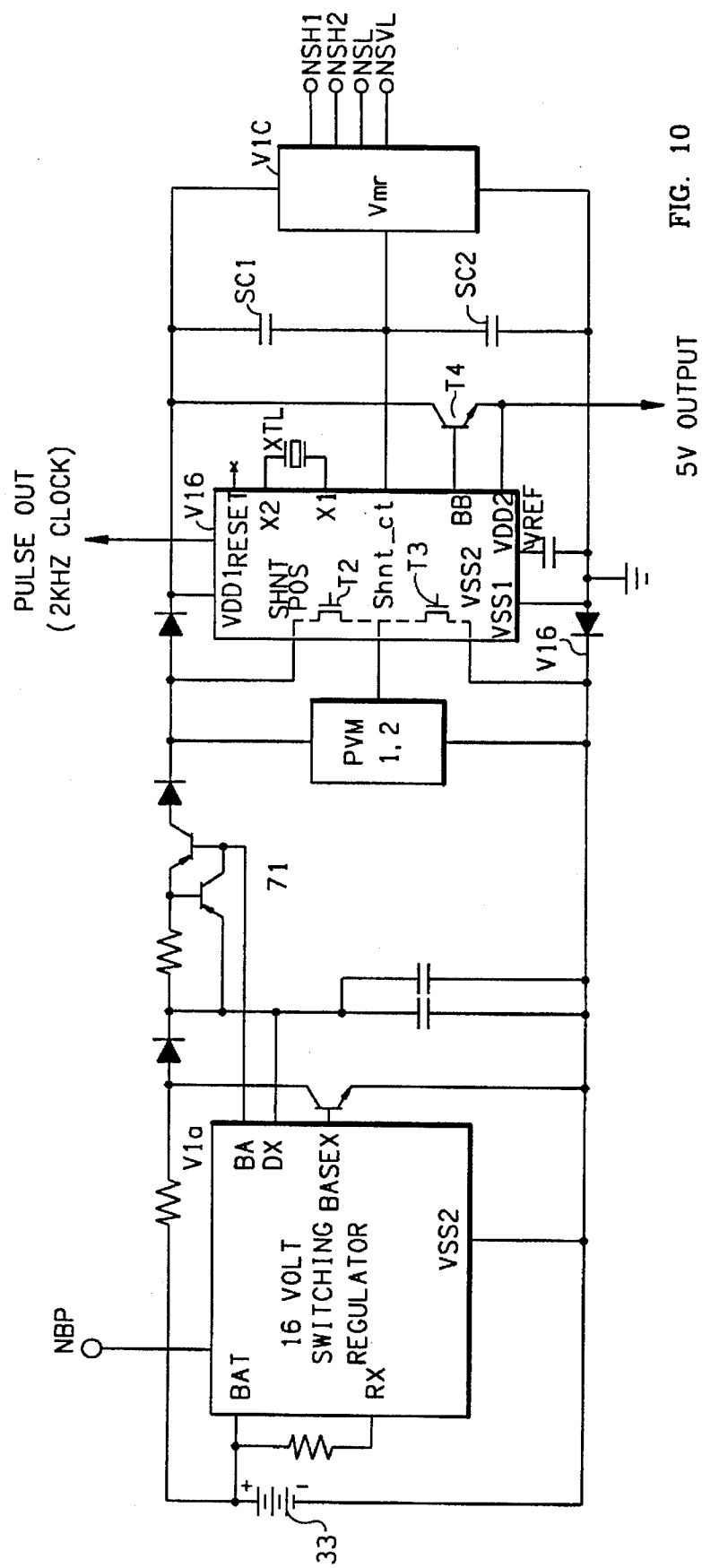
FIG. 10 is a functional block diagram of portions of the irrigation controller—previously seen in FIGS. 1 and 2—that are particularly concerned with production of such status signals as permit graceful energization and de-energization, these portions including the first (photovoltaic) power source, the second (battery) power source, the photovoltaic module, the switching regulator and the shunt transistors that were previously seen in the block diagram of FIG. 3, in the schematic diagram of FIG. 4, and, in part, as part of the first, U1, analog, Application Specific Integrated Circuit (ASIC) shown in the block diagram of FIG. 7.

Referring to FIG. 10, the 16 Volt Switching Regulator U1a (partial) serves to control power transistor T1 so as to provide a 25 ma charging current to the supercapacitors SC1, SC2 (previously seen in FIG. 3) when the battery, or pluggable powerkey energy source, 33 (previously seen in FIG. 2) is connected. When no battery 33 is present then signal NBP assumes the true, logic high, condition.

The supercapacitors CS1, SC2 are alternatively charged (although much more slowly) by the photovoltaic module PVM 1,2 (previously seen in FIG. 2). At such time(s) as the first supercapacitor SC1 is fully charged then overcharge (from whatsoever source) is precluded by the intermittent conduction of the shunt transistor T2 (previously seen in FIG. 2 as the upper SHUNT). Likewise, at such time(s) as the second supercapacitor SC2 is fully charged then overcharge (from whatsoever source) is precluded by the intermittent conduction of the shunt transistor T3 (previously seen in FIG. 2 as the lower SHUNT). The voltage status circuit MEASUREMENT BLOCK outputs the shunt control signals NSH1, NSH2. These signal NSH1, NSH2 respectively toggle when shunting of the respective supercapacitors SC1, SC2 is transpiring Regulation in transistor T4 of the voltage across both supercapacitors SC1, SC2 serves to produce the +5 V output which is the regulated voltage supply to all the logic of the entire irrigation controller with the exception of the U1 analog ASIC itself. As may be seen in FIG. 10, the U1b (partial) and the U1c (partial) sections of the U1 ASIC receive the unregulated voltage as appears between VDD1 and VSS1, and across the series supercapacitors CS1, SC2.

The digital logic MEASUREMENT BLOCK U1c (partial) also produces the status and control signals NSL, meaning device or system voltage—namely the voltage across the supercapacitors—is low (this signal is a logic low level when true), and also NSVL, meaning the same device or system voltage is very low (this signal is also a logic low level when true).

An abbreviated recapitulation of the development of these status and control signals may be had by reference to the schematic block diagram of FIG. 7, and to the discussion of section 6. The logic circuitry immediately next to be discussed in FIG. 7 (which shows the entire U1 ASIC) essentially corresponds to the MEASUREMENT BLOCK U1c (partial) shown in FIG. 10.

Referencing FIG. 7, and recalling the explanation of section 6, the unregulated voltage VDD2 received at the U1 ASIC is regulated in 5 V REGULATOR X6 and supplied as one voltage input to sampling comparator SCOMP X7. Meanwhile a precision 1.5 v.d.c fundamental reference voltage is developed in voltage reference VREF1 X4, and is also supplied to sampling comparator SCOMP X7 as its second voltage input. The precision 1.5 v.d.c fundamental reference voltage is also supplied to the 5 V REGULATOR X6 as the reference for its regulation function.

The SAMPLING SWITCH DECODER X3 is responsive to signals NSC1, NSC2, NSSL and NSSVL to sample, via internal connections not shown, the respective (i) full voltage charge on the upper supercapacitor, (ii) the full voltage charge on the lower supercapacitor, (iii) the charge on both supercapacitors SC1, SC2 in series, and, again, (iv) the charge on both supercapacitors SC1, SC2 in series.

The sampled voltage is supplied to the CAP ARRAY AND SWITCHES X5. The CAP ARRAY AND SWITCHES X5 divides each of the input signals in a capacitor array particular to that signal. The capacitor permits each input signal to be, in turn, compared to the fundamental reference voltage. The CAP ARRAY AND SWITCHES X5 provides a voltage at its output which voltage is the difference between each scaled input voltage and the fundamental reference voltage dependent.

The output of the CAP ARRAY AND SWITCHES X5 is then compared to the fundamental reference voltage VREF in the sampling comparator SCOMP X7. The binary signal output of this circuit will be either high or low (binary true or false) dependent upon whether the input (representative at separate times of each of (i) the scaled voltage charge on the upper supercapacitor, (ii) the scaled voltage charge on the lower supercapacitor, (iii) the scaled voltage charge on both capacitors, and (iv) the scaled voltage charge on both capacitors was greater or less than the fundamental reference voltage.

The scaling previously accomplished in CAP ARRAY AND SWITCHES X5 is such that the scaled sampled voltage compared to the reference voltage in SCOMP X7 will be either greater or less than the reference voltage dependent upon whether the unscaled voltage is greater, or less, than a particular predetermined voltage. The nominal particular voltages relative to which the scaling, and subsequent comparison, is performed are, for the cases of (i) the scaled voltage charge on the upper supercapacitor, (ii) the scaled voltage charge on the lower supercapacitor, (iii) the scaled voltage charge on both capacitors, and (iv) the scaled voltage charge on both capacitors, respectively (i) 5.5 v.d.c., (ii) 5.5. v.d.c., (iii) 6.7 v.d.c., and (iv) 5.8 v.d.c. These voltages respectively equal the predetermined, preset, levels at which signals NSC1, NSC2, NSSL and NSSVL are respectively desired to turn from a logic false to a logic true condition. The results of the comparisons are captured in the comparator data latches COMP_DL X11, and are communicated off the U1 ASIC as status signals.

Figure 11:
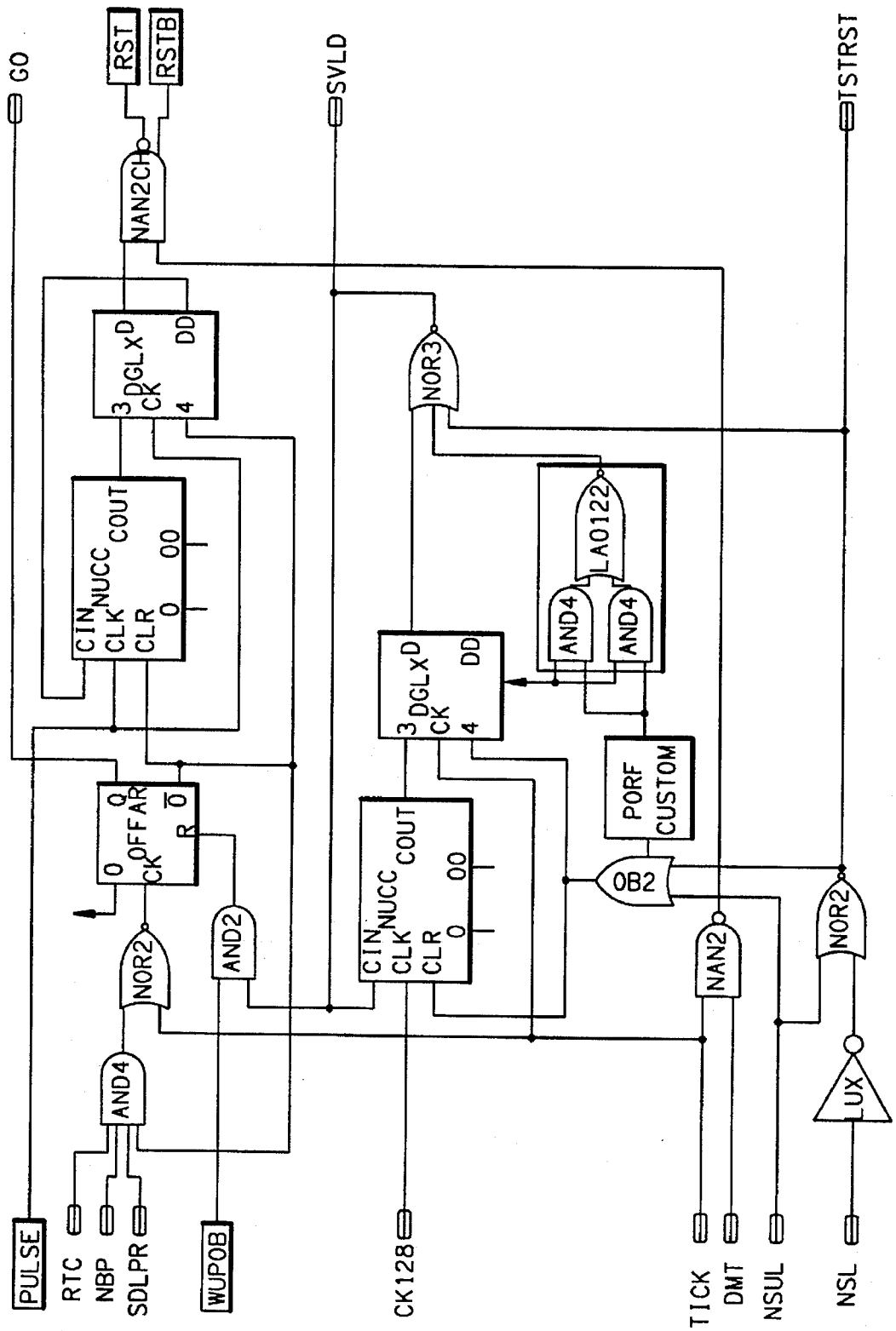
FIG. 11 is a schematic diagram of part of the logic circuitry of the U2, digital, Application Specific Integrated Circuit (ASIC)—which U1 ASIC was previously seen in the layout diagram of FIG. 9.
Figure 12B:
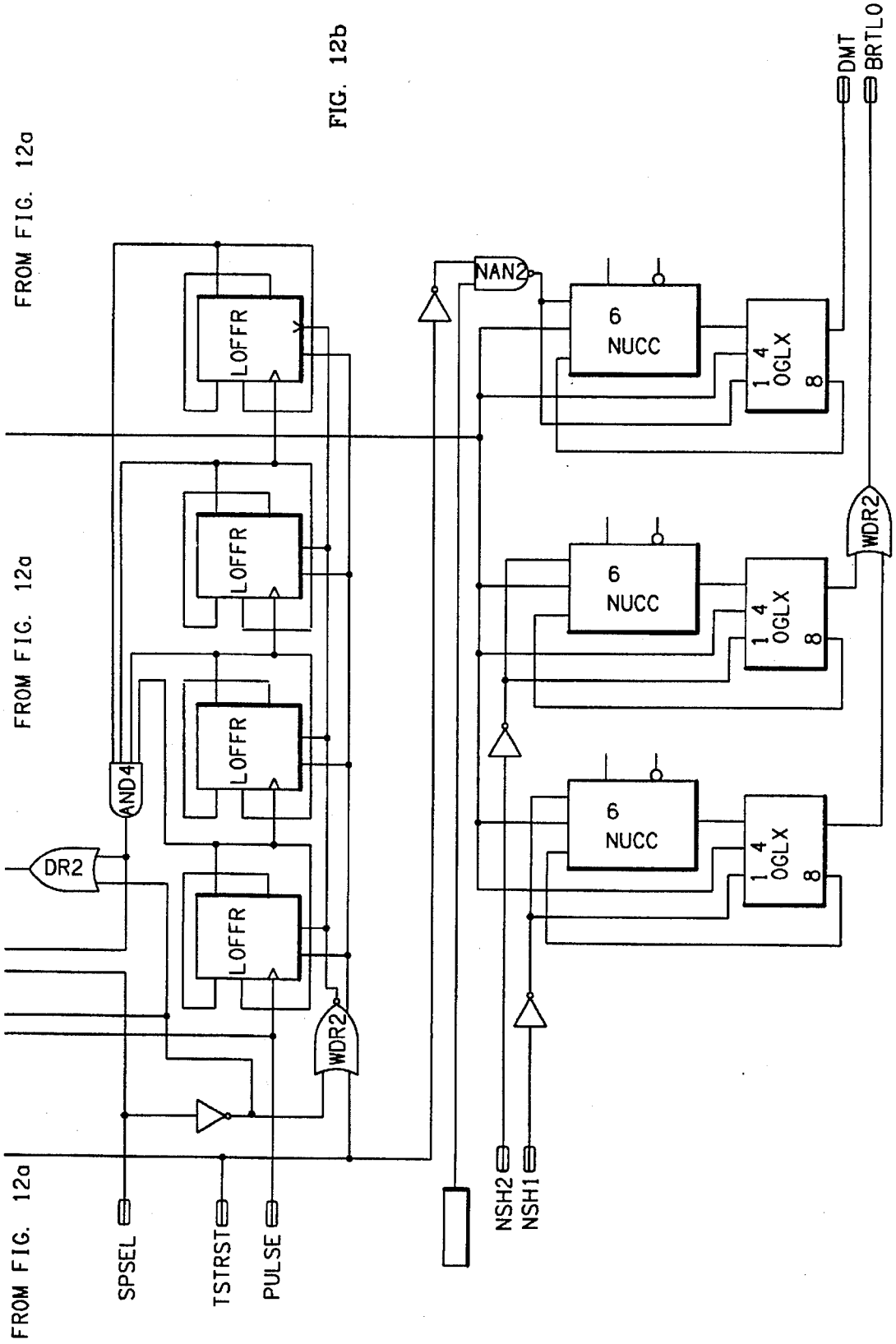
FIG. 12 is a schematic diagram of another part of the logic circuitry of the second, U2, digital Application Specific Integrated Circuit (ASIC)—previously seen in layout diagram in FIG. 9—which U2 ASIC contains a microprocessor and uses the status signals developed by the U1 ASIC (shown in FIGS. 10 and 11) in order to perform graceful energy transitions in the preferred embodiment of an irrigation controller in accordance with the present invention.

7.2 Use of the Status Signals in the Digital ASIC U2 in Order to Control the Operations of the Electronic Device FIG. 11 is an electrical schematic diagram of part of the logic, and FIG. 12 is an electrical schematic diagram of still more of the logic, of the second, U2, digital Application Specific Integrated Circuit (ASIC) previously seen in layout diagram in FIG. 9. The U2 digital ASIC contains a microprocessor. It uses the status signals developed by the U1 ASIC (shown in FIGS. 7 and 10) in order to accomplish graceful energy transitions in the preferred embodiment of an irrigation controller in accordance with the present invention.

The logic shown in FIG. 11 is principally concerned with the development of a delayed system very low voltage signal—SVLD—from the system very low voltage status signal NSVL. The NSVL status signal is received into a status register along with signals NSL and NBP—reference FIG. 9c. In such status register STAT-REG Y3 (reference FIG. 9c) the state of these signals is interrogatable by the NCR65CX02 MICROPROCESSOR (reference FIG. 9).

The logic in FIG. 11 is primarily concerned with the response of the U2 ASIC to declining system energy reserves such as have finally resulted in the incipient occurrence of the NSVL signal. All system logic (other than that on the analog ASIC U1), including the microprocessor, will desirably fall dormant upon the occurrence of this signal. However, the microprocessor must attend to a few minor housekeeping tasks before shutting down. Accordingly, the actual hold on the entire system is accomplished on occurrence of signal SVLD. (The microprocessor was earlier able to detect the condition of signal NSVL in the status register, and to branch its control program appropriately.)

Tracing the logic in the FIG. 11 schematic, the logic low, or true, condition of signal NSLV suspends the satisfaction of OR gate OR2 and removes the constant clear to latch NUCC3. After occurrence of a clock signal the digital time delay DGLX will produce a logic high signal some 500 microseconds later. This logic high signal satisfies NOR gate NOR3 and produces the logic low, or true, condition of signal SVLD.

The test reset, TSTRST, signal input is used purely for manufacturing testing of the U2 ASIC, and creates the illogical internal condition that system very low voltage status signal (NSVL) is detected while system low voltage status signal (NSL) is not.

The received signals RTC for real time clock, NBP for battery connect (low, or logic true, when the PLUGGABLE POWERKEY BATTERY ENERGY SOURCE is connected, see FIG. 2), and serial data latch present SDLPR are the three means by which the microprocessor reset signal RST (and its compliment RSTB) may be generated in order to stir the generally somnambulant microprocessor to wakefulness and, energy conditions permitting, operability. The signal GO is the wake-up signal.

Referencing FIG. 12, the origin of the real time clock, or signal RTC, is shown. Of pertinence to the present invention of power management, the real time clock will be kept even if the microprocessor is dormant (because of system very low voltage), and until a near total depletion of power and energy. By this operation the microprocessor, and any control programs that it executes, may nearly always know the correct real time when operations resume with the presence of adequate power, even after long durations of dormancy.

The 2.048 Khz clock signal is received as signal PULSE, and divided in a frequency divider consisting of arrayed latches. The produced signal TICK occurs every two seconds. A pre-settable counter counted down by signal TICK produces the signal RTC, which serves to awaken the microprocessor, typically once every ten seconds or once every minute. The microprocessor normally performs its scheduled tasks when awakened. In the event that the system voltage is low, the awakened microprocessor will perform only housekeeping task. Because the microprocessor is then typically active, under control of its firmware program, for only a few tens of microseconds, the power consumption in the housekeeping mode is very low.

If the delayed system very low voltage signal occurs then the microprocessor will no longer be stirred to wakefulness, but the counter will still count. If, at a later time, the microprocessor is, because of the restoration of adequate power, restored to operability, then it may interrogate the counter for the current real time. This correct current time is especially useful in the resumption of irrigation control schedules. If the microprocessor cannot determine current correct time, it will execute a factory default program based on an assumed, default, time of day. This default program, and default time, will accomplish predetermined scheduled irrigation, only not at such particular times of day and for such particular durations as may have previously been specified and programmed by the user/maintainer.

The signals NSH1 and NSH2 are each received at an associated count down counter that counts down under the two second TICK signal cyclically from 32 to 0. Each time each signal is received its associated counter is reset. If a counter is not reset within sixty-four seconds, it generates an output signal indicating that the associated supercapacitor SC1, SC2 is no longer fully charged. The microprocessor uses these signals exclusively to condition its performance, when in the operational mode, of communication with the display and keyboard. Accordingly, these power-consuming operations will not be undertaken or continued unless the supercapacitors are, and remain, fully charged. This full charging is accomplished, of course, by connection of the POWERKEY PLUGGABLE BATTERY ENERGY SOURCE 33 (shown in FIG. 2).

8.0 Variations and Adaptations of the Invention

Although the present invention has been taught in the context of electrical circuits that are fairly sophisticated for employing both a predominantly analog ASIC (ASIC U1) and a predominantly digital ASIC (ASIC U2), it should be understood that the functionality of the preferred embodiment of an irrigation controller in accordance with the present invention is readily realizable by diverse alternative designs.

In particular, the core microprocessor of the preferred embodiment of the invention is 100% compatible with industry standard type 6502. All firmware appended to this specification will execute on a 6502 microprocessor, and is readily convertible to alternative microinstruction repertoires executing on alternative microprocessors. The circuits by which data is manually input to the microprocessor and displayed, and the control of irrigation valves, are, in the preferred embodiment of the invention, powered and sequenced to states of activity in a highly unique manner. Nonetheless, it will be recognized that alternative implementations of these circuits, particularly as consume higher power and/or operate at higher or (continuous duty cycles, are readily realizable by a practitioner of the electrical design arts. Accordingly, the present invention should be considered in terms of the functions that it performs, and not solely in terms of any particular embodiment for realizing these functions.

In particular, the energy production, storage, and consumption balances of the system may be changed without departing from the spirit of the invention. The photovoltaic module could be made larger to gather more light energy. The energy storage in super capacitors could be differentially sized. Finally, the energy consumption could be set higher, especially if the controller is to be used in sunny climates.

In accordance with these and other aspects and attributes of the present invention, the invention should be determined by the scope of the following claims, only, and not solely in accordance with those particular embodiments within which the invention has been taught.

What is claimed is:

1. An electrical device powered from a source of energy and accruing energy from the source so as to come, over time, from an inoperative un-powered to an operative powered condition, the device comprising:

a storage-and-supply means for receiving and for storing energy from the source of energy, and for producing an unregulated electrical supply voltage that increases proportionately to the amount of energy stored;

a regulator means, receiving the unregulated supply voltage from the storage-and-supply means, for producing a regulated electrical supply voltage;

a power monitor circuit means, receiving the unregulated supply voltage from the storage-and-supply means, for remaining somnolent, howsoever long, until a time that the unregulated supply voltage reaches a first voltage level, for internally assuming a reset condition during a period, howsoever long, between the time that the unregulated supply voltage reached the first voltage level and until a time that the unregulated supply voltage reaches a second voltage level greater than the first voltage level, at which time the internal reset condition is dropped, and for producing a logic true condition of a very-low-voltage status signal, indicative that unregulated supply voltage is at a very low level, during a period, howsoever long, between the time that the unregulated supply voltage reached the second voltage level and until a time that the unregulated supply voltage reaches a third voltage level greater than the second voltage level, at which time the very-low-voltage status signal assumes the logic false condition;

for producing a logic true condition of a low-voltage status signal, indicative that unregulated supply voltage is at a low level, during a period, howsoever long, between the time that the unregulated supply voltage reached the third voltage level and until a time that the unregulated supply voltage reaches a fourth voltage level greater than the third voltage level, at which time the low-voltage status signal assumes the logic false condition;

a functional circuit means, operative at a relatively higher voltage than is the power monitor circuit means, receiving the regulated supply voltage from the regulator means and also the very-low-voltage and the low-voltage status signals from the power monitor circuit means, for remaining somnolent until the received regulated supply voltage reaches a voltage level greater than the second voltage level but less than the fourth voltage level, at which time sufficient operability is achieved that the conditions of the status signals are regarded, and if the very-low-voltage status signal is in the logic true condition, which necessarily means that the low-voltage status signal is also in the logic true condition, then simply waiting and forebearing to do anything that would consume more than minimum power, but if the very-low-voltage status signal is in the logic false condition while the low-voltage status signal is in the logic true condition, then performing only limited housekeeping operations while consuming but slight power, but if both the very-low-voltage and the low-voltage status signals are in the logic false condition, then performing functional operations, consuming during the course of so doing all such power as the performed operations require.

2. The electrical device according to claim 1 wherein the functional circuit means further comprises;

controlling means for performing, as some of the functional operations when both the very-low-voltage and the low-voltage status signals are in the logic false condition, a controlling of the opening and the closing of electrical irrigation valves.

3. The electrical device according to claim 1 wherein the power monitor circuit means is further for producing a logic true condition of a not-fully-charged status signal, indicative that unregulated supply voltage is at less than a predetermined fifth voltage level greater than the fourth voltage level, during a period, howsoever long, between the time that the unregulated supply voltage reached the fourth voltage level and until a time that the unregulated supply voltage reaches the fifth voltage level, at which time the not-fully-charged status signal assumes the logic false condition; and wherein the functional circuit means, receiving also the not-fully-charged status signal, performs as the functional operations when both the very-low-voltage and the low-voltage status signals are in the logic false condition less than the entirety of functional operations of which it is capable of performing, the functional circuit only performing all operations of which it is at any times capable only upon any such times as the not-fully-charged status signal assumes the logic false condition.

4. The electrical device according to claim 2 adopted for use as an irrigation controller wherein the functional circuit means further comprises:

communicating means for performing, as some of the functional operations, a communicating with an operator/user through a display and keyboard;

but wherein the functional operations performed that are less that the entirety of which the functional circuit means may perform include the controlling of the opening and the closing of electrical irrigation valves by the controlling means but exclude the communicating with an operator/user through a display and keyboard by the communicating means.

5. The electrical device according to claim 1 wherein the power monitor circuit means comprises:

BICMOS logic;

and wherein the functional circuit means operative at the relatively higher voltage than is the power monitor circuit means comprises:

CMOS logic.

6. The electrical device according to claim 5 wherein the regulator means operates to produce a regulated supply voltage that is less than the unregulated supply voltage by approximately 0.6 v.d.c;

wherein the first voltage level equals approximately 1.5 v.d.c.;

wherein the second voltage level equals approximately 1.8 v.d.c.;

wherein the third voltage level equals approximately 5.8 v.d.c.; and wherein the fourth voltage level equals approximately 6.7 v.d.c.

7. The electrical device according to claim 1 powered from a non-electrical source of energy wherein the storage-and-supply means comprises:

an electricity generation means for producing electrical energy from the source of energy;

a storage means for storing the electrical energy produced by the electricity generation means and for producing an electrical supply voltage that increases proportionately to the amount of energy stored.

8. The electrical device according to claim 7 powered from a non-electrical source of energy in the environment within which the device is located wherein the electricity generation means is producing electrical energy from the non-electrical source of energy in the environment.

9. The electrical device according to claim 2 adopted for use as an irrigation controller and powered from a non-electrical source of energy in the environment within which the device is located, wherein the storage-and-supply means comprises:

an electricity generation means for producing electrical energy from the non-electrical source of energy in the environment; and a storage means for storing the electrical energy produced by the electricity generation means and for producing an electrical supply voltage that increases proportionately to the amount of energy stored.

10. The electrical device according to claim 3 wherein the electricity generation means comprises:

a photovoltaic module;

wherein storage means comprises:

at least one supercapacitor;

and wherein the not-fully-charged status signal is developed by the power monitor circuit means in consideration of the voltage on the at least one supercapacitor.

* * * * *